(12) United States Patent
Hunt

(10) Patent No.: US 12,488,393 B1
(45) Date of Patent: *Dec. 2, 2025

(54) GRAPHICAL INSTRUMENT PERFORMANCE PREDICTION

(71) Applicant: Innovative Market Analysis, LLC, Taylorsville, UT (US)

(72) Inventor: Kenneth Nelson Hunt, Fruit Heights, UT (US)

(73) Assignee: INNOVATIVE MARKET ANALYSIS, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,303

(22) Filed: Jun. 11, 2024

Related U.S. Application Data

(63) Continuation of application No. 18/480,500, filed on Oct. 3, 2023, now Pat. No. 12,008,652, which is a
(Continued)

(51) Int. Cl.
*G06Q 40/06* (2012.01)
*G06Q 40/04* (2012.01)
(Continued)

(52) U.S. Cl.
CPC ............. *G06Q 40/06* (2013.01); *G06Q 40/04* (2013.01); *G06T 11/206* (2013.01); *G06T 11/60* (2013.01)

(58) Field of Classification Search
CPC ...... G06Q 40/06; G06Q 40/04; G06T 11/206; G06T 11/60
See application file for complete search history.

(56) References Cited

U.S. PATENT DOCUMENTS 5,761,442 A 6/1998 Barr et al.
6,195,103 B1 2/2001 Stewart
(Continued)

FOREIGN PATENT DOCUMENTS

DE 10061108 A1 6/2002
EP 3675025 A1 * 7/2020 ............. G06Q 40/04
(Continued)

OTHER PUBLICATIONS

Kong et al.: Graphical Overlays: Using Layered Elements to Aid Chart Readings, Dec. 2012, IEE Transactions on Visualization and Computer Graphics, vol. 18, No. 12. pp. 2631-2638. (Year: 2012).*
(Continued)

*Primary Examiner* — Bijendra K Shrestha
(74) *Attorney, Agent, or Firm* — VLP Law Group LLP; Michel Bohn

(57) ABSTRACT

The disclosure includes technology for receiving, via the pattern definition region and an input device of the computing device, one or more selections defining a user-defined graphical pattern; determining two or more matches between the user-defined graphical pattern and one or more corresponding portions of retrieved time-dependent data; presenting, in the graphical user interface on the display device, a chart region including a data visualization graphically representing the retrieved time-dependent data and the two or more graphical indicators; and highlighting at different points of time in the chart region of the graphical user interface the two or more matches between the user-defined graphical pattern and two or more corresponding portions of the retrieved time-dependent data.

20 Claims, 44 Drawing Sheets
(12 of 44 Drawing Sheet(s) Filed in Color)

Related U.S. Application Data continuation of application No. 16/361,080, filed on Mar. 21, 2019, now abandoned, which is a continuation of application No. 14/495,670, filed on Sep. 24, 2014, now Pat. No. 10,242,407.

(60) Provisional application No. 61/881,882, filed on Sep. 24, 2013.

(51) Int. Cl.
*G06T 11/20* (2006.01)
*G06T 11/60* (2006.01)

(56) References Cited

U.S. PATENT DOCUMENTS

| | | | |
|---|---|---|---|
| 6,473,084 B1 | 10/2002 | Phillips et al. | |
| 7,161,706 B2 | 1/2007 | Levin | |
| 7,395,235 B2 | 7/2008 | Dhurandhar et al. | |
| 7,401,057 B2 | 7/2008 | Eder | |
| 7,469,228 B2 | 12/2008 | Bonissone et al. | |
| 7,542,932 B2 | 6/2009 | Chalermkraivuth et al. | |
| 7,630,928 B2 | 12/2009 | Bonissone et al. | |
| 7,890,396 B2 | 2/2011 | Weinstein | |
| 7,966,246 B2 | 6/2011 | Ingargiola et al. | |
| 8,065,250 B2 | 11/2011 | Stephens | |
| 8,126,795 B2 | 2/2012 | Bollapragada et al. | |
| 8,219,477 B2 | 7/2012 | Subbu et al. | |
| 8,315,938 B1 | 11/2012 | Forsythe | |
| 8,392,419 B2 * | 3/2013 | Heaton | G16H 50/70 375/152 |
| 8,457,997 B2 | 6/2013 | Narayanan et al. | |
| 8,463,678 B2 | 6/2013 | Chang et al. | |
| 8,706,597 B1 | 4/2014 | Forsythe | |
| 2002/0046157 A1 | 4/2002 | Solomon | |
| 2003/0115129 A1 | 6/2003 | Feaver et al. | |
| 2004/0199445 A1 | 10/2004 | Eder | |
| 2004/0215522 A1 | 10/2004 | Eder | |
| 2005/0021436 A1 | 1/2005 | Dowling | |
| 2005/0086150 A1 | 4/2005 | Serpico et al. | |
| 2005/0125332 A1 | 6/2005 | Cliff | |
| 2005/0187845 A1 | 8/2005 | Eklund et al. | |
| 2007/0174784 A1 | 7/2007 | Yu et al. | |
| 2008/0162377 A1 | 7/2008 | Pinkas | |
| 2008/0168370 A1 | 7/2008 | Maher et al. | |
| 2009/0125370 A1 | 5/2009 | Blondeau et al. | |
| 2009/0228399 A1 | 9/2009 | Connors et al. | |
| 2010/0231595 A1 * | 9/2010 | Dang | G06F 16/904 715/764 |
| 2011/0295767 A1 | 12/2011 | Raynes et al. | |
| 2013/0006843 A1 | 1/2013 | Tralvex | |
| 2013/0024395 A1 | 1/2013 | Clark et al. | |
| 2014/0245207 A1 | 8/2014 | Poulin | |
| 2014/0258176 A1 | 9/2014 | Thorsen | |
| 2014/0258177 A1 | 9/2014 | Thorsen | |

FOREIGN PATENT DOCUMENTS

| | | | | |
|---|---|---|---|---|
| JP | 2003044665 A | 2/2003 | | |
| WO | 1998059307 A1 | 12/1998 | | |
| WO | 063789 A2 | 10/2000 | | |
| WO | 0065488 A1 | 11/2000 | | |
| WO | WO-2008060900 A2 * | 5/2008 | | G06F 40/103 |
| WO | WO-2009143040 A1 * | 11/2009 | | G16Z 99/00 |
| WO | 2012006352 A2 | 1/2012 | | |

OTHER PUBLICATIONS

Mackinlay et al.: Show me: Automatic Presentation for Visual Analysis, Dec. 2007, IEE Transactions on Visualization and Computer Graphics, vol. 13, No. 6. pp. 2631-2638.1137-1144. (Year: 2007).*

Chapter 5: "Goodness of Fil Tests," Course materials for Centre for Innovation in Mathematics Teaching, found at http://studylib.net/doc/7985036/chapter-5-goodness-of-fit-tests-5-goodness-of-fit, pp. 89-114.

Munnix et al. Identifying States of a Financial Market, 2012, Scientific Reports, 2:644, pp. 1-6 (Year: 2012).

Carter et al., Parsing executives processes: Strategic vs. evaluate functions of the anterior cingulate cortex, Feb. 15, 2000, pp. 1945-1948 (Year: 2000).

Evans et al., Macroprudential Indicators of Financial System Soundness, Apr. 2000, International Monetary Fund, Occasional Paper 192, pp. 1-54 (Year: 2000).

* cited by examiner

450

600

| ColorValue | Bitmap Color |
|---|---|
| 0 | Black |
| ↓ | ↓ |
| 50 | Blue |
| ↓ | ↓ |
| 80 | Magenta |
| ↓ | ↓ |
| 90 | Red |
| ↓ | ↓ |
| 95 | Yellow |
| ↓ | ↓ |
| 100 | White |

Figure 6

GRAPHICAL INSTRUMENT PERFORMANCE PREDICTION

BACKGROUND

The specification relates to graphical forecasting of instrument values.

Traders in financial markets often analyze instrument-related data to learn various patterns related to price fluctuations, and then use this data in an attempt to predict future outcomes. However, these predictions are often inconsistent and unreliable due to the complexity and amount of data, which can be overwhelming and difficult to interpret. Some solutions use large and sophisticated server farms that determine significant patterns using resource intensive algorithms, and use the patterns to automatically execute trades. However, these solutions are extremely costly and generally not available to common day traders that trade stocks, commodities, and other financial instruments independently or as part of a brokerage.

These solutions also lack the ability to analyze instrument-related data using user-defined patterns, as well as used these user-defined patterns to provide predictive analysis of instrument trends over time.

SUMMARY

According to some innovative aspects, the techniques described herein relate to a computer-implemented method including: presenting, on a display device of a computing device, a graphical user interface including a pattern definition region having a user-interactable graphical option for defining a graphical pattern; receiving, via the pattern definition region and an input device of the computing device, one or more selections defining a user-defined graphical pattern; determining, using one or more processors, two or more matches between the user-defined graphical pattern and one or more corresponding portions of retrieved time-dependent data; presenting, in the graphical user interface on the display device, a chart region including a data visualization graphically representing the retrieved time-dependent data and the two or more graphical indicators; and highlighting at different points of time in the chart region of the graphical user interface the two or more matches between the user-defined graphical pattern and two or more corresponding portions of the retrieved time-dependent data.

In some innovative aspects, the method may optionally include one or more of: iteratively isolating portions of the retrieved time-dependent data based on a block dimension of the user-defined graphical pattern; generating a hash-value set reflecting a trend line of each of the isolated portions of the retrieved time-dependent data; comparing the hash-value set of each of the isolated portions of the retrieved time-dependent data with a hash-value set generated from the user-defined graphical pattern to determine a match; that generating the hash-value set reflecting the trend line of each of the isolated portions of the retrieved time-dependent data includes projecting, using the one or more processors, scan lines between unique pairs of points-of-view, computing, using the one or more processors, for each of the unique pairs of the points-of-view a distance from an originating point-of-view to a closest intersection with a corresponding portion of the retrieved time-dependent data or to a terminating point of view if no intersection exists, and assigning, using the one or more processors, the distance to the hash-value set; that comparing the hash-value set of each of the isolated portions of the retrieved time-dependent data with the hash-value set generated from the user-defined graphical pattern to determine the match includes assigning, using the one or more processors, a TRUE bit to a match between hash-values, assigning, using the one or more processors, a FALSE-bits to a non-match between hash-values, and computing, using the one or more processors, the confidence measure by summing TRUE-bits and FALSE-bits; that receiving the one or more selections defining the user-defined graphical pattern further includes receiving input defining a bounding shape that bounds a portion of the data visualization presented in the graphical user interface, the bounding shape is polygonal; that the data visualization includes an interactive chart displaying a snapshot of the retrieved time-dependent data and a recognized events region indicating a data dimension used in processing the snapshot; that the graphical user interface further includes a stats panel corresponding to a data dimension instance with an option for comparing the user-defined graphical pattern to the retrieved time-dependent data; that highlighting in the graphical user interface the two or more matches between the user-defined graphical pattern and one or more corresponding portions of the retrieved time-dependent data further includes highlighting a plurality of points that can be dynamically selectable to correspond to a data dimension instance; the graphical user interface includes a comparison window including elements for scrolling through the retrieved time-dependent data so that the user-defined graphical pattern can be compared with different aspects of the retrieved time-dependent data; the user-defined graphical pattern represents a trend of the retrieved time-dependent data over a first time period based on a selected portion of the data visualization, the one or more selections indicating pattern data describing the user-defined graphical pattern; and retrieving, using the one or more processors, the retrieved time-dependent data including financial instrument data for a financial instrument, the financial instrument data describing a performance of the financial instrument over a second time period, the second time period being greater than the first time period.

In some innovative aspects, the techniques described herein relate to computer-implemented methods, program products, and other aspects incorporating one or more of the novel features discussed herein. It should be understood that these aspects, features and advantages are provided by way of example and are not meant to be exhaustive, and that numerous other aspects, techniques, and advantages are contemplated and/or are readily discernable from this disclosure.

It should be noted that the language used in the present disclosure has been principally selected for readability and instructional purposes, and not to limit the scope of the subject matter disclosed herein.

BRIEF DESCRIPTION OF THE DRAWINGS

The patent or application file contains at least one drawing executed in color. Copies of this patent or patent application publication with color drawings will be provided by the Office upon request and payment of the necessary fee.

This disclosure is illustrated by way of example, and not by way of limitation in the figures of the accompanying drawings in which like reference numerals are used to refer to similar elements.

FIG. 6 is an example mapping of matrix values to color values.

DETAILED DESCRIPTION

Overview

Figure 1A:
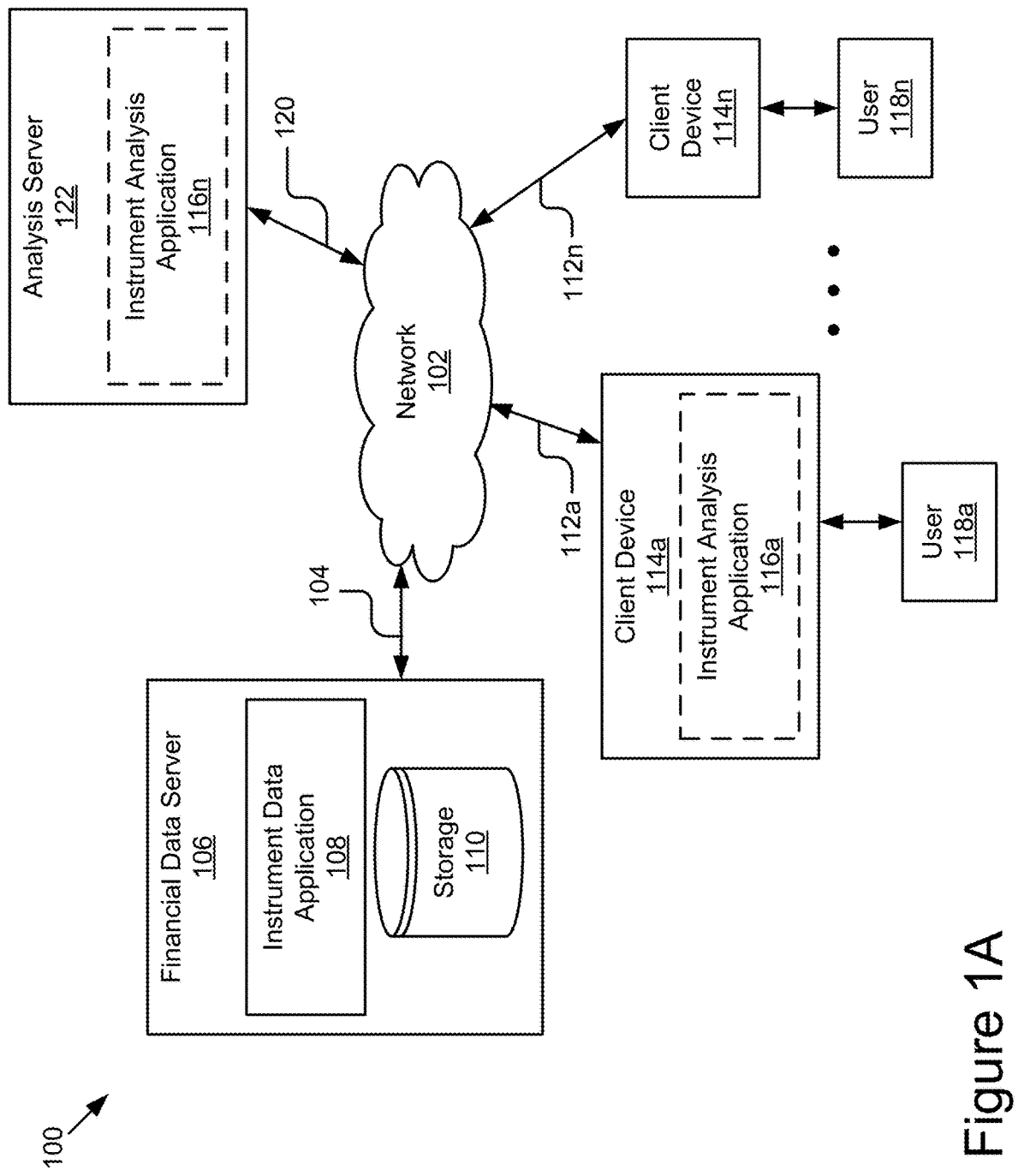
FIGS. 1A and 1B are block diagrams of example system and computing devices for processing financial instrument data.
Figure 1B:
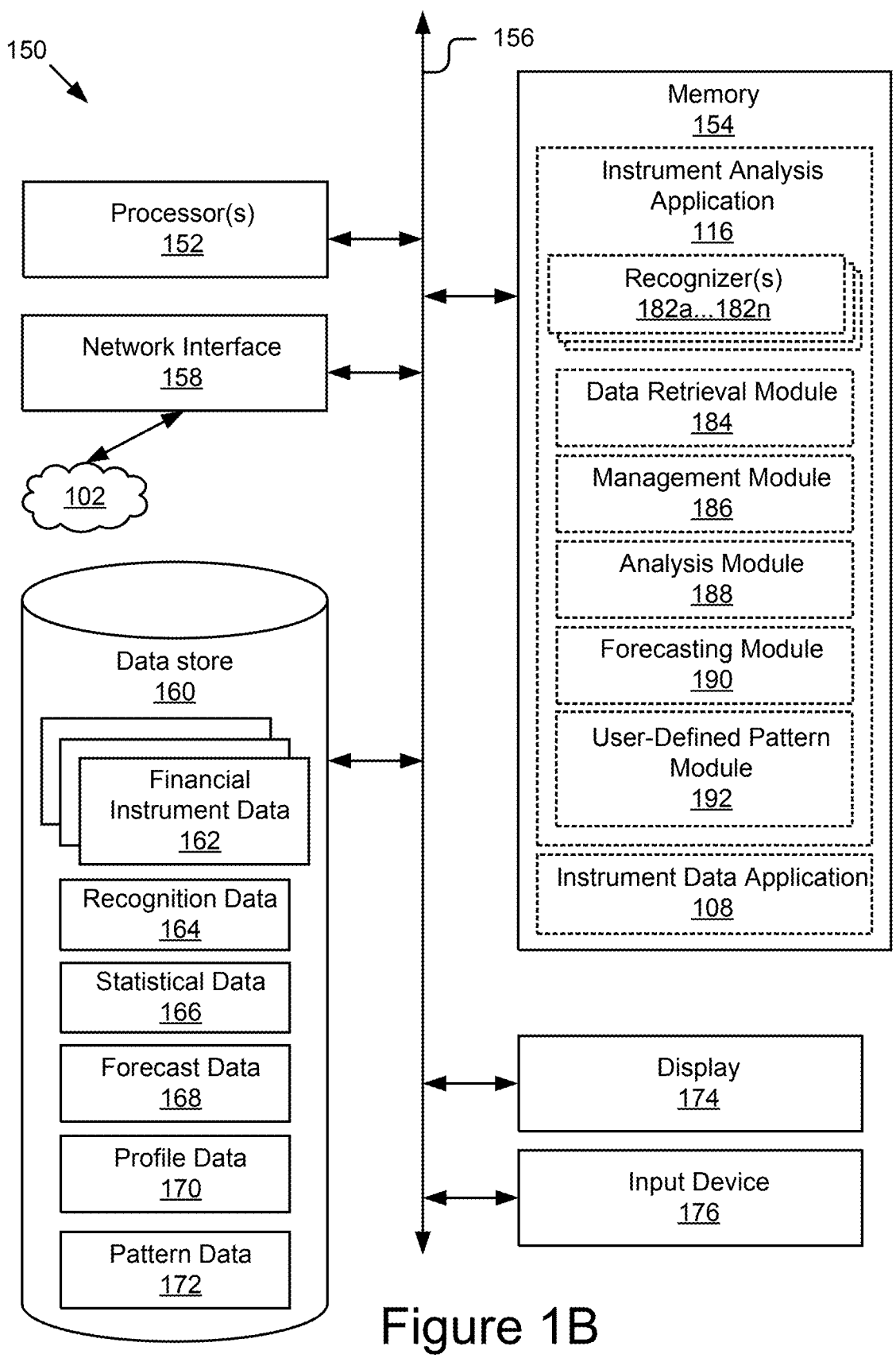

FIG. 1 illustrates a block diagram of an example system 100 for processing financial instrument data (also referred to herein as historical data) according to some implementations. The illustrated system 100 includes a financial data server 106, one or more client devices 114a . . . 114n, and an analysis server 122. The entities of the system 100 are communicatively coupled via a network 102. In additional implementations, the system 100 may include other entities not shown in FIG. 1, such as a search server for searching financial instrument data from the financial data server 106, a brokerage server for trading financial instruments, etc. Although FIG. 1 illustrates one financial data server 106, one analysis server 122, and two client devices 114, the system 100 can include any number of these entities coupled together either directly or via the network 102. The use of the nomenclature "a" and "n" in the reference numbers indicates that the system 100 may include any number of those elements having that nomenclature.

The network 102 may include any number of networks. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc. Although FIG. 1 illustrates one network 102 coupled to the financial data server 106, the client device 114 and the analysis server 122, in practice one or more networks 102 can be connected to these entities.

The financial data server 106 can include one or more hardware and/or virtual servers that includes one or more processors, memories, and network communication capabilities. As depicted, the financial data server 106 is communicatively coupled to the network 102 via signal line 104. In some implementations, the financial data server 106 can include an instrument data application 108 and a storage device 110. The instrument data application 108 can include logic executable to provide financial instrument data to the analysis server 122 and/or the client device 114. For example, the instrument data application 108 can be an application programming interface (API) that can send financial instrument data to the client device 114 and/or the analysis server 122 upon request. In further examples, data may be crawled or scraped from the instrument data application 108. In some implementations, the analysis server 122 may store and maintain its own financial instrument data 162 for some or all of the financial instruments analyzed by it.

The storage device 110 can be a non-transitory storage medium that can store data. The storage device 110 can store financial instrument data which may include historical and/or real-time data for one or more financial instruments. Example financial instruments can include, but are not limited to, stocks, bonds, currency, commodities, securities, etc. The storage device 110 can store comprehensive, up-to-date, financial instrument data for the financial instruments (e.g., stocks, bonds, commodities, etc.).

In some implementations, the instrument analysis application 116a can be operable on the client device 114a, which is connected to the network 102 via signal line 112a. In some implementations, the client device 114a can send and receive data to and from one or more of the financial data server 106 and the analysis server 122. The client devices 114 are computing devices having data processing and communication capabilities. In some implementations, a client device 114 may include a processor (e.g., virtual, physical, etc.), a memory, a power source, a communication unit, and/or other software and/or hardware components, such as a display, graphics processor, wireless transceivers, keyboard, camera, sensors, firmware, operating systems, drivers, various physical connection interfaces (e.g., USB, HDMI, etc.). The client devices 114 may couple to and communicate with one another and the other entities of the system 100 via the network 102 using a wireless and/or wired connection. Examples of client devices 106 may include, but are not limited to, mobile phones, tablets, laptops, desktops, netbooks, server appliances, servers, virtual machines, TVs, set-top boxes, media streaming devices, portable media players, navigation devices, personal digital assistants, etc. The system 100 can include any number of client devices 114.

In some examples, the instrument analysis application 116a can act in part as a thin-client application that may be stored on the client device 114a and in part as components that may be stored on the analysis server 122. For example, the analysis server 122 can store price statistics data for a financial instrument and can generate graphical data for providing a user interface that presents the price statistics data to the user. The instrument analysis application 116a can send instructions to an associated browser (not shown) installed on the client device 114a to present the user interface on a display device (not shown) coupled to the client device 114a. While only one client device 114 is depicted as including the instrument analysis application 116a, in practice any number of client devices 114 may include this application or portions thereof.

In some implementations, the instrument analysis application 116n can be operable on one or more analysis servers 122. As depicted, the analysis server 112 is coupled to the network 102 via signal line 120. The analysis server 122 can include one or more hardware and/or virtual servers that includes one or more processors, a memories, and network communication capabilities. In some implementations, the analysis server 122 can send and receive data to and from one or more of the client device 114 and the financial data server 106.

The instrument analysis application 116 can include logic for processing financial instrument data. In some implementations, the instrument analysis application 116 can be implemented using hardware including a field-programmable gate array (FPGA) or an application-specific integrated circuit (ASIC), software executable by a processor of a computer device, a combination of hardware and software, etc. In some implementations, the instrument analysis application 116 may be stored in and distributed across a combination of the devices and servers, or in one of the devices or servers. The instrument analysis application 116 and components thereof is described below in more detail.

FIG. 1A is a block diagram of an example-computing device 150, which in various implementations reflects the architecture of the financial data server 106, the client device 114, the analysis server 122, and/or other computing components of the system 100. As depicted, the computing device 150 may include a processor 152, a memory 154, and a network interface 158, a data store 160, a display 174, and an input device 176, which may be communicatively coupled by a communication bus 156. The computing device 150 depicted in FIG. 1A is provided by way of example and it should be understood that it may take other forms and include additional or fewer components without departing from the scope of the present disclosure. For example, while not shown, the computing device 150 may include various sensors, additional processors, other physical configurations, storage devices, etc.

The processor 152 may execute software instructions by performing various input/output, logical, and/or mathematical operations. The processor 152 has various computing architectures to process data signals including, for example, a complex instruction set computer (CISC) architecture, a reduced instruction set computer (RISC) architecture, other architectures, an architecture implementing a combination of instruction sets, etc. The processor 152 may be physical and/or virtual, and may include a single core or plurality of processing units and/or cores, may be distributed across a computer network, etc. In some implementations, the processor 152 may be capable of generating and providing electronic display signals to a display device (not shown), supporting the display of images, capturing and transmitting images, performing complex tasks including various types of feature extraction and sampling, etc. In some implementations, the processor 152 may be coupled to the memory 154 via the bus 156 to access data and instructions therefrom and store data therein. The bus 156 may couple the processor 152 to the other components of the computing device 150 including, for example, the memory 154, and the network interface 158.

The memory 154 may store and provide access to data to the other components of the computing device 150. In some implementations, the memory 154 may store instructions and/or data that may be executed by the processor 152. For example, depending on the implementation, the memory 154 may store an instrument data application 108 and/or an instrument analysis application 116. The memory 154 is also capable of storing other instructions and data, including, for example, hardware drivers, operating systems, other software applications, databases, etc. The memory 154 may be coupled to the bus 156 for communication with the processor 152 and the other components of the computing device 150.

The memory 154 includes a non-transitory computer-usable (e.g., readable, writeable, etc.) medium that can contain, store, communicate, propagate or transport instructions, data, computer programs, software, code, routines, etc., for processing by or in connection with the processor 152. In some implementations, the memory 154 may include one or more of volatile memory and non-volatile memory. For example, the memory 154 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory 154 may be a single device or may include multiple types of devices and configurations.

The bus 156 can include a communication bus for transferring data between components of a computing device or between computing devices, a network bus system or portions thereof, a processor mesh, a combination thereof, etc. In some implementations, the instances of the instrument analysis application 116, the instrument data application 108, and various other computer programs operating in the system 100 (e.g., device drivers, etc.) may cooperate and communicate via a software communication mechanism included in or implemented in association with the bus 156, which is capable of facilitating inter-process communication, procedure calls, object brokering, direct communication, secure communication, etc.

The network interface 158 may include one or more interface devices (I/F) for wired and wireless connectivity with the other components (e.g., 106, 114, 122, etc.) of the system 100. For instance, the network interface 158 may include, but is not limited to, CAT-type interfaces; wireless transceivers for sending and receiving signals using Wi-Fi™; Bluetooth® and/or other near-field or personal area network protocols, cellular communications, etc.; USB interfaces; various combinations thereof; etc. The network interface 158 may couple to and communicate with other components of the system 100 via the network 102 and may be coupled to other components of the computing device 150 via the bus 156. In some implementations, the network interface 158 can link the processor 152 to a network, such as the network 102, which may in turn be coupled to other processing systems. The network interface 158 can send and receive data using various standard communication protocols, including, for example, those discussed elsewhere herein.

The data store 160 is an information source for storing and providing access to data. In some implementations, the data store 160 may be coupled to the components 152, 154, 158, 174, and/or 176 of the computing system 150 via the bus 156 to receive and provide access to data. In some implementations, the data store 160 may store data received from other elements 106, 114, and 122 of the system 100, and may provide data access to these entities. Examples of the types of data stored by the data store 160 may include, but are not limited to, the financial instrument data 162, recognition data 164, statistical data 168, forecast data 168, profile data 170, etc., as discussed elsewhere herein. In some implementations, the data store 160 may embody the storage 110, and/or a data store of the analysis server 122 and/or the client device 114.

The data store 160 may be included in the computing system 150 or in another computing system and/or storage system distinct from but coupled to or accessible by the computing system 150. The data store 160 can include one or more non-transitory computer-readable mediums for storing the data. In some implementations, the data store 160 may be incorporated with the memory 154 or may be distinct therefrom. In some implementations, the data store 160 may store data in association with a database management system (DBMS) operable on the computing system 150. For example, the DBMS could include a structured query language (SQL) DBMS, a NoSQL DMBS, various combinations thereof, etc. In some instances, the DBMS may store data in the data store 160 in multi-dimensional tables comprised of rows and columns, and manipulate, i.e., insert, query, update and/or delete, rows of data using programmatic operations.

The display 174 may display electronic images and data output by the computing system 150 for presentation to a user 118. The display 174 may include any conventional display device, monitor or screen, including, for example, an organic light-emitting diode (OLED) display, a liquid crystal display (LCD), etc. In some implementations, the display 174 may be a touch-screen display capable of receiving input from one or more fingers of a user 118. For example, the display 174 may be a capacitive touch-screen display capable of detecting and interpreting multiple points of contact with the display surface. In some implementations, the computing system 150 may include a graphics adapter (not shown) for rendering and outputting the images and data for presentation on display 174. The graphics adapter (not shown) may be a separate processing device including a separate processor and memory (not shown) or may be integrated with the processor 152 and memory 154.

The input device 176 may include any device for inputting information into the computing system 150. In some implementations, the input device 176 may include one or more peripheral devices. For example, the input device 176 may include a keyboard (e.g., a QWERTY keyboard), a pointing device (e.g., a mouse or touchpad), microphone, an image/video capture device (e.g., camera), etc. In some implementations, the input device 176 may include a touch-screen display capable of receiving input from the one or more fingers of the user. For instance, the structure and/or functionality of the input device 176 and the display 174 may be integrated, and a user of the computing system 150 may interact with the computing system 150 by contacting a surface of the display 174 using one or more fingers. In this example, the user could interact with an emulated (i.e., virtual or soft) keyboard displayed on the touch-screen display 174 by using fingers to contact the display in the keyboard regions.

The instrument data application 108 and the instrument analysis application 116 may be adapted for cooperation and communication with the processor 152 and other components of the computing device 150. The instrument data application 108 and the instrument analysis application 116 may include sets of instructions (e.g., software, code, etc.) executable by the processor 152 to provide their acts and/or functionality. In some instances, instrument data application 108 and the instrument analysis application 116 may be stored in the memory 154 of the computing device 150 and accessible and executable by the processor 152 to provide their acts and/or functionality.

As depicted, the instrument analysis application 118 may include a set of recognizers 182a . . . 182n (also referred to herein individually and/or collectively as 182), a data retrieval module 184, a management module 186, an analysis module 188, a forecasting module 190, and/or a user-defined pattern module 192. The instrument analysis application 118 and the components thereof may be coupled (e.g., via the processor 152) to one another and the other components of the computing system 150 for communication and interaction. In some implementations, the instrument analysis application 118, and/or its sub-components are sets of instructions executable by the processor 152 to provide their functionality. In some implementations, the instrument analysis application 118 and/or its sub-components are stored in the memory 154 of the computing system 150 and are accessible and executable by the processor 152 to provide their functionality. In any of the foregoing implementations, the instrument analysis application 118 and/or its sub-components may be adapted for cooperation and communication with the processor 152 and other components of the computing system 150.

Example Management Module

The management module 186 is computer logic executable by the process to receive user input, process and route user input to other modules, such as the data retrieval module 184, the analysis module 188, the forecasting module 190, and/or the user-defined pattern module 192. The management module 186 may be coupled to these components to send and receive data. The management module 186 may also be coupled to the data store 106 to store, retrieve, and otherwise manipulate data. The management module 186 may receive input from the user via the input device 176 and any other intervening components (e.g., the bus 156, drivers, etc.), and may provide data for display via the display 174 and any other intervening components (e.g., the bus 156, a GPU, drivers, etc.). The management module 186 may generate interfaces for display to the user using data generated by it and/or received from other components of the instrument analysis application 116, such as the data retrieval module 184, the analysis module 188, the forecasting module 190, and/or the user-defined pattern module 192. Non-limiting examples of the user interfaces that may be generated and presented to the user by the management module 186 are discussed below. The user interface module 220 may also be configured to act as a controller and signal various other components of the instrument analysis application 116 to process and/or store data.

Example Recognizers

The recognizers 182 (also referred to herein as dimension recognizers 182, event recognizers 182, pattern recognizers, etc.) include computer logic executable by the one or more processors 152 to recognize occurrences of particular financial dimensions at various points in the historical financial instrument data of financial instruments. The financial dimension including one or more distinctive qualities related to the performance of the financial instrument over time. A financial dimension for a financial instrument can include an event or a pattern (also collectively referred to simply as an event in various cases) that can occur at various points in the history of the financial instrument. For example, if the financial instrument is a stock, a financial dimension for the financial instrument can be a first trade on a given date and time, a seven day price peak, a seven day price trough, a gap up, a new trading quarter, etc. Other example financial dimensions are described below in more detail.

In some implementations, a recognizer 182 is configured to scan the financial instrument data of a financial instrument for matches between a particular financial dimension and various points in the financial instrument data, and then return recognition data describing the matches. The financial instrument data may reflect current and historical price-related data of the financial instrument. The matching may be exact or approximated (e.g., based on a matching sensitivity/threshold). For instance, financial dimensions such as earning reports, 52 week highs or lows, etc., are determinative and may not need to be approximated. Other financial dimensions, such as price trend lines, may be matched using a degree of variability and/or error so that substantially similar patterns (e.g., within a certain threshold) may still be recognized and utilized in later processing, such as price forecasting, as discussed in further detail elsewhere herein.

As a further example, in some implementations, to parse the financial instrument data for the occurrences of the financial dimension, the recognizer 182 may iteratively compare the financial dimension to the financial instrument data over time and determining a list of dates indicate locations where the financial dimensions occur within the financial instrument data and computing the historical price statistics for the set of time intervals relative to the occurrences of the financial dimension includes generating a collection of lists with price change data for the occurrences of the financial dimension.

The financial instrument data, such as stock price data or the like, can be retrieved from a data source such as the financial data server 106, and can be stored in a column-oriented internal format as illustrated below. The financial instrument data can be provided to each of the installed dimension recognizers 182. Internally, the financial instrument data provided to a dimension recognizer 182 can be formatted similar to the following subset of data:

| Date/Time Index | Open | High | Low | Close | Volume |
|---|---|---|---|---|---|
| May. 22, 1981 | 13.96875 | 13.96875 | 13.8125 | 13.84375 | 1753600 |
| May. 26, 1981 | 13.875 | 14.09375 | 13.78125 | 14.03125 | 2059600 |
| May. 27, 1981 | 14 | 14.46875 | 13.96875 | 14.46875 | 2695600 |
| May. 28, 1981 | 14.46875 | 14.625 | 14.3125 | 14.46875 | 2800800 |
| May. 29, 1981 | 14.46875 | 14.78125 | 14.46875 | 14.6875 | 3187600 |
| Jun. 1, 1981 | 14.9375 | 15.1875 | 14.9375 | 15.03125 | 4356800 |
| Jun. 2, 1981 | 15.03125 | 15.125 | 14.96875 | 14.96875 | 2990400 |
| Jun. 3, 1981 | 14.875 | 14.9375 | 14.625 | 14.78125 | 2435600 |
| Jun. 4, 1981 | 14.75 | 14.75 | 14.40625 | 14.5 | 1881200 |
| Jun. 5, 1981 | 14.5625 | 14.625 | 14.5 | 14.5625 | 1958000 |
| Jun. 8, 1981 | 14.59375 | 14.71875 | 14.5625 | 14.5625 | 1416000 |
| Jun. 9, 1981 | 14.46875 | 14.53125 | 14.28125 | 14.40625 | 1298800 |
| Jun. 10, 1981 | 14.375 | 14.5625 | 14.34375 | 14.40625 | 2202800 |
| Jun. 11, 1981 | 14.5 | 14.875 | 14.46875 | 14.75 | 2127200 |
| Jun. 12, 1981 | 14.84375 | 14.90625 | 14.6875 | 14.78125 | 3307200 |
| Jun. 15, 1981 | 14.9375 | 15.09375 | 14.90625 | 14.96875 | 2075200 |
| Jun. 16, 1981 | 14.9375 | 14.9375 | 14.6875 | 14.75 | 2974000 |
| Jun. 17, 1981 | 14.6875 | 14.71875 | 14.5 | 14.625 | 2179600 |
| Jun. 18, 1981 | 14.625 | 14.625 | 14.3125 | 14.375 | 1285600 |

However, it should be understood that in practice, the actual amount of data supplied to a dimension recognizer 182 can include financials (e.g., prices, numerous other financial data types, etc.) for numerous dates (e.g., hundreds, thousands, tens of thousands, etc.).

Each dimension recognizer 182 can be configured to recognize one or more specific financial dimensions in the financial instrument data. For example, each dimension recognizer 182 can search for one or more specific patterns or events in stock price data. Each dimension recognizer 182 can return a list of dates where the financial dimension(s), e.g., specific pattern(s) or event(s), are located within the financial instrument data, such as dates where specific data in the financial instrument data match a specific financial dimension.

In some implementations, the dimension recognizer 182 may output the matches, for example, as a list. The format of the list may include a simple list of the dates where the matches occurred, such as the following example list:

Jun. 4, 1981
Jun. 18, 1981
Jun. 26, 1981
Jun. 29, 1981
Sep. 17, 1981
Oct. 14, 1981
Nov. 6, 1981
Nov. 17, 1981
Dec. 2, 1981
Apr. 29, 1982
May 10, 1982
Aug. 5, 1982
Oct. 14, 1982

It should be understood that while the discussion, implementations, and examples provided herein utilize price data that is "daily" in nature, in some implementations, other scales or periodicity of data may be used for generating the forecasts and pattern recognition. For instance, the instrument analysis application 116 and its constituent components are configured to perform their analyses and operations using any suitable time period (e.g., ticks, 1-minute, n-minute, daily, weekly, monthly, yearly, etc.).

If a dimension recognizer 182 is unable to determine any matches between a given financial dimension and data points within the financial instrument data, the dimension recognizer 182 may provide a corresponding output, such as a null value or an empty list or data set. For example, if a dimension recognizer 182 returns an empty list of dates, then this empty list indicates that the dimension recognizer 182 did not find any occurrences of the applicable financial dimension(s) in the financial instrument data.

In some implementations, during analysis, if a given dimension recognizer 182 does not find any occurrences of the financial dimensions pertaining to it may be discarded from further processing of the financial instrument data (e.g., current price data) being analyzed. However, any dimension recognizers 182 being utilized that do find at least one occurrence of the financial dimensions pertaining to them (e.g., the dimension recognizer 182 can return at least one date describing when the event or pattern occurs) may be considered "active" recognizers 182 and the output provided by them may be further processed as described below. For example, a list of returned dates for each active recognizer 182 can be further processed by the analysis module 188 to generate price statistics data and statistical reports discussed elsewhere herein.

Example types of dimension recognizers 182 may include, but are not limited to, built-in dimension recognizers 182 and user-defined dimension recognizers 182. These dimension recognizer types are described by way of example to illustrate, but not limit, the operations and features included thereby.

Example Built-in Dimension Recognizers

A popular set of dimension recognizers 182 may be made readily available for analysis, as users frequently desire to view analysis based on them. The initial set of dimension recognizers 182 can include but are not limited to dimensions including candlestick patterns and indicators. In some implementations, the popular set of dimension recognizers 182 available to the process can be static and hard-coded into the application, although other variations are possible where the popular set may be dynamic based on user patterns over a multiplicity of users (e.g., frequently used dimension recognizers 182 may be retained while others discarded after becoming dormant), a combination of the foregoing, etc.

Example Candlestick Patterns (Paired Bullish/Bearish)

Candlestick Patterns may include 1, 2, or 3 bars with a preceding trend (up or down). They can be listed as paired patterns below, meaning one being bearish and the other being bullish and can be mirrored definitions. The candlestick patterns can be predefined functions formulated in a given language. For example, the functions may include Hammer( ), RisingWindow( ), etc. in the MetaStock™ formula language. In some cases, some functions may not contain the required trend for proper identification. For instance, the instrument analysis application 116 (also referred to colloquially as the MetaStock Forecaster™) can use the "Forecaster-Candle Trend~helper~" indicator to identify the trend. Bullish patterns can be preceded by a downtrend (Candle Trend=−1) and bearish patterns can be preceded by an uptrend (Candle Trend=1).

Example pair candlestick patterns include, but are not limited to: (1) candlestick above the stomach, candlestick below the stomach; (2) candlestick pattern big black, candlestick pattern big white; (3) candlestick pattern bullish engulfing, candlestick pattern bearish engulfing; (4) candlestick pattern hammer, candlestick pattern shooting star; (5) candlestick pattern Doji bullish, candlestick pattern Doji bearish; (6) candlestick pattern dark cloud cover, candlestick pattern piercing line; (7) candlestick pattern rising window, candlestick pattern falling window; (8) candlestick pattern bearish Harami, candlestick pattern bullish Harami, etc.

There may, in some cases, be no predefined function for the "candlestick above the stomach" pattern so the pattern may need to be written manually. The pattern can be a black candle followed by a white candle where the white candle's open is above the midpoint between the black candle's open and close. Also, there may, in some cases, be no predefined function for the "candlestick below the stomach" pattern so the pattern may need to be written manually. This pattern can be a white candle followed by a black candle where the black candle's open is below the midpoint between the white candle's open and close.

Example Indicators

This example includes the following list of example indicators from four general categories of technical indicators: a) Momentum; b) Trend; c) Volatility; and d) Strength. The instrument analysis application 116 can provide a non-collinear set of indicators, which can provide users with a more robust performance.

In some implementations, a number (e.g., most, all, etc.) of the indicators can include a condition requiring above average volume. For instance, this can be defined by a 3-period EMA of volume being greater than a 20-period SMA of volume. This is referred to as the high volume definition. This definition can be contained in a helper indicator named "Forecaster-Volume Confirmation-~helper~".

a) Momentum-Based Indicators

Example momentum-based Indicators can include, but are not limited to: (1) relative strength index (RSI); (2) commodity channel index (CCI); (3) stochastics; (4) 52 week high/low; and (5) 5 days or more up/down, etc.

Examples of relative strength index (RSI) in pairs can include, but are not limited to: (1) RSI bullish (bull event description can describe crosses above 30 on high volume), RSI bearish (bear event description can describe crosses below 70 on high volume); and (2) RSI bullish divergence (bull event description can describe the price trending down with lower highs while indicator trending up), RSI bearish divergence (bear event description can describe the price trending up with higher lowers while indicator trending down); etc.

Examples of commodity channel index (CCI) in pairs can include, but are not limited to: (1) CCI bullish (bull event description can describe 14-period crosses above −100 on high volume), CCI bearish (bear event description can describe 14-period crosses below +100 on high volume); and (2) CCI bullish divergence (bull event description can describe the price trending down with lower highs while indicator trending up), CCI bearish divergence (bear event description can describe the price trending up with higher lowers while indicator trending down); etc.

Examples of stochastics in pairs can include, but are not limited to: (1) stochastics bullish (bull event description can describe 5/3/3-period crosses above 20 on high volume), stochastics bearish (bear event description can describe 5/3/3-period crosses below 80 on high volume); and (2) stochastics bullish divergence (bull event description can describe the price trending down with lower highs while indicator trending up), stochastics bearish divergence (bear event description can describe the price trending up with higher lowers while indicator trending down); etc.

Examples of 52 week high/low can include, but are not limited to 52 week high (bull event description can describe close reaches highest value over last 250 periods), 52 week low (bearish event description can describe close reaches lowest value over last 250 periods); etc.

Examples of 5 days or more up/down can include, but are not limited to: 5 days or more up (bull event description can describe the closing price has increased over 5 or more consecutive days on increasing volume), 5 days or more down (e.g., bear event description can describe the closing price has increased over 5 or more consecutive days on increasing volume); etc.

b) Trend-Based Indicators

Example trend-based indicators can include, but are not limited to: (1) moving average; (2) double moving average crossovers; (3) moving average leaps; (4) triple moving average crossover; (5) moving average convergence/divergence (MACD); and (6) trend surge; etc.

Examples of moving average can include, but are not limited to, moving average 200 cross bullish, moving average 50 cross bullish, etc. Bull event description can describe when close crosses above moving average (MA) on high volume and bear event description can describe when close crosses below MA on high volume.

Examples of double moving average crossovers in pairs can include, but are not limited to: (1) moving average 10/40 bearish, moving average 10/40 bullish; (2) moving average 3/10 bearish, moving average 3/10 bullish; and (3) moving average 40/200 bearish, moving average 40/200 bullish; etc. Bull event description can describe when shorter moving average (MA) crosses longer MA on high volume and bear event description can when describe shorter MA crosses longer MA on high volume.

Examples of moving average leaps in pairs can include, but are not limited to: (1) moving average 200 leap bearish, moving average 200 leap bullish; and (2) moving average 50 leap bearish, moving average 50 leap bullish; etc. Bull event description can describe prices gap above the moving average (50 or 200) on high volume (where high volume in this case is volume being above its 20 period MA) and bear event description can describe prices gap below the moving average (50 or 200) on high volume (where high volume in this case is volume being above its 20 period MA).

Examples of triple moving average crossover can include, but are not limited to, moving average triple X bearish, moving average triple X bullish, etc. Bull event description can describe: (1) a 5 period EMA greater than a 15 period EMA with the 1 period rate of change of the 40 period EMA being positive; (2) the price event occurs when the close crosses above the 40 period EMA; (3) that this price event must be confirmed by a volume event using the same 5, 15, and 40 period moving averages—but of volume rather than price; etc. Bear event description can describe: (1) a 5 period EMA less than a 15 period EMA with the 1 period rate of change of the 40 period EMA being negative; (2) the price event occurs when the close crosses below the 40 period EMA; (3) that this price event must be confirmed by a volume event using the same 5, 15, and 40 period moving averages—but of volume rather than price; etc.

Examples of MACD in pairs can include, but are not limited to: (1) MACD bullish (bull event description can describe when MACD crosses above a 9-day EMA of MACD on high volume), MACD bearish (bear event description can describe when MACD crosses below a 9-day EMA of MACD on high volume); and (2) MACD bullish divergence (bull event description can describe price trending down with lower highs while indicator trending up), MACD bearish divergence (bear event description can describe price trending up with higher lowers while indicator trending down); etc.

Examples of trend surge can include, but are not limited to trend surge bullish (bull event description can describe trend changes to significant uptrend on high volume), trend surge bearish (bear event description can describe trend changes to significant downtrend on high volume), etc.

An example MetaStock™ formula for "trend surge bullish . . . " can include:

{Slope Normalized}
slope:=LinRegSlope(C, 5);
NormalizedTrend:=((slope-LLV(slope,50))/(HHV(slope, 50)-LLV(slope,50)))*100;
{Determine if Significant Uptrend or Downtrend}
upTrend:=NormalizedTrend>=60 AND RSquared(C,5) >=0.77;
downTrend:=NormalizedTrend<=40 AND RSquared(C, 5)>=0.77;
trend:=If(upTrend,1,If(downTrend,−1,0));
trend=1 AND Ref(trend,−1)<1 AND V>Mov(V,20,S).

An example MetaStock™ formula for "trend surge bearish . . . " can include:

{Slope Normalized}
slope:=LinRegSlope(C, 5);

NormalizedTrend:=((slope−LLV(slope,50))/(HHV(slope, 50)−LLV(slope,50)))*100;
{Determine if Significant Uptrend or Downtrend}
upTrend:=NormalizedTrend>=60 AND RSquared(C,5) >=0.77;
downTrend:=NormalizedTrend<=40 AND RSquared(C,5)>=0.77;
trend:=If(upTrend,1,If(downTrend,−1,0));
trend=−1 AND Ref(trend,−1)>−1 AND V>Mov(V,20,S)

c) Volatility-Based Indicators

Example volatility-based indicators can include, but are not limited to: (1) Bollinger bands; and (2) Chaikin volatility; etc.

Examples of Bollinger bands can include, but are not limited to: Bollinger breakout bullish, Bollinger breakout bearish, etc. The bull event description can describe a Bollinger band width below "5" followed by a close above upper band on high volume and the bear event description can describe a Bollinger band width below "5" followed by a close below lower band on high volume. An example MetaStock formula for Bollinger band (BBand) width can include:

100*((BBandTop(C,20,S,2)−BBandBot(C,20,S,2))/ Mov(C,20,S)).

Examples of Chaikin volatility can include, but are not limited to, Chaikin volatility bullish, etc. The bull event description can describe 10/10 CVI turns down as the linear regression slope turns up and there may, in some cases, be no bearish event or exploration for this indicator.

d) Volume-Based (Strength) Indicators

Examples of volume-based indicators can include, but are not limited to: (1) money flow index (MFI); and (2) Chaikin A/D oscillator; etc.

Examples of MFI in pairs can include, but are not limited to: (1) MFI bullish (bull event description can describe when 14-period MFI crosses above 20 on high volume), MFI bearish (bear event description can describe 14-period when MFI crosses below 80 on high volume); and (2) MFI bullish divergence, (bull event description can describe price trending down with lower highs while indicator trending up), MFI bearish divergence (bear event description can describe price trending up with higher lowers while indicator trending down); etc.

Examples of Chaikin A/D oscillator in pairs can include, but are not limited to: (1) Chaikin A/D Osc. bullish (bull event description can describe CO turns up while below zero and while in a significant uptrend on high volume), Chaikin A/D Osc. bearish (bearish event description can describe CO turns down while above zero and while in a significant downtrend on high volume); and (2) Chaikin A/D bullish divergence (bull event description can describe price trending down with lower highs while indicator trending up), Chaikin A/D bearish divergence (bearish event description can describe price trending up with higher lowers while indicator trending down); etc.

Other Example Dimension Recognizers

Other example dimension recognizers 182 can include, but are not limited to triple witching, full moon, and new moon, etc.

Triple Witching can mean an event that occurs when the contracts for stock index futures, stock index options and stock options all expire on the same day. Triple witching days may happen four times a year, such as on the third Friday of March, June, September, and December.

Full Moon can mean the time interval between similar lunar phases—the synodic month—and can average about 29.53 days. Therefore, in those lunar calendars in which each month begins on the new moon, the full moon falls on either the 14th or 15th of the lunar month. Because lunar months have a whole number of days, lunar months may be either 29 or 30 days long.

New Moon: the time interval between new moons—a lunation—is variable. The mean time between new moons, the synodic month, is about 29.53 . . . days.

User-Defined Pattern Module and Example User-Defined Patterns and Dimension Recognizers The user-defined pattern module 192 includes computer logic executable by the processor 152 to allow users to define custom patterns that can be used in the analysis and forecasting of the performance of a financial instrument. The user-defined pattern module 192 is coupled to the management module 186 to receive pattern-related user input, such as pattern definitions; executable to provide interface data for display via the management module 186 including pattern-related data and interactive pattern definition interface elements; coupled to the data store 160 to store the pattern-definitions in the data store 160 in association with the corresponding user's user profile (stored as profile data 170); etc.

Example methods associated with defining and processing user-defined patterns, as well as processing financial instrument data using the user-defined patterns, are discussed in further detail below with reference to at least FIGS. 17-21.

In some implementations, the user-defined pattern module 192 may be configured to receive, store, and/or process pattern data defining a pattern input by a user as pattern data 172 (e.g., pattern isolated form a price chart, pattern drawn by the user using the canvas/drawing window, etc.). In some implementations, the pattern data 172 may be stored in association with the recognizer 182 to which it corresponds. In some instances, when a user creates a new pattern, the user-defined pattern module 192 may generate a corresponding recognizer 182 and add it to the built-in recognizer list for the user to select/use at a later time. The recognizers 182 generated based on user-defined pattern may be configured to scan financial instrument data and produce a hash (e.g., price pattern hash object) that defines a hash-value for the pattern, which can be compared to corresponding hash-values iteratively generated when analyzing a given set of financial instrument data, as discussed elsewhere herein. The recognizers 182 are also configured to determine if the user-defined pattern is a close match to the patterns isolated from the financial instrument data. In some instances, the recognizers 182 may be configured to use an approximation algorithm, such as a Chi-Square test (as described elsewhere herein) on the hash-values to determine "goodness of fit".

Figure 10A:
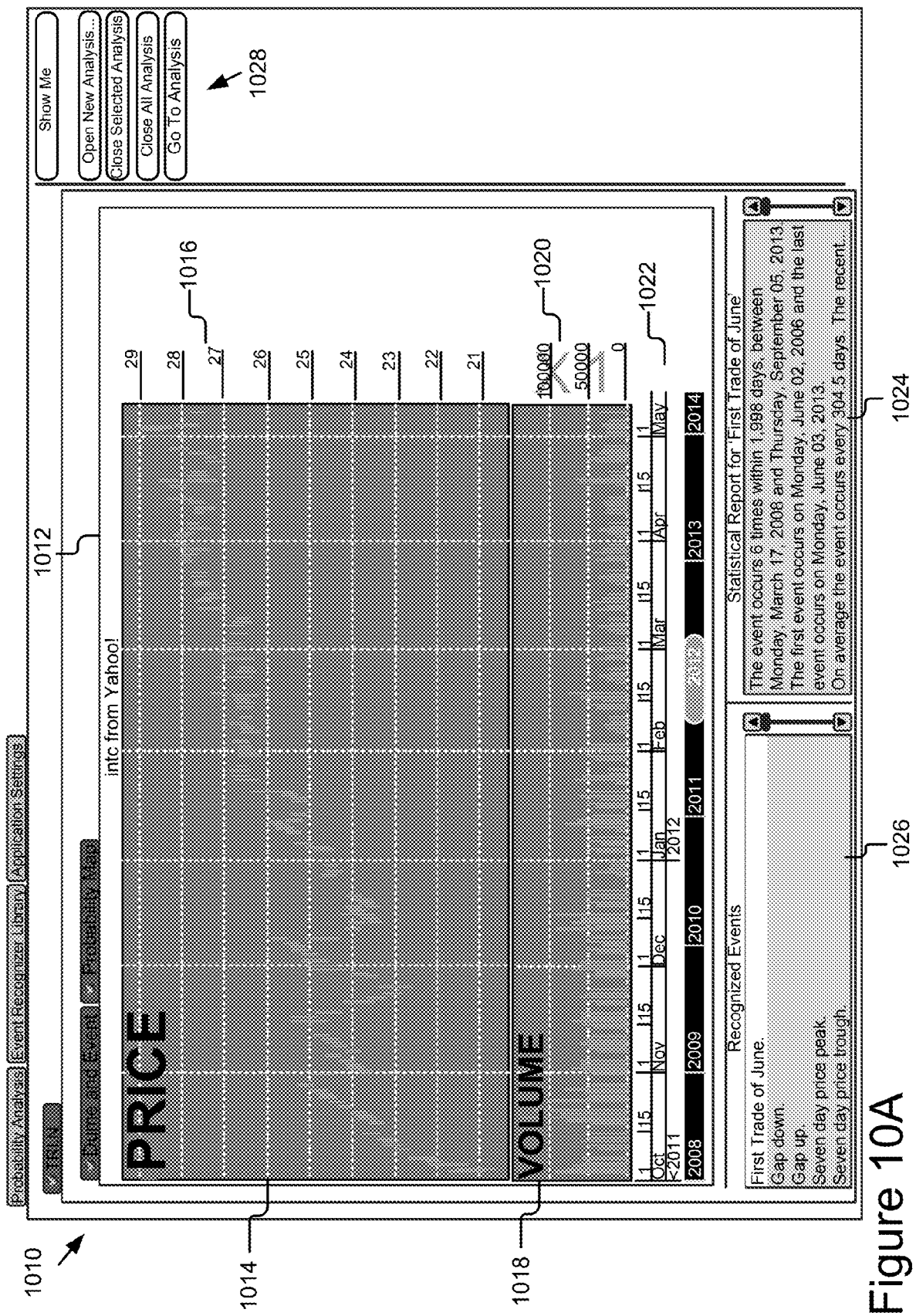
FIG. 10A is a graphical representation of an example graphical user interface including a price chart for a stock.
Figure 10B:
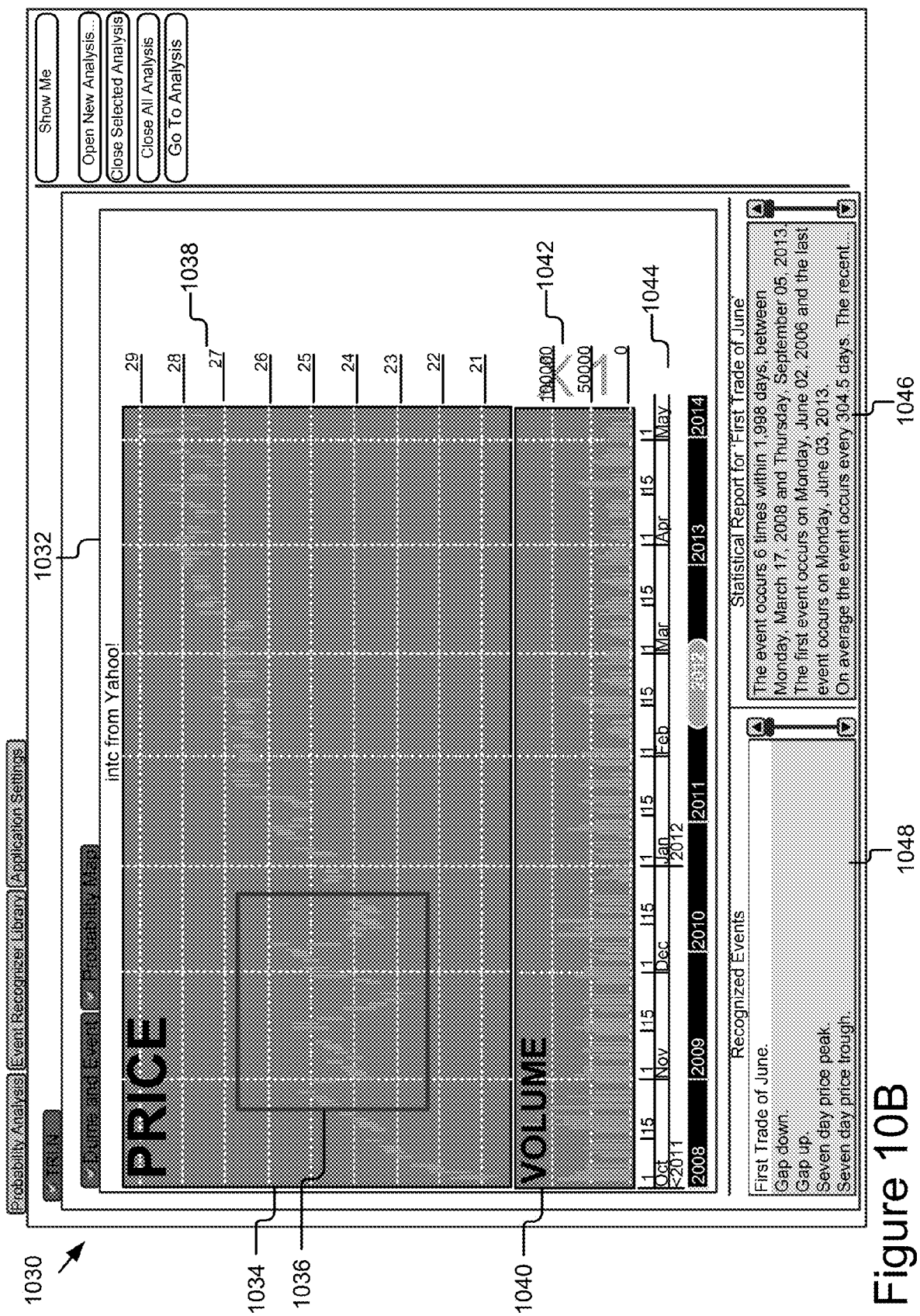
FIG. 10B is a graphical representation of an example graphical user interface including a price chart where a selection rectangle has been drawn by a user around the prices that form a desired pattern.

In some implementations, a user can define a financial dimension (such as a pattern or an event) for a dimension recognizer 182 from a price chart provided for display by the management module 186. The price chart may be a chart for a financial instrument specified by the user. For example, FIG. 10A illustrates a price chart 1014 for a stock that can be presented to a user. Using the interface 1010 generated and provided for display by the management module 186, the user can visually identify a pattern in the prices that he or she may be interested in. For example, the user can use a pointer device (e.g., mouse) to draw a selection rectangle 1036 around the prices that form the pattern as illustrated in FIG. 10B, or one or more fingers to indicate the boundaries of a rectangle 1036 using a touchscreen interface, and the management module 186 may receive and provide the input to the user-defined pattern module 192, to which it is coupled, for further processing.

In some implementations, once a range of prices has been selected by the user, the user-defined pattern module 192 can receive the pattern definition data describing the selection from the management module 186 and generate and save a new recognizer 182 based on the pattern definition data, which is executable to identify patterns similar to the one that was selected. This recognizer 182 can utilize a set of pattern-matching algorithms to find those patterns that are similar to but not necessarily identical to the selected pattern. For example, the recognizer 182 can find patterns that match the selected pattern. The user can change the "sensitivity" of the pattern matching algorithms. A higher sensitivity may require a closer match to the pattern while a lower sensitivity may be more permissive in finding similar patterns. High sensitivities can reduce the "false positives" that may be encountered during the pattern matching.

Figure 10C:
FIG. 10C is a graphical representation of an example financial dimension defined by a user using a free form canvas.

In some implementations, a user can provide a free-form definition for the financial dimension using an interface associated with the user-defined pattern module 192. For example, the user can define a financial dimension using a free form canvas as illustrated in FIG. 10C. Additional examples of user interfaces for inputting a user-defined pattern are described with reference to FIGS. 22-23D, for example.

The user can be presented with a "definition canvas", where the user can freely draw a pattern using the mouse. After the user draws the pattern, the instrument analysis application 116 can generate and save a new recognizer 182 to identify similar patterns to the one just drawn by the user. The recognizer 182 can utilize a set of pattern-matching algorithms to find those patterns that are similar to but not necessarily identical to the selected pattern. A user can also copy, rename or delete previously saved patterns. For instance, the user may use the same controls and/or interface to edit/modify a previously saved pattern. The user can change the "sensitivity" of the pattern matching algorithms. A higher sensitivity may require a closer match to the pattern while a lower sensitivity may be more permissive in finding similar patterns. High sensitivities can reduce the "false positives" that may be encountered during the pattern matching.

In some implementations, the user can define a pattern by coding their own individual pattern definition data and input the custom code-based pattern definition data into the user-defined pattern module 192, which may then interpret the code and generate a dimension recognizer 182 based thereon to process financial instrument data with as discussed elsewhere herein. In some implementations, the code embodying the pattern definition data may be formatted using a predetermined syntax (e.g., a predetermined programming language) and the user-defined pattern module 192 can receive the code and interpret it based on the syntax. In some implementations, the code may be input using a command line operation or using an interface provided by the management module 186 for indicating where a file including the code is located and triggering execution of the code by the user-defined pattern module 192.

Analysis Module and Example Statistical Evaluation

The analysis module 188 includes computer logic executable to computing historical price statistics for a set of time intervals relative to occurrences of the financial dimension. In some implementations, the analysis module 188 may be configured to store the data generated by it in the data store 160 as statistical data 166 and/or provide this data to other components of the system. Examples of operations the analysis module 188 may be configured to perform are described in detail with reference to at least FIGS. 12A-14B.

In some implementations, for each of the active recognizers 182 that have found one or more instances of the financial dimension they are designed to find, the analysis module 188 may computer various basic statistical calculations. The statistical calculations can be performed for each of the active recognizers 182 independently or for two or more active recognizers 182 collectively.

By way of illustration, at least the following example values can be calculated for each of the active recognizers 182.

(1) Elapsed days: the number of calendar days between the first day of financial instrument data such as financial instrument data and the last day of financial instrument data that was examined.

(2) A dimension count such (e.g., an event count): the number of times the recognizer 182 identified its specific financial dimension in the financial instrument data.

(3) A first dimension date (e.g., a first event date): the date of the first identified instance of the financial dimension.

(4) A last dimension date (e.g., a last event date): the date of the last identified instance of the financial dimension.

(5) A dimension mean frequency (e.g., an event mean frequency): the statistical mean of the number of days between instances of the financial dimension.

(6) A dimension frequency change (e.g., event frequency change): a determination if the frequency of the recognized instances of the financial dimension is increasing, decreasing, or remaining approximately unchanged.

(7) A longest gap between dimensions (e.g., longest gap between instances of the event): the longest period of time, in days, between recognized instances of the financial dimension.

(8) A shortest gap between dimensions (e.g., shortest gap between instances of the event): the shortest period of time, in days, between recognized instances of the financial dimension.

(9) A distribution of instances of the dimension (e.g., pattern).

(10) Price statistics N-days out.

Non-limiting examples of identifying dimension frequency change, the distribution of instances, and the price statistics N-days out are discussed in further detail below.

Identification of Event Frequency Change

In some implementations, the analysis module 188 can identify the dimension frequency change by performing the following example operations:

(1) The analysis module 188 can determine how many times the dimension occurs in a short term period (e.g., the last 180 days).

(2) The analysis module 188 can determine how many times the dimension occurs in a long term period (e.g., the last 720 days).

(3) If no occurrences of the dimension were seen within the long term period, the analysis module 188 can skip the frequency change calculation with a "no recent dimensions" message.

(4) The analysis module 188 can calculate the mean number of occurrences of the dimension per a certain interval (e.g., 30 days) for the short term period (e.g., 180 days) and the long-term period (e.g., 720 days).

(5) The analysis module 188 can calculate a percent difference (PctDiff) between the two mean values by evaluating:

$$PctDiff=(shortTermMean-longTermMean)/longTermMean.$$

(6) The instrument analysis application 116 can generate an interpretation of the PctDiff value using, for example, the following logic:

```
If (Abs(PctDiff) > 0.5)
   If (shortTermMean > longTermMean)
      "increasing rapidly"
   Else
      "decreasing rapidly"
Else if (Abs(pctDiff) > 0.25)
   If (shortTermMean > longTermMean)
      "increasing"
   Else
      "decreasing"
Else if (Abs(pctDiff) > 0.1)
   If (shortTermMean > longTermMean)
      "increasing slightly"
   Else
      "decreasing slightly"
Else
   "relatively unchanged"
EndIf
```

A further example method 1300 for determining a dimension frequency change, such as a dimension frequency change, is illustrated with reference to FIGS. 13A-13B, and discussed in further detail elsewhere herein.

Example Dimension Distribution

In some implementations, the analysis module 188 can determine the distribution of instances of financial dimensions recognized at different points in time in the financial instrument data by a recognizer 182, such as if the instances of a given dimension are randomly distributed or have some type of cyclical distribution (e.g., nature, pattern, etc.). For example, the analysis module 188 may determine the relative frequency of each financial dimension instance, sort the instances by frequency, group instances having corresponding frequencies (e.g., within a certain distance or threshold) into groupings of zero or more instances, and determine based on the groupings whether the distribution is random or follows a recognizable pattern (e.g., is cyclical).

By way of further example, the analysis module 188 can determine if there is a cyclical nature to the instances of the dimension by performing the following operations, for example.

(1) The analysis module 188 can create a list of gap lengths. This list includes all of the gap lengths, in days, that exist between the recognized instances of the dimension. For example, the list may include:

1, 2, 2, 3, 5, 3, 2, 6, 7 . . .

Note that, in some cases, the numbers in the list are not unique. If there are two gaps of 2 days encountered, there may be two values of 2 in the gap length list.

(2) The analysis module 188 can create a set of bins to hold gap length values. Initially the bins can be set up to hold a single gap length value such as:

Bin1: Holds a count of gap lengths equal to 1.
Bin2: Holds a count of gap lengths equal to 2.
Bin3: Holds a count of gap lengths equal to 3.
Bin4: Holds a count of gap lengths equal to 4.
Binx: Holds a count of gap lengths equal to the largest gap seen.

(3) The analysis module 188 can sort the gap lengths into appropriate bins. All of the gap lengths stored in the gap length list can be stored in their appropriate bins:

Bin1: Contains 1 because there was 1 gap of length 1 in the list.
Bin2: Contains 3 because there were 3 gaps of length 2 in the list.
Bin3: Contains 2 because there were 2 gaps of length 3 in the list.
Bin4: Contains 0 because no gaps of length 4 were in the list.
Bin5: Contains 1 because 1 gap of length 5 was in the list.
Bin6: Contains 1 because 1 gap of length 6 was in the list.
Bin7: Contains 1 because 1 gap of length 7 was in the list.

(4) The analysis module 188 can examine the counts in the bins. If any particular bin contains more entries than all other bins combined, that bin may be determined to contain the cyclic tendency of the patterns. As an example, if a bin that is holding values for a gap of 5 has more entries than all other bins combined, the instances of the recognized financial dimension can be considered to have a cyclic tendency to occur in 5-day increments and the cycle identification loop terminates. Note that at this stage of the algorithm, things may have looped back to this point if none of the bins contained an outstanding number of entries but the bins have been modified to hold a range of gap values. As an example, on a subsequent iteration of the loop, a bin holding a range of gap values from 15 to 20 may have an outstanding number of entries, indicating the cyclic nature of the financial dimension lies somewhere between 15 and 20 days.

(5) The analysis module 188 can check for a random distribution. If none of the bins had an outstanding number of gap entries (relative to the other bins), a check for a random distribution can be made. In some cases, if there is a random distribution of the gaps (indicating a random occurrence of the financial dimension) each bin should contain a relatively equal number of gaps. An absolute equality of the number of gaps in each bin is not required. To do this, a "chi-square", "goodness of fit" algorithm can be used to see if the number of gaps in each bin is sufficiently close to what would be expected to be seen in each bin. The goodness of fit calculations are described below in more detail.

If the gap lengths are distributed randomly, each bin may have the same number of gaps and the number of gaps in each bin may be equal to the total number of recognized instances of the financial dimension divided by the number of bins. For example, if 24 instances of the financial dimension are recognized and there are 3 bins, each bin would be expected to hold 8 gaps. If the combined deviations of each bin count from the expected bin count for a random distribution is smaller than a threshold value, the cycle may be terminated and the distribution of the instances of the financial dimension may be determined to be random. If the combined deviations of each bin count from the expected bin count for a random distribution, the cycle may continue with larger bins.

(6) The analysis module 188 can increase bin size. For example, if no bins contain an outstanding number of gaps and the distribution of the counts in all of the bins is determined not to be random, the bin sizes may be increased. On the first iteration of this loop, the bin sizes may be 1, meaning that the first bin contains a count of the gaps with 1 day and the second bin contains a count of the gaps with 2 days, and so on and so forth. For example:

Bin1: Holds a count of gap lengths equal to 1.
Bin2: Holds a count of gap lengths equal to 2.
Bin3: Holds a count of gap lengths equal to 3.
Bin4: Holds a count of gap lengths equal to 4.
Binx: Holds a count of gap lengths equal to the largest gap seen.

On the second iteration, the first bin may hold a count of the gaps with 1 or 2 days, while the second bin may contain a count of the gaps with 3 or 4 days, and so on and so forth:

Bin1: Holds a count of gaps with 1 OR 2 days.
Bin2: Holds a count of gaps with 3 OR 4 days.
Bin3: Holds a count of the gaps with 5 or 6 days.

On the third iteration (if required), the first bin may hold a count of the gaps with 1 or 2 or 3 or 4 days while the second bin may hold a count of the gaps with 5 or 6 or 7 or 8 days, and so on and so forth.

Once this bin range has been increased, the algorithm may return to operation (3) above to re-sort the gap lengths into appropriate bins and continues to perform similar operations.

A further example method for determining a distribution of a financial dimension such as a distribution of a financial dimension is illustrated with reference to FIGS. 14A-14B, and discussed in further detail herein.

In some implementations, if there are less than a certain minimum number of instances, (e.g., 5) of the financial dimension identified by the recognizer, the analysis module 188 may determine to skip the distribution analysis. For instance, the analysis module 188 may trigger presentation of an "insufficient instances of the dimension" message.

Goodness of Fit Calculations

When testing for a random distribution of financial dimensions as described above, a chi-square, "goodness of fit" method may be used. The algorithm used to determine a goodness of fit may be based on the mathematical techniques discussed in the following document:

http://www.cimt.plymouth.ac.uk/projects/mepres/alevel/fstats_ch5.pdf, which is incorporated herein by reference in its entirety.

Assuming there were 20 events identified and the gap lengths were sorted into 5 bins, a random distribution of events would produce 4 gaps in each bin. Since a perfect distribution of this type may be extremely rare, a "close enough" condition is tested for by using the techniques mentioned in the document above.

The deviation of the actual count in each bin may be calculated and compared to the expected count of gaps in each bin. This aggregate deviation may be used along with a "degree of freedom" value equal to the number of bins-1 and a value may be searched for in a chi-square distribution table using a 95% sensitivity. If the calculated chi-square value is less than the "critical value" returned from the chi-square table, a match in the patterns may be assumed. This means, in this context, that a random distribution of events or patterns exists.

Calculation of Price Statistics N-Days Out

In some implementations, the analysis module 188 can compute historical price statistics for a set of time intervals relative to occurrences of a financial dimension. For example, the analysis module 188 can calculate price statistics N-days out.

The results from each active recognizer 182 can be analyzed individually for statistical data on prices that occur on a certain number of days (e.g., 7, 14, 30, 60, 90, and 180 days) after each of the marked dimensions. In some cases, these days may be arbitrarily chosen and can be modified (e.g., as pre-defined variables in the code) as desired.

For each of the recognized dimension dates, the closing prices of the analyzed data can be converted to percent changes from the close on the date the dimension was recognized. For example, suppose a recognizer 182 identified a dimension on January 2 when the closing price was 10.0. The closing prices at the desired "days out" can be converted to percent change values as follows:

| Date | Closing Price | Percent Change |
|---|---|---|
| January 2 | 10.0 | — |
| January 2 + 7 Days | 10.3 | +0.03 |
| January 2 + 14 Days | 11.4 | +0.14 |
| January 2 + 30 Days | 9.9 | −0.01 |
| Etc . . . | | |

This process can be completed for each of the dates where a specific recognizer 182 identified the given financial dimension.

Once complete, the date ranges and price percent change values can be collected. For example, this information can be collected for each point (in each instance) where a dimension or event was recognized by a given recognizer. The data can be arranged as follows:

| | Event1 | Event2 | Event3 | . . . |
|---|---|---|---|---|
| Recognized Date + 7 | 0.13 | 0.09 | 0.01 | . . . |
| Recognized Date + 14 | 0.25 | 0.10 | 0.08 | . . . |
| Recognized Date + 30 | 0.20 | 0.03 | 0.10 | . . . |
| Recognized Date + 60 | 0.21 | −0.03 | 0.10 | . . . |
| Recognized Date + 90 | 0.19 | −0.05 | 0.07 | . . . |
| Recognized Date + 180 | 0.22 | 0.0 | 0.08 | . . . |

In this example, each of the values in the table represents a percent change of a closing price for that date when compared to the closing price when the financial dimension was recognized (e.g., Event1, Event2, Event 3, . . . ). In some cases, there is a column of data for each financial dimension instances that was recognized. For each of the Recognized Date+ 'x' rows of data, the analysis module 188 can calculate the following example statistical values.

(1) Mean percent change: the mean value of the percent change. For example, using the above data table, the mean percent change for Recognized Date+7 would be calculated as:

(0.13+0.09+0.01+ . . . )/totalEventsRecognized.

(2) Standard deviation of percent change: a standard deviation calculation of the percent change values is calculated. For example, a standard deviation for Recognized Date+7 would be calculated using:
0.13, 0.09, 0.01 . . .

(3) Margin of error for percent change: a percent margin of error for the percent change values is calculated. This can reflect a value influenced by the number of instances of the financial dimension (e.g., dimensions) found and the number of days of data that were initially examined. An example formula for the calculation can include:

(0.98) sqrt( (p − s) / ( (p * s) − s))
Where:
  p = population size
  s = sample size
Where:
  population size = numberOfDaysExamined − daysBeyondRecognitionDate
  sample size = numberOfPatternsOrEventsFound Generation of Statistical Report In some implementations, the analysis module 188 can generate an interpreted report or a tabular report. In some additional implementations, the analysis module 188 can generate a report in any other formats such as a list, a graph, etc.

Generation of Interpreted Report

Using the statistical data produced above, a report for each active recognizer 182 can be generated by the analysis module 188 summarizing the recognizer's findings. The report may vary based on the nature of the dimension being recognized, the number of instances, found, the financial data that was analyzed, etc. For example, the analysis module 188 may generate a report analogous to the following (e.g., based on the financial dimension(s) applicable to the recognizer):

The dimension occurs 5 times within 4,329 days, between Monday, Oct. 29, 2001 and Thursday, Sep. 5, 2013. The first dimension occurs on Thursday, Mar. 13, 2008 and the last dimension occurs on Tuesday, Feb. 24, 2009.

On average, the dimension occurs every 69.6 days. There are no occurrences of the dimension within the last 180 days so an analysis of recent dimension frequency is unavailable.

The shortest gap between dimensions is 42 days and the longest gap is 158 days. There are not enough instances of the dimension in the price data to determine if they occur in a definitive cycle.

Statistically, 7 days after the dimension occurs and with a probability of 95%, the closing price appears to be about 6.20% lower with a standard deviation of 0.0486. The statistical margin of error is approximately 44%.

Statistically, 14 days after the dimension occurs and with a probability of 95%, the closing price appears to be about 8.10% lower with a standard deviation of 0.0658. The statistical margin of error is approximately 44%.

Statistically, 30 days after the dimension occurs and with a probability of 95%, the closing price appears to be about 7.06% lower with a standard deviation of 0.1011. The statistical margin of error is approximately 44%.

Statistically, 60 days after the dimension occurs and with a probability of 95%, the closing price appears to be about 12.95% lower with a standard deviation of 0.1431. The statistical margin of error is approximately 44%.

Statistically, 90 days after the dimension occurs and with a probability of 95%, the closing price appears to be about 10.41% lower with a standard deviation of 0.1698. The statistical margin of error is approximately 44%.

Statistically, 180 days after the dimension occurs and with a probability of 95%, the closing price appears to be about 15.29% lower with a standard deviation of 0.2257. The statistical margin of error is approximately 44%.

Report generated: Thursday, Sep. 5, 2013 12:26 PM.

In some instances, a user may access the interpreted report by selecting a corresponding active recognizer 182 via his/her display.

Generation of Tabular Report

Using the statistical data, such as that produced in the interpreted report, each active recognizer 182 can generate a table-formatted report with the following example entries:

(1) days examined: the number of days of financial instrument data examined by the recognizer.

(2) dimension count: the number of instances of the financial dimension identified by the recognizer 182 while examining the financial instrument data.

(3) first examined date: the date of the first financial instrument data examined by the recognizer.

(4) last examined date: the date of the last financial instrument data examined by the recognizer.

(5) first dimension date: the date of the first identified occurrence/instance of the financial dimension.

(6) last dimension date: the date of the last identified occurrence/instance of the financial dimension.

(7) long term dimension frequency: the mean number of dimension occurrences per month over the last 720 days of financial instrument data examined.

(8) short term dimension frequency: the mean number of dimension occurrences per month over the last 180 days of financial instrument data examined.

(9) dimension frequency change: a short description of how the dimension frequency is changing: unchanged; increasing; increasing slightly; increasing rapidly; decreasing; decreasing slightly; or decreasing rapidly.

(10) shortest dimension gap: the smallest number of days encountered between identified occurrences.

(11) longest dimension gap: the largest number of days encountered between identified occurrences.

(12) dimension distribution: a short description of the apparent distribution of the occurrences: random; 'x' days; or between 'x' and 'y' days.

(13) N-day statistical data: for each of 7, 14, 30, 60, 90 and 180 days beyond recognized occurrences, the analysis module 188 can calculate:

(a) probability: the statistical probability of the specified price change, n-days beyond the dimension recognition date;

(b) mean price percent change: the average price change from the date when the dimension was recognized to n-days beyond the dimension recognition date;

(c) standard deviation price percent change: the standard deviation of the price percent change from the date when the dimension was recognized to n-days beyond the dimension recognition date; and (d) margin of error for price percent change: the statistical margin of error for the data.

Each report may include a report generation date, which is the date the report was generated.

In some cases, the statistical analysis is based on all of the recognized financial dimension points in that time period. In some implementations, the statistical analysis may be computed using the following procedure.

In some implementations, the analysis module 188 may be configured to generate Elapsed Days vs. Percent Price Change Lists. A table of relative days vs. price change values can be is created for each of the recognized instances of the dimension. As previously described, each recognizer 182 can produce a list of dates that corresponds to the points where a dimension was identified. For each of those dates, the analysis module 188 may generate the following example representative transformation of date vs. closing price data:

|  | Date | Closing Price | Elapsed Days | Percent Price Change |
|---|---|---|---|---|
| Date Dimension Recognized | January 10 | 15.0 | — | — |
|  | January 11 | 15.75 | 1 | 5.00 |
|  | January 12 | 15.62 | 2 | 4.13 |
|  | January 15 | 16.03 | 5 | 6.86 |
|  | January 16 | 15.82 | 6 | 5.46 |
|  | ... | ... | ... | ... |
|  | January 10 + 180 days | 17.30 | 180 | 15.33 |

As a result, a collection of lists may be produced, with each list containing a set of Elapsed Days vs. Percent Price Change values for a specific recognized dimension instance. For example, if a recognizer 182 identifies 3 instances of a dimension, the analysis module 188 may produce 3 lists of Elapsed Days vs. Percent Price Change values, one for each instance. The following example table provides an example representation of this information.

| First Instance | | Second Instance | | Third Instance | |
|---|---|---|---|---|---|
| Elapsed Days | Percent Chg | Elapsed Days | Percent Chg | Elapsed Days | Percent Chg |
| 1 | 5.00 | 1 | 2.75 | 1 | 3.0 |
| 2 | 4.13 | 2 | 1.89 | 2 | 3.0 |
| 5 | 6.86 | 5 | 0.81 | 5 | 2.5 |
| 6 | 5.46 | 6 | −0.30 | 6 | 3.75 |
| ... | ... | ... | ... | ... | ... |
| 180 | 15.33 | 180 | −4.75 | 180 | 5.50 |

In a further example, if a given recognizer 182 had identified 100 instances of the dimension, the statistical analysis may produce 100 corresponding lists of Elapsed Days vs. Percent Change pairs of values.

A further example method for generating a probability map is described below with reference to FIGS. 15A-15B. Example Forecasting Module and Generation of Probability Map The forecasting module 190 includes computer logic executable by the processor 152 to forecast the performance of a financial instrument based on financial dimension occurrences recognized in financial instrument data of that financial instrument. In some implementations, the forecasting module 190 uses statistics, as generated by the analysis module 188, which describe the performance of the financial instrument on and after the occurrences of the financial dimension(s), to generate the performance forecast. The forecasting module 190 may be coupled to the recognizers 182 to receive recognition data 164 describing the instances of financial dimension(s), instance-related information, etc.; coupled to the analysis module 188 to receive statistical data 166 describing statistics associated with the financial instrument and financial dimension instance(s)/recognition data 162; and/or coupled to the data retrieval module 184 to receive financial instrument data. The forecasting module 190 may additionally or alternatively retrieve the above data from another data source, such as the data store 160.

By way of further example, in some implementations, once a given recognizer 182 has identified the instances (e.g., specific dates) where a dimension occurs and the analysis module 188 has computed the corresponding statistics, the forecasting module 190 generates that shows an aggregate statistical analysis of what prices have done up to a predetermined number of days (e.g., 180) beyond the point where each instance of the dimension was identified.

In some implementations, the forecasting module 192 may store the forecasts generated by it, along with associated data, in the data store 160 as forecast data 168 for alter access and/or retrieval by it, the management module 186, or another component. The forecasting module 192 may also provide this data directly to other modules.

In some implementations, the forecasting module 192 may be configured to generate a collection of lists based on the dates of the occurrences of the financial dimension, where each of the lists including a set of elapsed periods and price percent change values, and then map each of the lists to a base grid using the elapsed periods and price percent change value. The forecasting module 192 may then combine each of the lists into a composite grid.

By way of further example and not limitation, the forecasting module 190 may be configured to map the collection of lists received from the analysis module 188. In some implementations, the forecasting module 190 may map the Elapsed Days vs. Percent Change Values statistics onto a multidimensional grids. For instance, for each of the Elapsed Days vs. Percent Change lists of values, a 2-dimensional array of floating point values can be created. All values in the array are initialized to a base value (e.g., zero).

The size of the array may be predetermined. In some cases, it may have n x n elements and may have any size suitable to provide the requisite resolution. A larger array may yield forecasting subtleties that are not present in smaller arrays. For instance, an array of a larger size can ultimately result in the production of a probability map image with deeper visual resolution. Smaller array sizes can result in faster map-image generation, but sometimes at the expense of visual resolution. In addition, a larger array may allow a user to zoom in and analyze different aspect of the probability map generated based on the arrays. Non-limiting example sizes include 10,000×10,000 elements, 5,000×5,000 elements, 1000×1000 elements, 100×100 elements, although virtually any other size are also contemplated provided. In some implementations, the size of the array is determined based on a balance between performance (e.g., little to no processing lag to the user) and data resolution. In various example cases, values of 75×75 and 50×50 have produced reliable results.

Figure 2A:
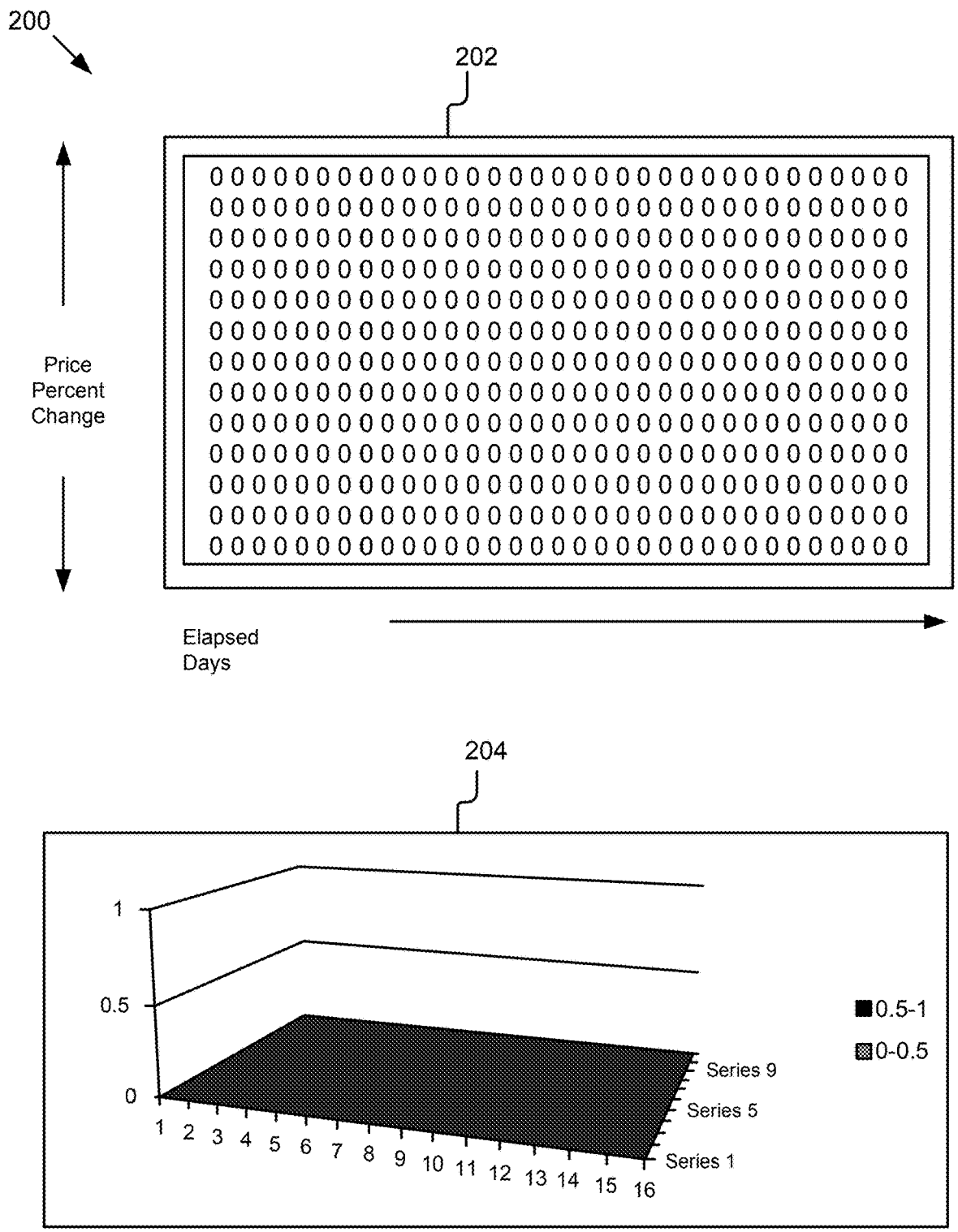
FIG. 2A is a diagram illustrating an example initial grid with a list of default values and an example 3D representation of the values.

The array/grid can represent a multi-dimensional (e.g., 2-dimensional) surface, initialized to a flat surface at the base value (e.g., 0.0). The surface may be indexed by Elapsed Days on the horizontal axis and Percent Change on the vertical axis as illustrated in a graphic 202 in FIG. 2A, which illustrates a planar surface in a 3-dimensional surface space.

A representative grid 202 may be initialized for each of the dimensions recognized by each of the active recognizers 182. In other words, a grid can be created for each of the Elapsed Days vs. Price Percent Change list of values that was created for each of the recognized dimensions in the price data. For instance, if there were 10 patterns or events identified by a given recognizer, there are 10 corresponding lists of values and 10 corresponding grids created.

Each of the Elapsed Days vs. Price Percent Change lists of values can be mapped on a grid. In particular, the instances (e.g., value pairs) of each pattern in the list of values can be mapped using the axis of the grid. The location of each pattern instance in the grid may be reflected by changing the base value in that location to a value representative of the pattern/value pair. In some instances, the representative values may be the same across the grid. For instance, each of the coordinate points corresponding to the pattern instances may be changed from zero (0) to one (1).

Figure 2B:
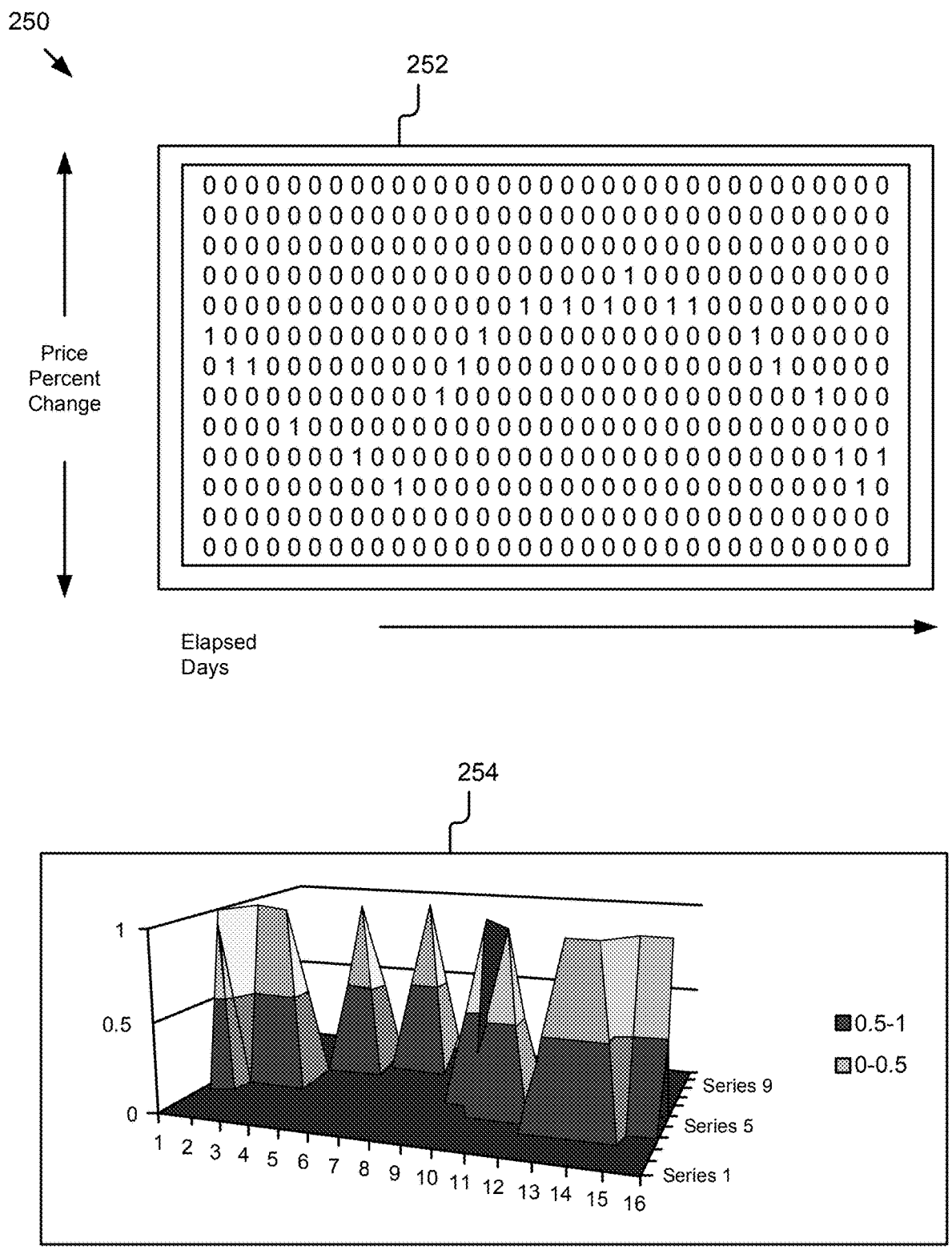
FIG. 2B is a diagram illustrating an example grid with a list of mapped values for recognized patterns identified in price data and an example 3D representation of the values.

A grid may have fewer addressable points than value pairs in the list and some overlap of points may occur during the mapping (e.g., due to difference in granularity). In some cases, if a given value pair in the grid has already been mapped to a coordinate point, than other value pairs corresponding to that coordinate point may be skipped (e.g., no addition of values is performed). After all coordinate points have been mapped into the grid, it may appear similar to the representative grid 252 depicted in FIG. 2B. In this Figure, some of the values have been changed to (1) and there are occasional gaps between the (1) values. A 3-dimensional representation 254 the example grid 252 is also provided in FIG. 2B.

In some implementations, the example grid 252 may include values (e.g. binary) identifying a coordinate location in the example grid 252, although it should be understood that other number-types and/or values for mapping the coordinate locations may be used. Further, in this example, a horizontal (x-axis) location in the grid 252 corresponds to elapsed days for the financial period and the vertical (y-axis) location in the grid 252 corresponds to the price percent change. The highest percent change corresponding to the elapsed days of the financial period is identified at the top region of the example grid 252 and the lowest percent change corresponding to the elapsed days of the financial period is identified at the bottom region of the example grid 252. As shown, the coordinate location values are mapped to integer-based locations inside the grid.

Figure 3:
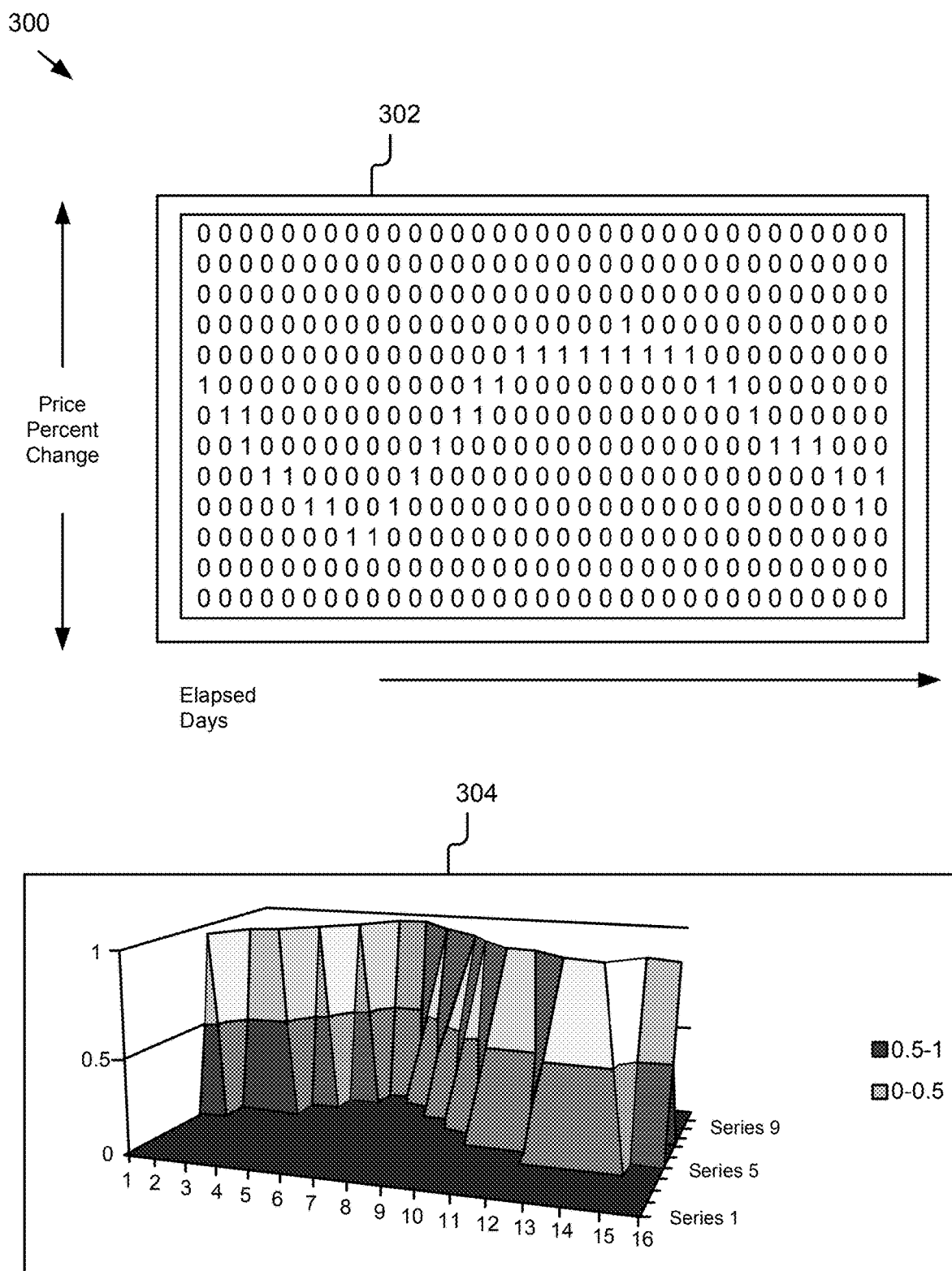
FIG. 3 is a diagram illustrating an example grid with a list of interpolated values for recognized patterns identified in price data and an example 3D representation of the values.

The forecasting module 190 can perform a linear interpolation between known points. At this point, the forecasting module 190 may perform an interpolation (e.g., simple linear) on each of the grids to "close the gaps" between the plotted values (e.g., the (1) values). This creates a continuous line of non-zero values from the left side of the grid to the right as illustrated in a graphic 302 in FIG. 3. FIG. 3 depicts an example grid 302 that shows the elimination of the gaps between the plotted (e.g., non-zero) values of the grid 252 by interpolation.

In some implementations, the forecasting module 190 may be configured to perform a modified bi-linear interpolation of points. A representative surface formed by each of the grids can be processed by interpolating the entire surface to "smooth" the slopes of the line. In some cases, the smoothing can be performed using a modified bi-linear interpolation. This is advantageous because it can simulate a geographic ground surface map from a relatively small set of known points in elevation.

As a further example, using bi-linear interpolation, each unknown point (e.g., a grid point with a value of zero) is given an interpolated value. The interpolated value may be calculated by choosing a subset of known points (e.g., a non-zero value) that are closest to the point being interpolated as illustrated in a graphic 402 in FIG. 4A.

Figure 4A:
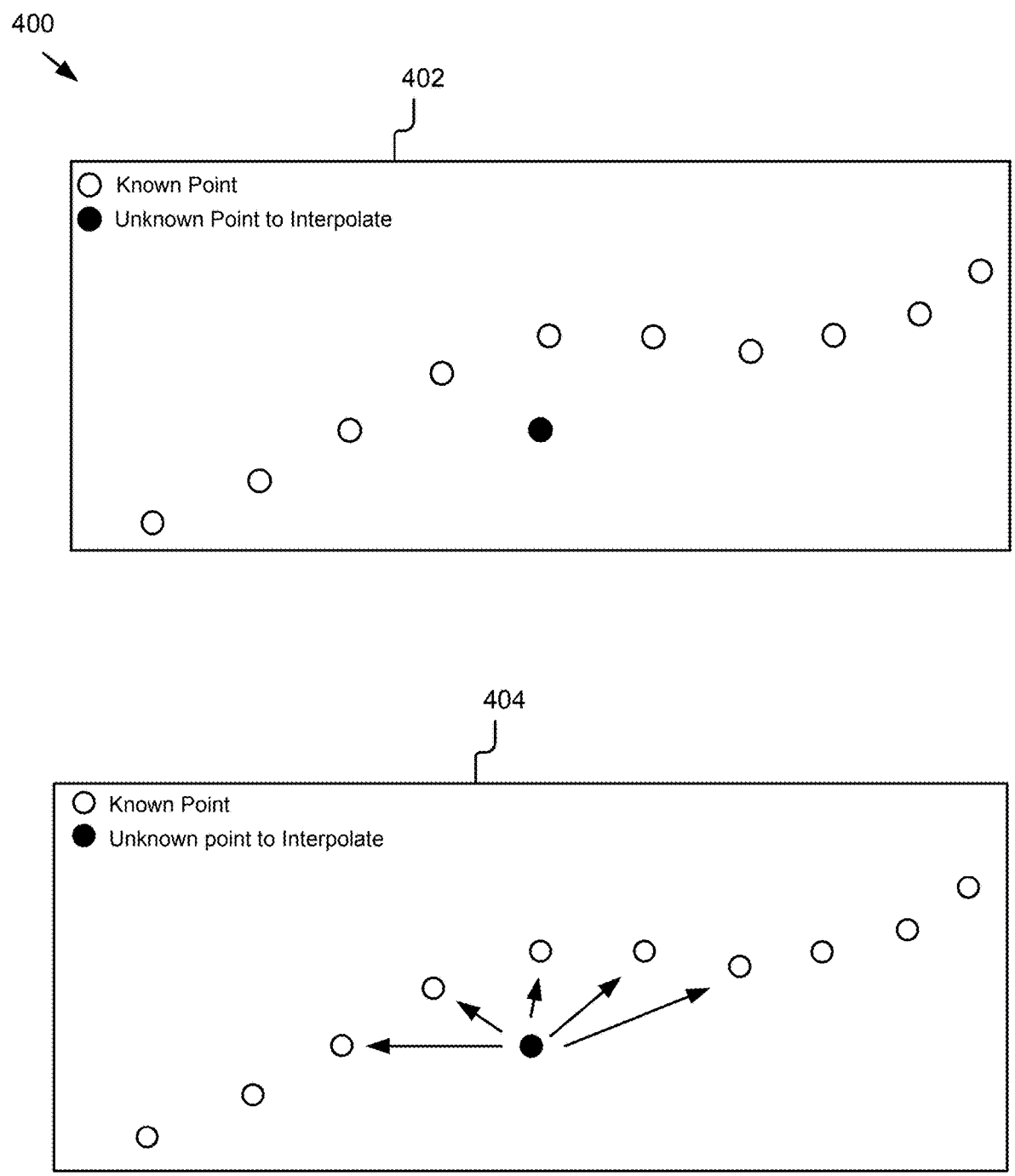
FIG. 4A is a diagram illustrating an example method for interpolating a value.

Once the "closest" points are selected, as illustrated in a graphic 404 in FIG. 4A, the interpolated value may be calculated, for instance, using the following formula:

$$P_i = \frac{\sum_{j=1}^{G} P_j/D_{ij}^n}{\sum_{j=1}^{G} 1/D_{ij}^n}$$

where
$P_i$=The point being interpolated at location i
$P_j$=A known point at location j
$D_{ij}$=Distance from the point at i to the point at j
G=The number of known points selected to provide interpolation input
n=Inverse distance weighting power Notice that $D_{ij}^n$ incorporates the "weight" that a particular known point has over the interpolated value.

In the modified bi-linear interpolation used for this application, the formula is adjusted slightly:

$$P_i = \frac{\sum_{j=1}^{G} P_j/W_j}{\sum_{j=1}^{G} 1/W_j}$$

where
$P_i$=The point being interpolated at location i
$P_j$=A known point at location j
G=The number of known points selected to provide interpolation input
$W_j$=Weighted influence of the point at $P_j$ The weighted influence (W) is calculated as follows:

$$W = V \times \frac{R_n}{P_n}$$

where
V=The value at the known point
$R_n$=The relative value on a normal curve
$R_p$=The peak value of a normal curve The relative value ($R_n$) on a normal curve is calculated as follows:

$$R_n = \frac{1}{\sqrt{2\pi}} \times e^{-\left(\frac{D^2}{2}\right)}$$

where
D=The distance from the interpolated point to the influencing point.

Figure 4B:
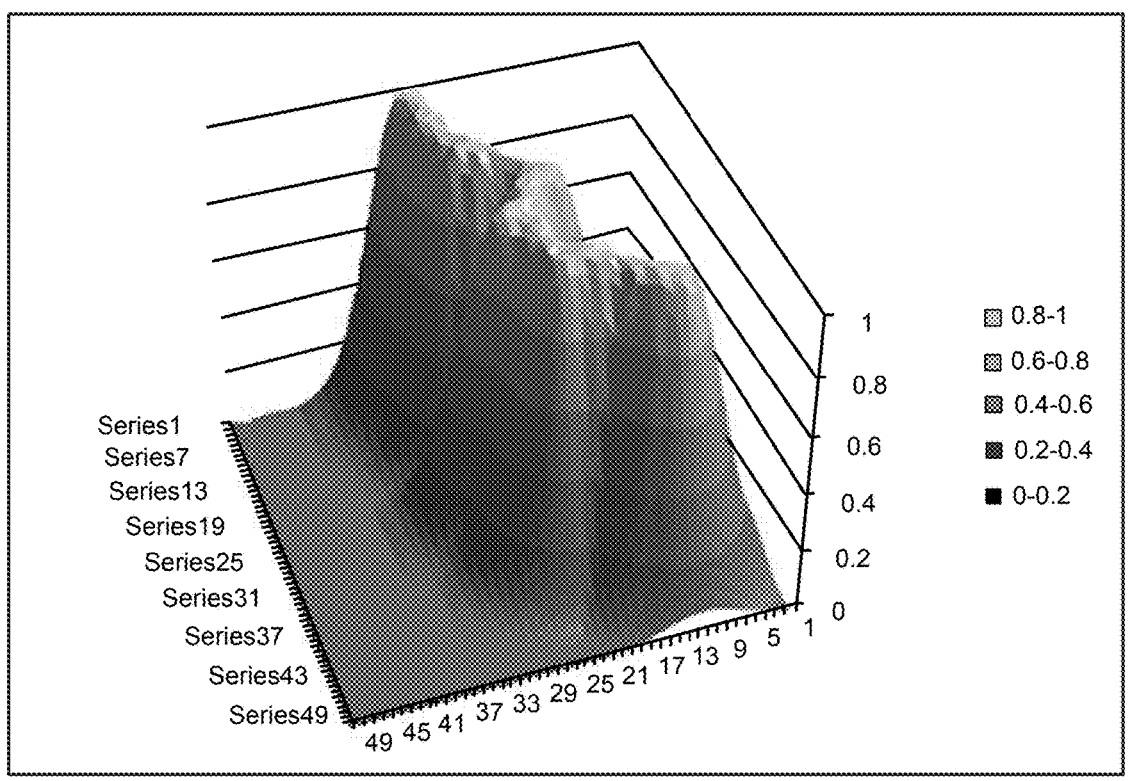
FIG. 4B is an example 3D representation of interpolated grids.

Once the interpolation is finished, each of the individual grids, when viewed as a 3-dimensional surface, may appear similar to the view shown in FIG. 4B. This surface is not a representation of the same surface presented in the above examples, but an example of a surface generated with different data. It is presented in this context for visual purposes only. In FIG. 4B, the surface is rotated slightly to show the smoothed nature of the data.

Figure 5:
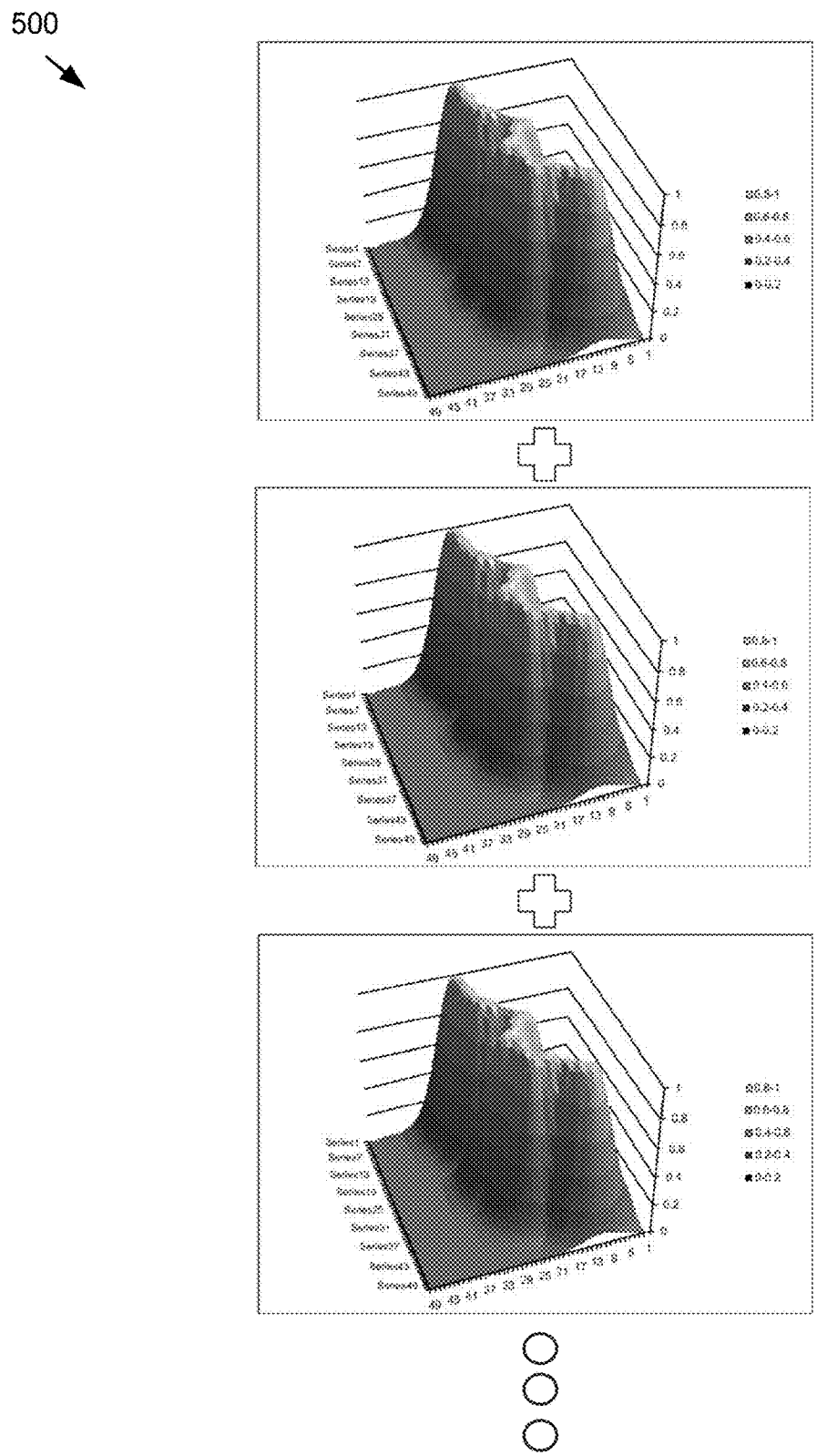
FIG. 5 is a diagram illustrating an example method for creating a composite 3D representation of interpolated grids.

In some implementations, the forecasting module 190 may be configured to add interpolated grids together to create a composite surface. Once all of the grids (one for each recognized pattern/event) have been interpolated, they may be added together to create a composite grid. In some implementations, the interpolated grids contain interpolated values. For instance, the interpolated values may be non-integer values. The interpolated grids, which may be treated as a matrices, may be added together, using matrix addition, to create a composite grid, as illustrated in FIG. 5.

The resulting composite grid may contain values between the base value and (e.g., zero (0)) and 'n'. In cases where each grid contributed values between zero (0) and one (1), the value n may be the number of grids that were added together. For instance, in the resulting composite grid, those points where all the interpolated grids had a value of one (1), the resulting composite value would be 'n', where 'n' is the number of grids that participated in the summation input. Those points where all the interpolated grids had a zero (0) value the resulting composite value will be zero. Those points where all the interpolated grids had interpolated values, the resulting composite values will fall somewhere between (0) and 'n'. This grid represents an aggregate, smoothed surface, showing what prices did on relative days following when an event/pattern was identified by a given recognizer.

The forecasting module 190 may be configured to generate a graphical pricing forecast relative to a point in time of the financial instrument data based on the historical price statistics. The management module 194 may overlay the graphical pricing forecast with the financial instrument data when presenting it to the user. This may be done at the user's request, when the user access a chart via a corresponding software application, or another point in time. In some cases, the forecast may be provided automatically based on popular events or patterns to provide users with a general assessment of the trajectory of the financial instrument.

In some implementations, the forecasting module 190 may generate the graphical pricing forecast by mapping the collection of lists using multidimensional arrays of values and aggregating the multidimensional arrays of values into an aggregated multidimensional array of values, as discussed elsewhere herein. For instance, the forecasting module 190 may convert the values of the aggregated multidimensional array into corresponding colors and generate a bitmap image reflecting the graphical pricing forecast using the corresponding colors.

In some implementations, the forecasting module 190 may be configured to create a bitmap image of the composite surface. The data comprising the composite grid (matrix) may be used to form a bitmap image. In some implementations, each point in the matrix may be transferred to one or more pixels in the target bitmap and the color of the pixel(s) may be set to correspond to the value of the point in the matrix.

For the cases where the values in the matrix range from zero (0) to 'n', where 'n' is the total number of events/patterns identified by the recognizer 182 in the original price data, the matrix values may be mapped to color values as follows:

$$ColorValue = (MatrixValue/N) * 100,$$

where 'N' is the maximum value of a matrix value (equal to the number of dimension instances found). This results in a ColorValue between 0 and 100, which is mapped to a specific bitmap color as shown in FIG. 6. ColorValues that lie between the defined values may reflect a mix of two nearby colors. For example, a ColorValue of 60 could result in an interpolated color between Blue and Magenta.

Figure 7A:
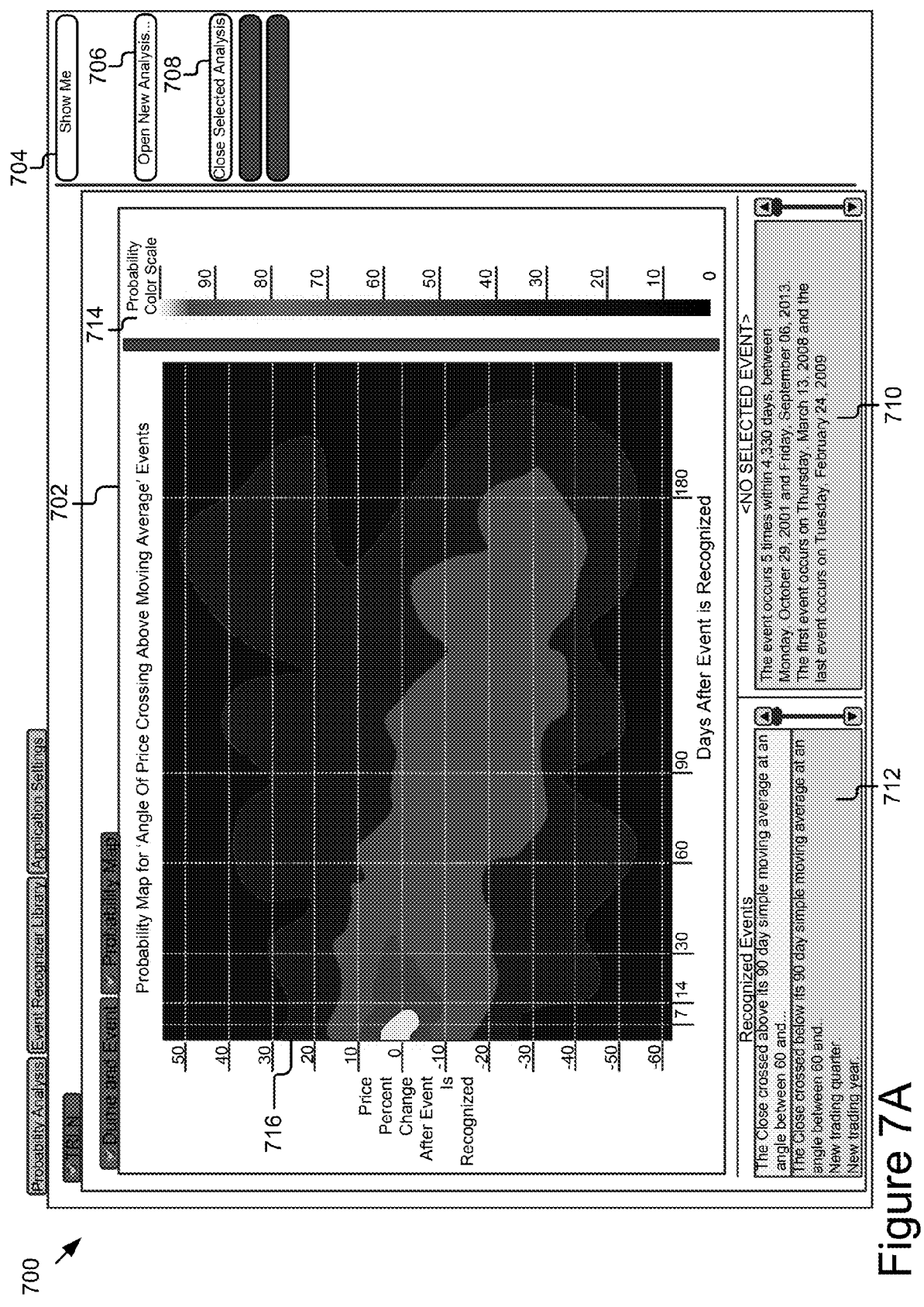
FIG. 7A is a graphical representation of an example graphical user interface including a probability map.

Once all matrix values have been converted to color values, the bitmap may be drawn to the screen and interpolated to the desired display size. An example of a resulting "Probability Map" is depicted in FIG. 7A. The colors of this map represent the historic, statistical tendency of prices to congregate at a specific level, after a defined number of days has passed since a pattern or event was identified. The color scale on the right indicates that the brighter colors (magenta, red, yellow, etc.) represent a higher tendency for prices to "gravitate" to that location. This particular map shows that Thomson-Reuters prices have a distinct tendency to fall 20% to 30% after the closing price crosses above its 90 simple moving average.

Figure 7B:
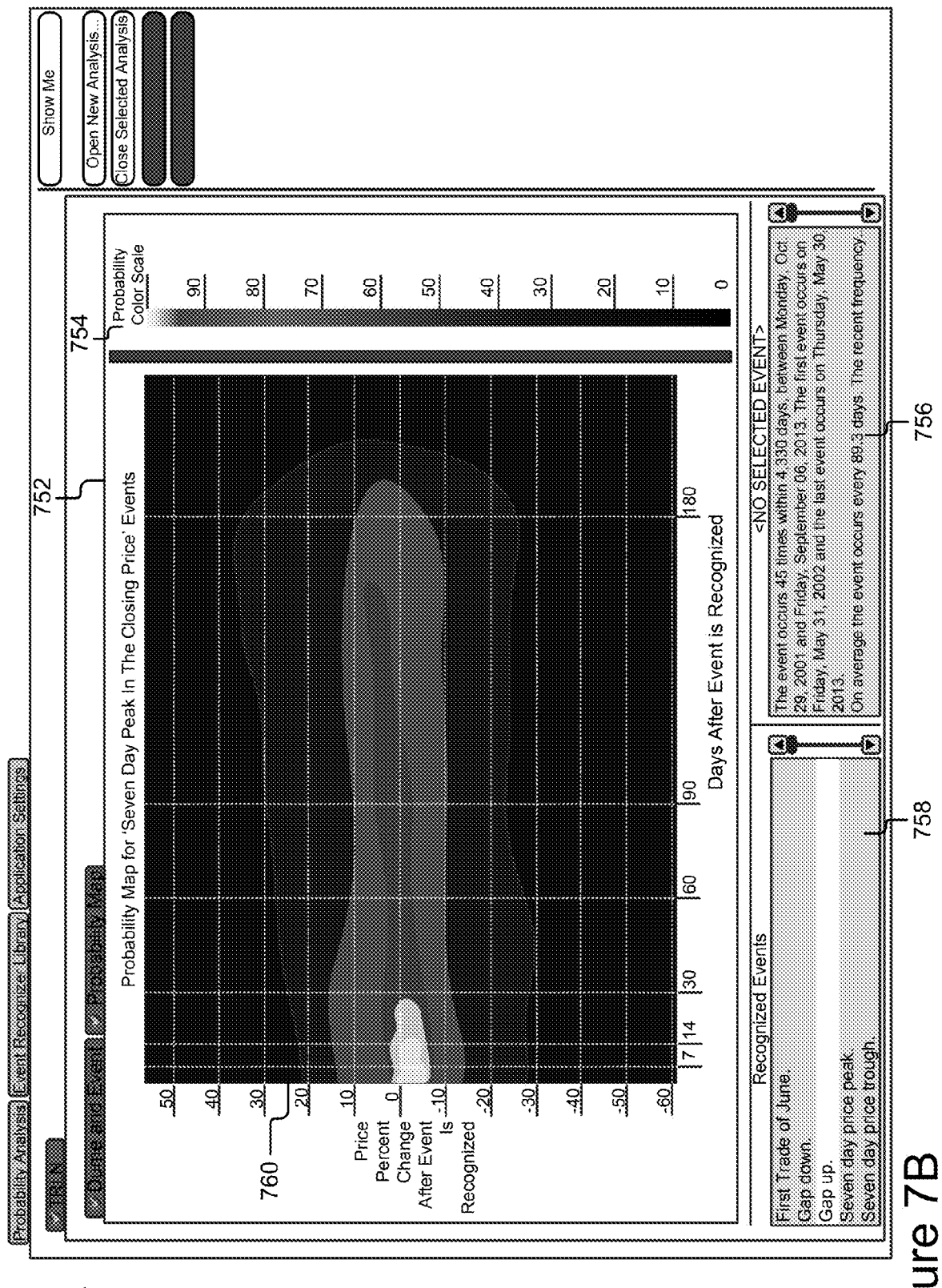
FIG. 7B is a graphical representation of an example graphical user interface including another probability map.

By selecting another recognizer 182 that analyzed a different dimension in the Thomson-Reuters data, a new Probability Map may be generated for that dimension as illustrated in FIG. 7B. Compared to FIG. 7A, the map in FIG. 7B predicts prices to be flatter and experience less up or down movement from the selected start-point. It should be understood that while the above maps have largely been described with respect to a given dimension (pattern, event, etc.), in some implementations, the analysis for two or more dimensions (patterns, events, etc.) may be combined to provide an aggregated price and/or trend prediction.

Historical Probability Map

Probability maps generated in the past can be drawn over past price data to view how accurate a past map was in predicting price changes. To do this, a chart of price and volume of historical prices for a specific instrument may be displayed. On that display, indicators (e.g., yellow triangles) may indicate the locations where the selected active recognizer 182 has identified a specific dimension (e.g., event or pattern) as illustrated in FIG. 8A.

Figure 8A:
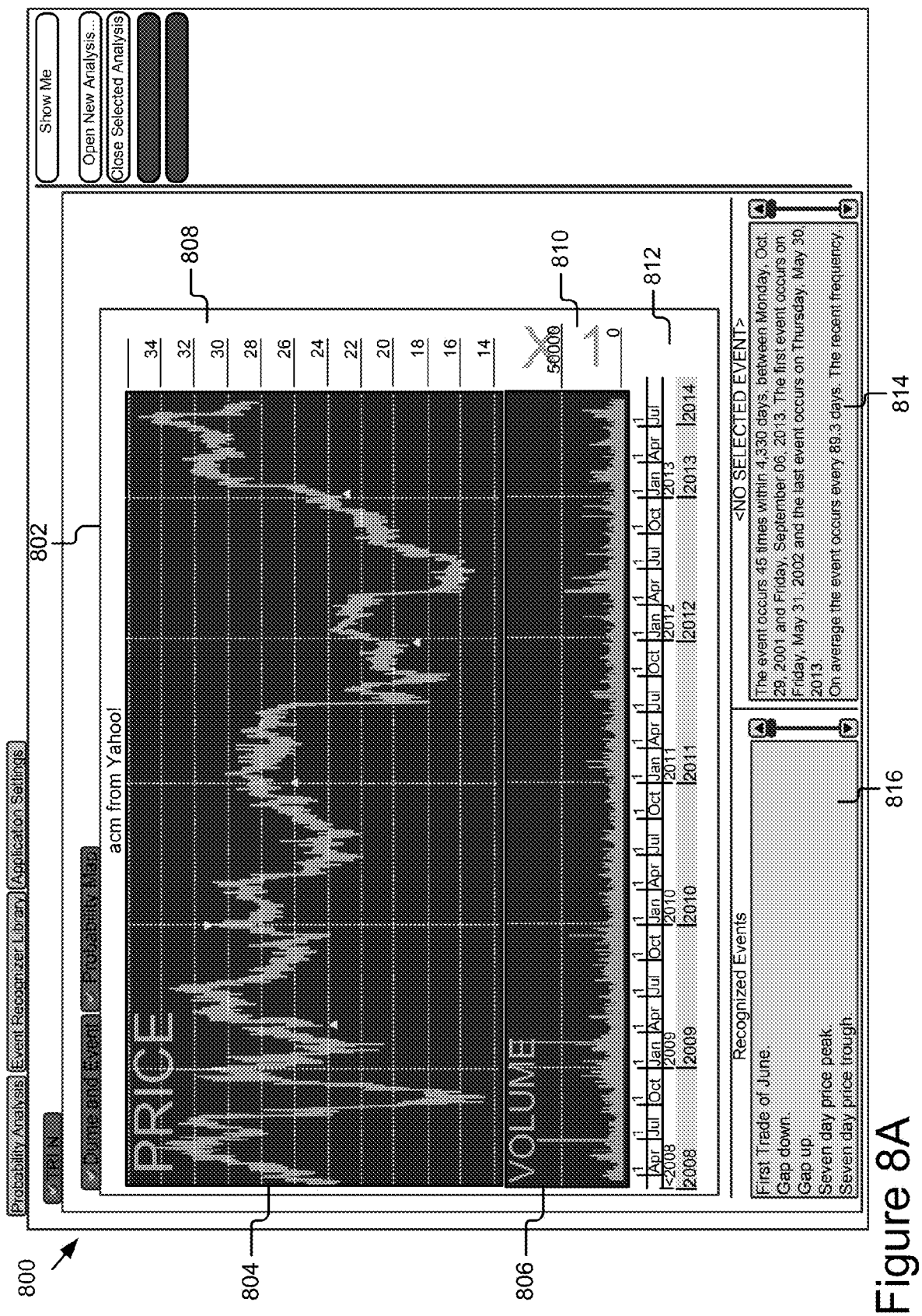
FIG. 8A is a graphical representation of an example graphical user interface including a chart of price and volume data with dimension indicators for a specific instrument.
Figure 8B:
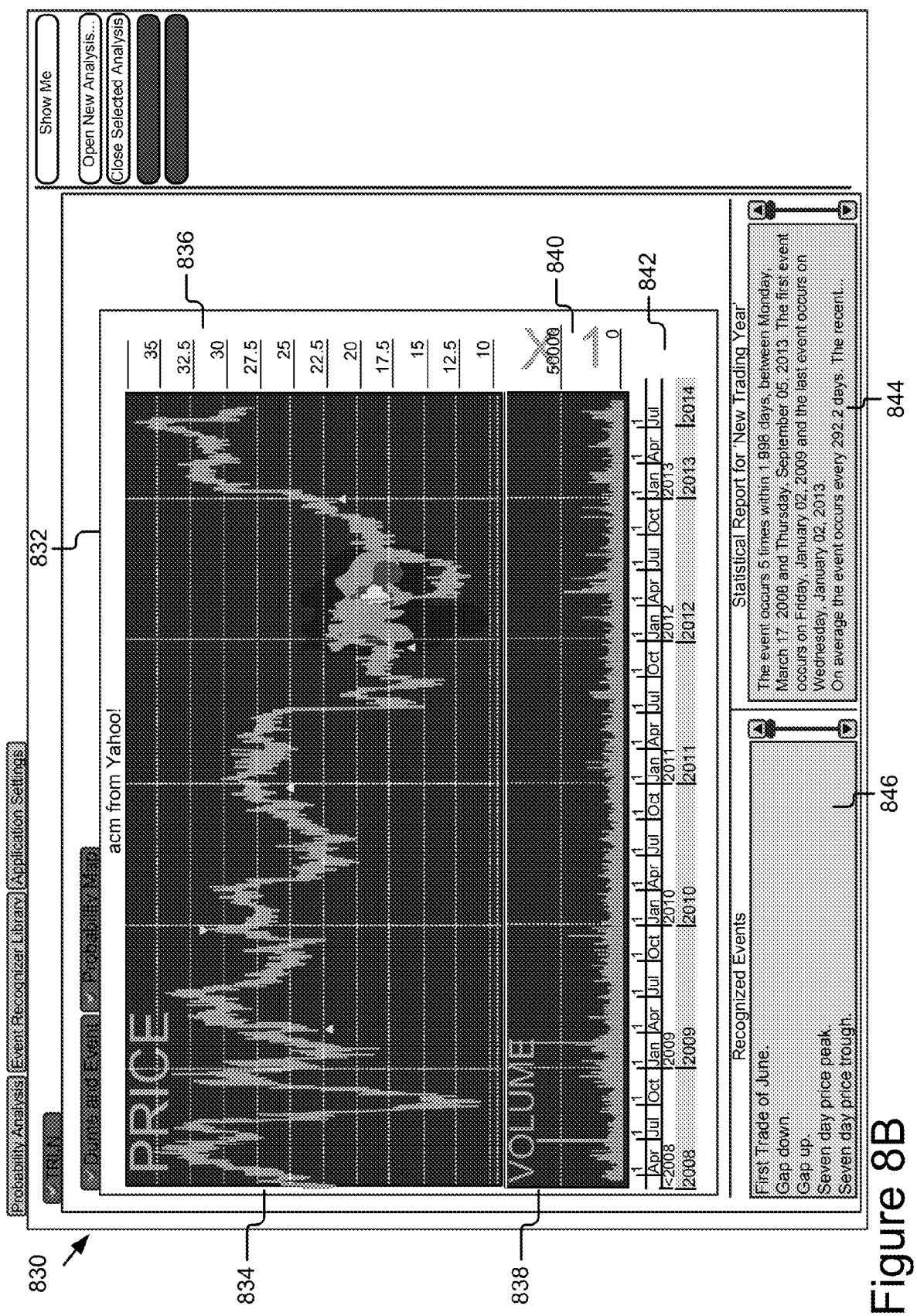
FIG. 8B is a graphical representation of an example graphical user interface including the chart of FIG. 8A with a probability map overlaid on a selected dimension indicator.
Figure 8C:
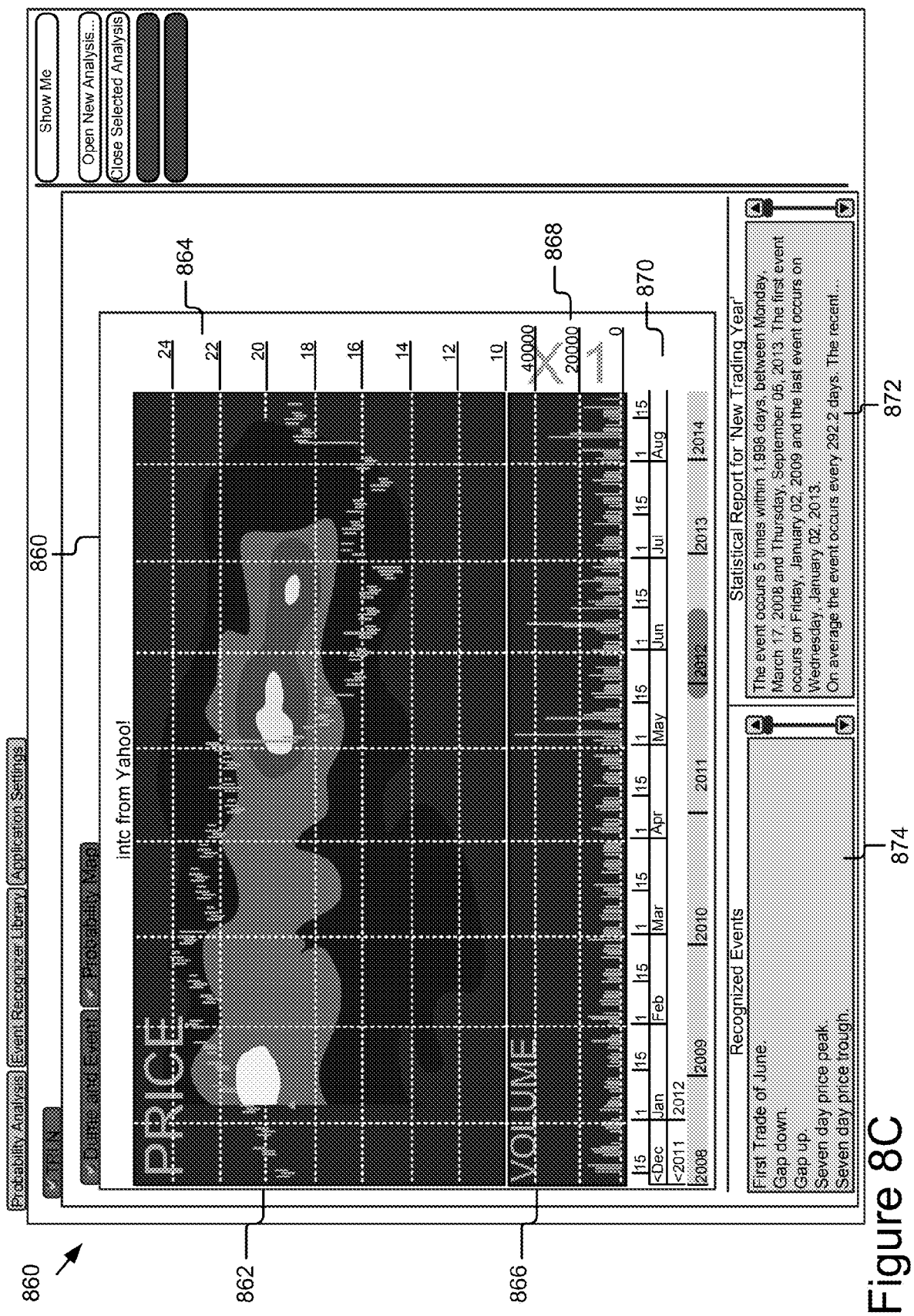
FIG. 8C is a graphical representation of an example graphical user interface including an expanded version of the example chart of FIG. 8B.

Specifically, the chart in FIG. 8A shows historical stock prices for ACM. The currently selected recognizer 182 has identified the first trade of every calendar year. If the second-to-last recognized location (January 2012) is selected, a probability map is generated and overlaid on that point. This map is generated using only data prior to (and/or including) the selected location. For example, only historic data (prior to January 2012) is used to generate the map. Once the map is generated, it may be overlaid on the price chart as illustrated in FIG. 8B. The price chart can be zoomed into to expand the probability map overlay and show more detail as illustrated in FIG. 8C. The probability map depicted in this figure shows a very strong historic tendency for prices to congregate about 4 months after the first of the year. When the map is overlaid on the prices for 2012, the prices actually make a quick fall into the high-probability range.

Future Probability Map

Figure 9:
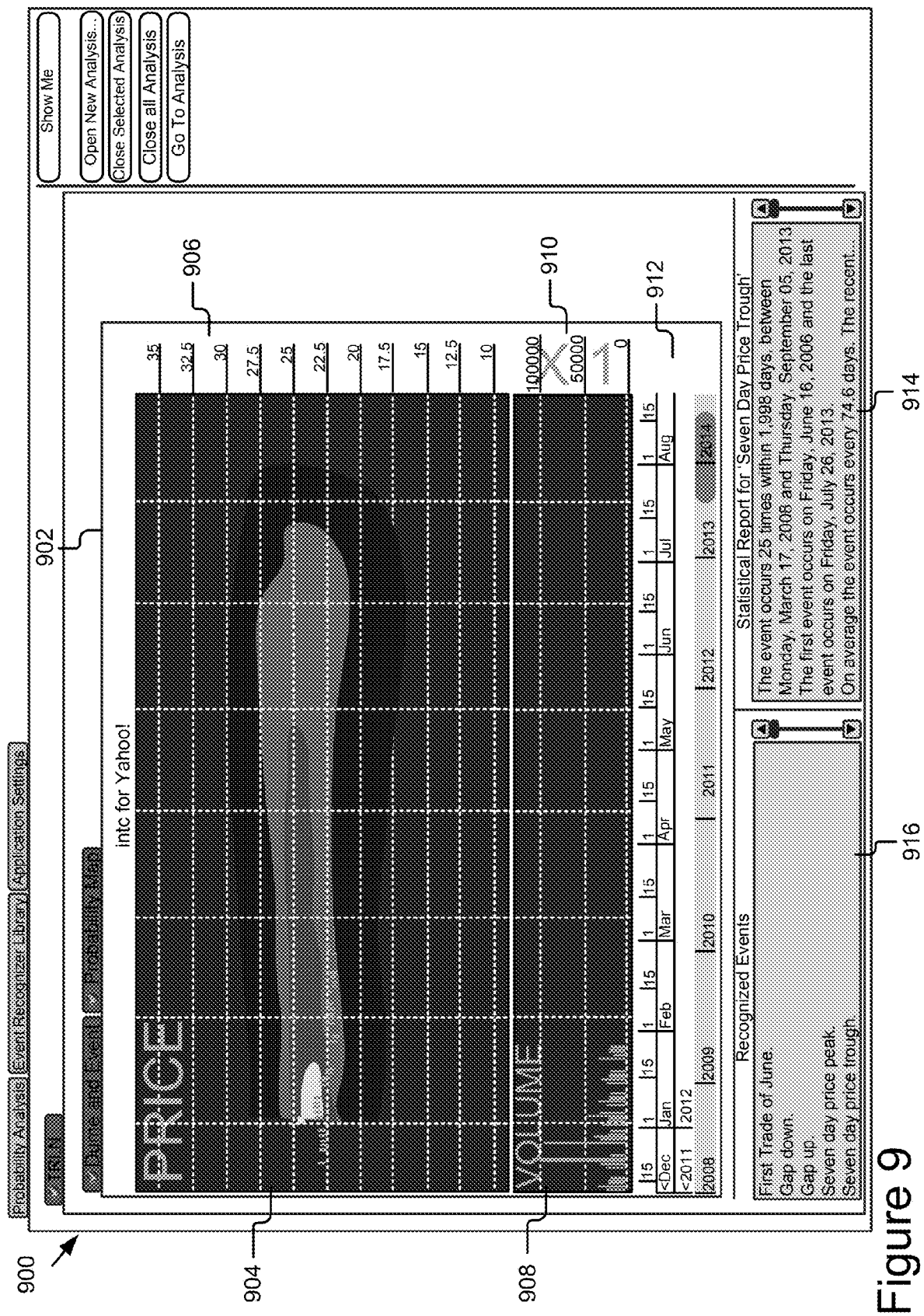
FIG. 9 is a graphical representation of an example graphical user interface including a price chart overlaid with a probability map projecting future price tendencies.

Probability maps can also be overlaid on a price chart to see future price tendencies. If a recognizer 182 identifies a dimension (e.g., pattern or event) in the recent past, a probability map generated for the dimension recognition point will project into the future as illustrated in FIG. 9. Here, a "Seven Day Price Trough" recognizer 182 has found a pattern within the last month for the stock INTC. When that latest dimension location is selected and a probability map is overlaid, the map is displayed beyond the last day of available price data, effectively projecting historical price tendencies into the future.

Methods

Figure 11:
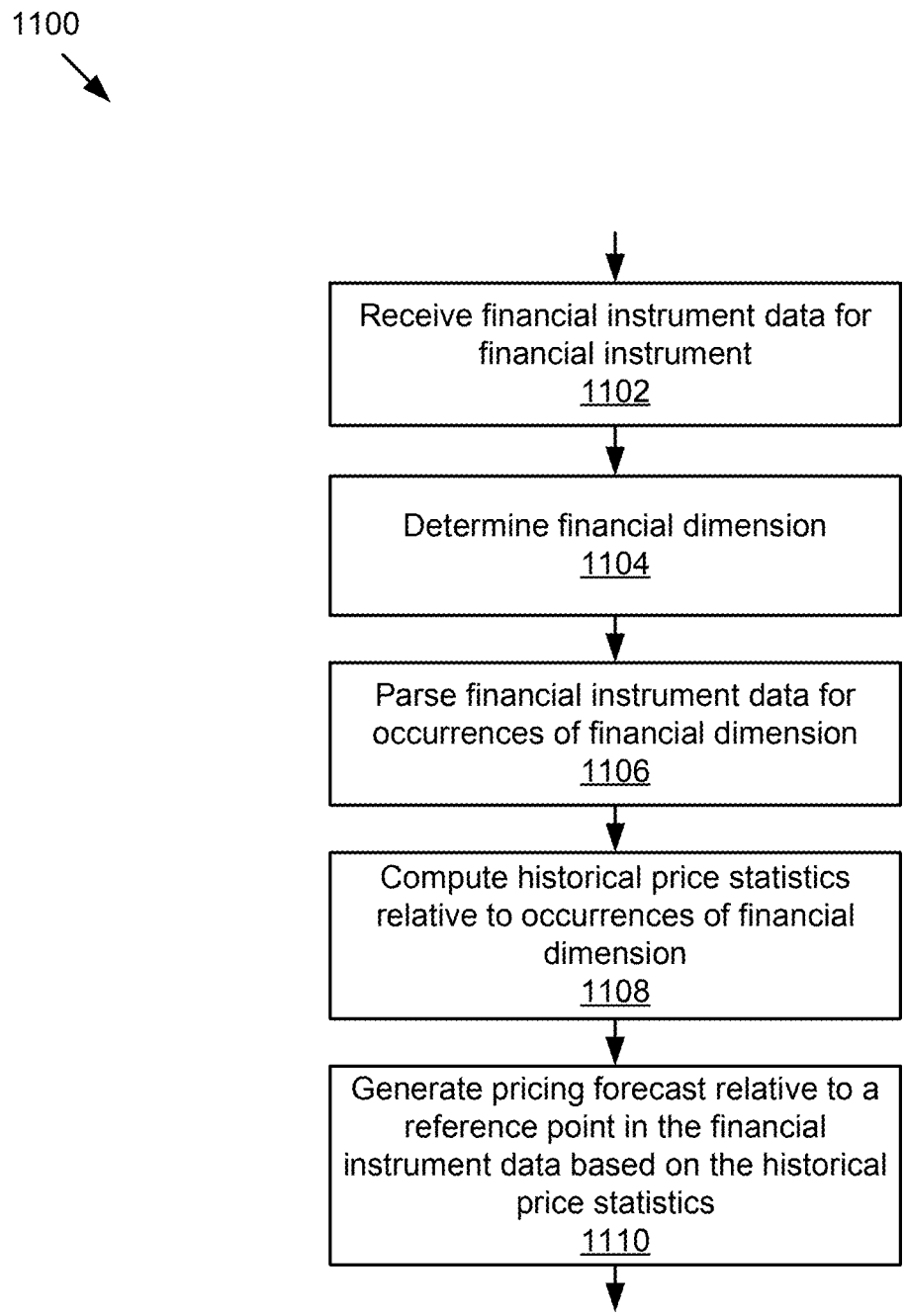
FIG. 11 is a flowchart of an example method for processing financial instrument data.

FIG. 11 is a flowchart of an example method 1100 for processing financial instrument data. A dimension recognizer 182 can receive 1102 financial instrument data for a financial instrument. In some implementations, the dimension recognizer 182 may receive the financial instrument data from the data retrieval module 184, from the data store 160, or another information source. The dimension recognizer 182 can determine 1104 a financial dimension for the financial instrument. In some implementations, the management module 186 may receive input from a user selecting the financial instrument and financial dimension. In some implementations, the management module 186, the dimension recognizer 182, or another component (e.g., a daemon) may automatically determine the financial instrument and financial dimension. Financial dimension can, in some examples, be a pattern or an event for a particular stock.

The recognizer 182 can parse 1106 the financial instrument data for occurrences/instances of the financial dimension. The analysis module 188 can compute 1108 historical price statistics relative to occurrences of the financial dimension. In some implementations, the historical price statistics may correspond to a set of set of time intervals associated with the occurrences, respectively. The forecasting module 190 can generate 1110 a pricing forecast relative to a point in time based on the historical price statistics. For example, responsive to the operations in blocks 1106 and 1108, forecasting module 190 can generate a probability map that predicts stock prices over a time period from a specified reference point. The probability map may be computed based on an aggregate statistical analysis of the financial dimension occurrences, as discussed in further detail elsewhere herein.

Figure 12A:
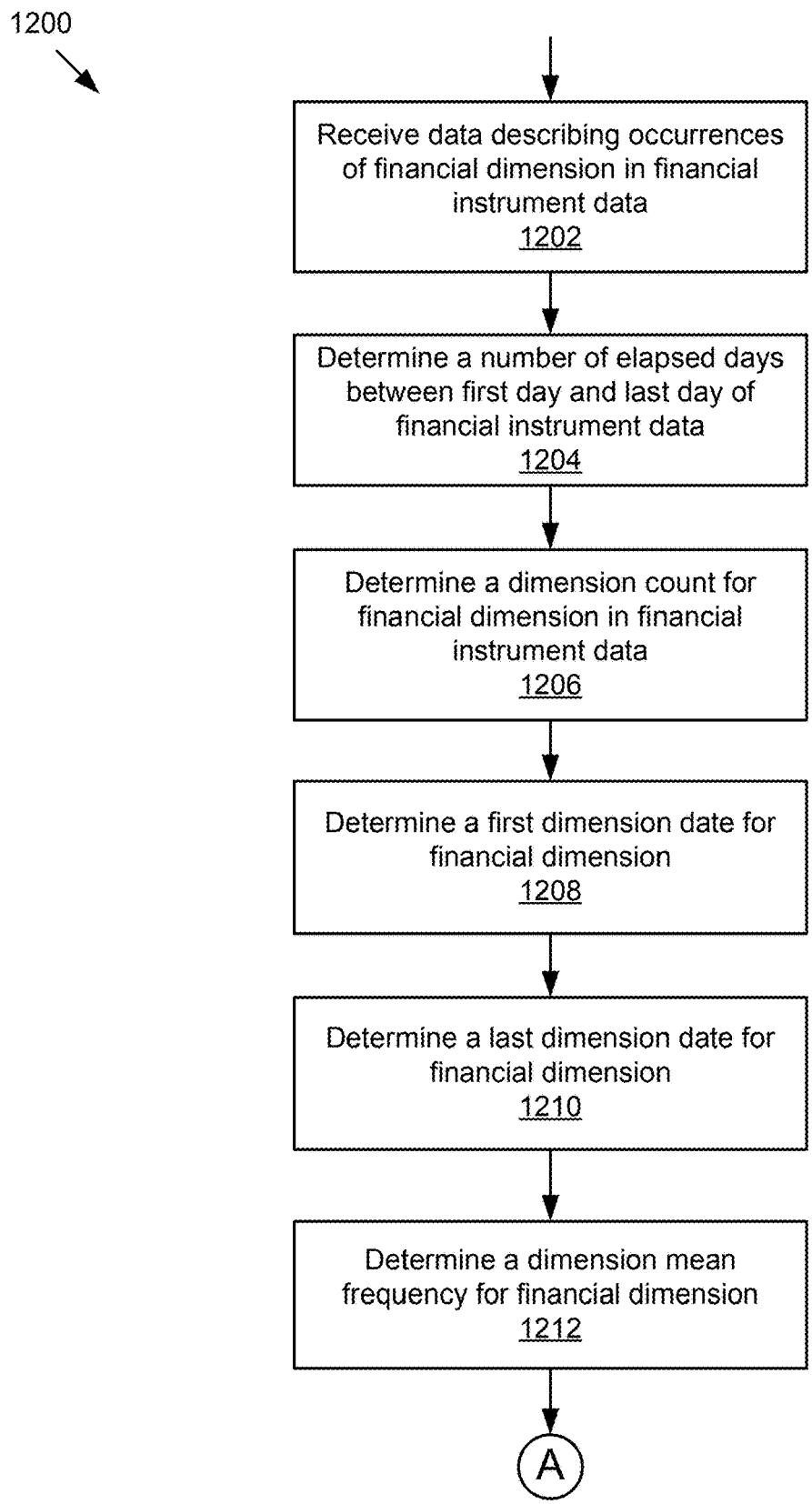
FIGS. 12A and 12B are flowcharts of an example method for performing a statistical evaluation on financial instrument data.
Figure 12B:
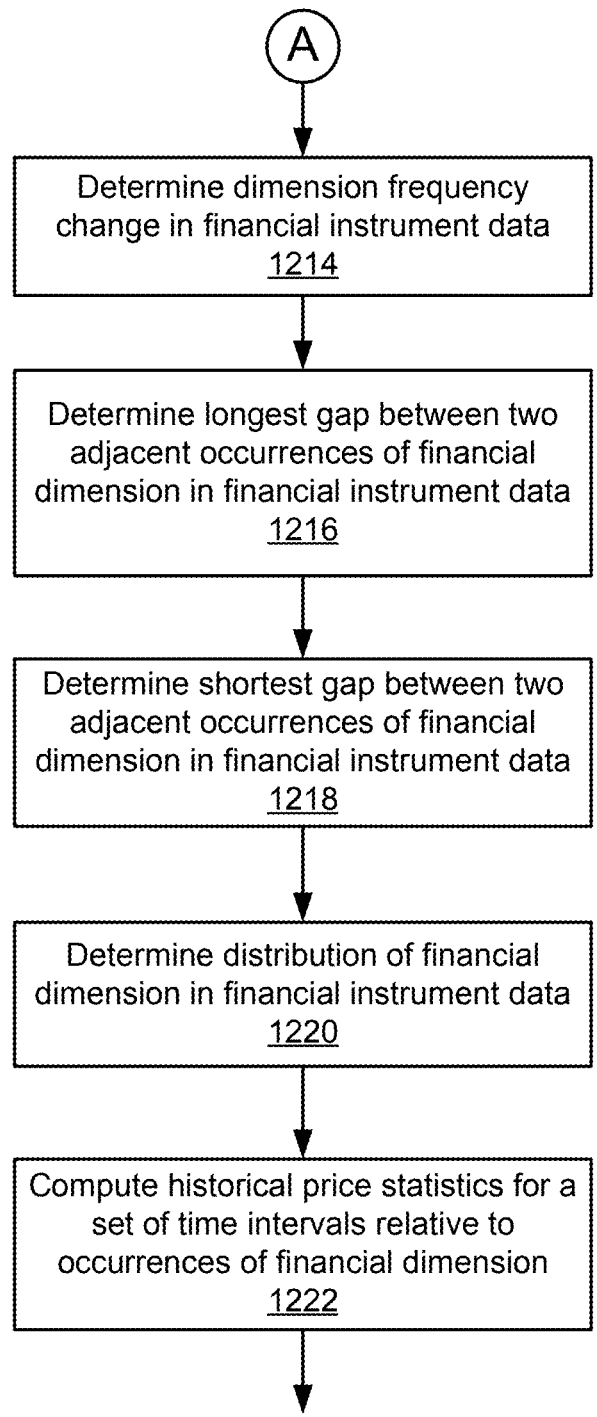

FIGS. 12A and 12B are flowcharts of an example method 1200 for performing a statistical evaluation on financial instrument data. Referring to FIG. 12A, the analysis module 188 can receive 1202 recognition data 164 describing occurrences of a financial dimension in the financial instrument data. The analysis module 188 can determine 1206 one or more statistics based on the financial instrument data and the recognition data 164, such as those described in this method 1200, although it should be understood that select statistics and/or other statistics may be computed in some cases as need requires.

The analysis module 188 can determine 1204 a number of elapsed days between the first day and the last day of the financial instrument data. In some implementations, the scope of the financial instrument data may be user-defined. For instance, a user may specify to use all available financial instrument data (e.g., stock price data going back as far as possible); a certain range of the financial instrument data (e.g., a certain date range, the past 2 years, etc.). In other implementations, the amount of financial instrument data may be determined based on the financial dimension(s) being analyzed or other factors. In other implementations, all financial instrument data may be utilized by default. Other variations are also possible and contemplated. The analysis module 188 may determine a dimension count, such as an event count, for the financial dimension in the financial instrument data. The analysis module 188 can determine 1208 a first dimension date such as a first event date for the financial dimension. The analysis module 188 can determine 1210 a last dimension date such as a last event date for the financial dimension. The analysis module 188 can determine 1212 a dimension mean frequency such as an event mean frequency for the financial dimension.

Referring to FIG. 12B, the analysis module 188 can determine 1214 a dimension frequency change such as an event frequency change in the financial instrument data. An example method illustrating operations that can be performed in block 1214 is described below with reference to FIGS. 13A and 13B. The analysis module 188 can determine 1216 a longest gap between two adjacent occurrences of the financial dimension in the financial instrument data. The analysis module 188 can determine 1218 a shortest gap between two adjacent occurrences of the financial dimension in the financial instrument data. The analysis module 188 can determine 1220 a distribution of the financial dimension such as a distribution of the pattern or event in the financial instrument data. An example method illustrating operations that can be performed in block 1220 is described below with reference to FIGS. 14A and 14B. The analysis module 188 can compute 1222 historical price statistics for a set of time intervals relative to occurrences of the financial dimension.

Figure 13A:
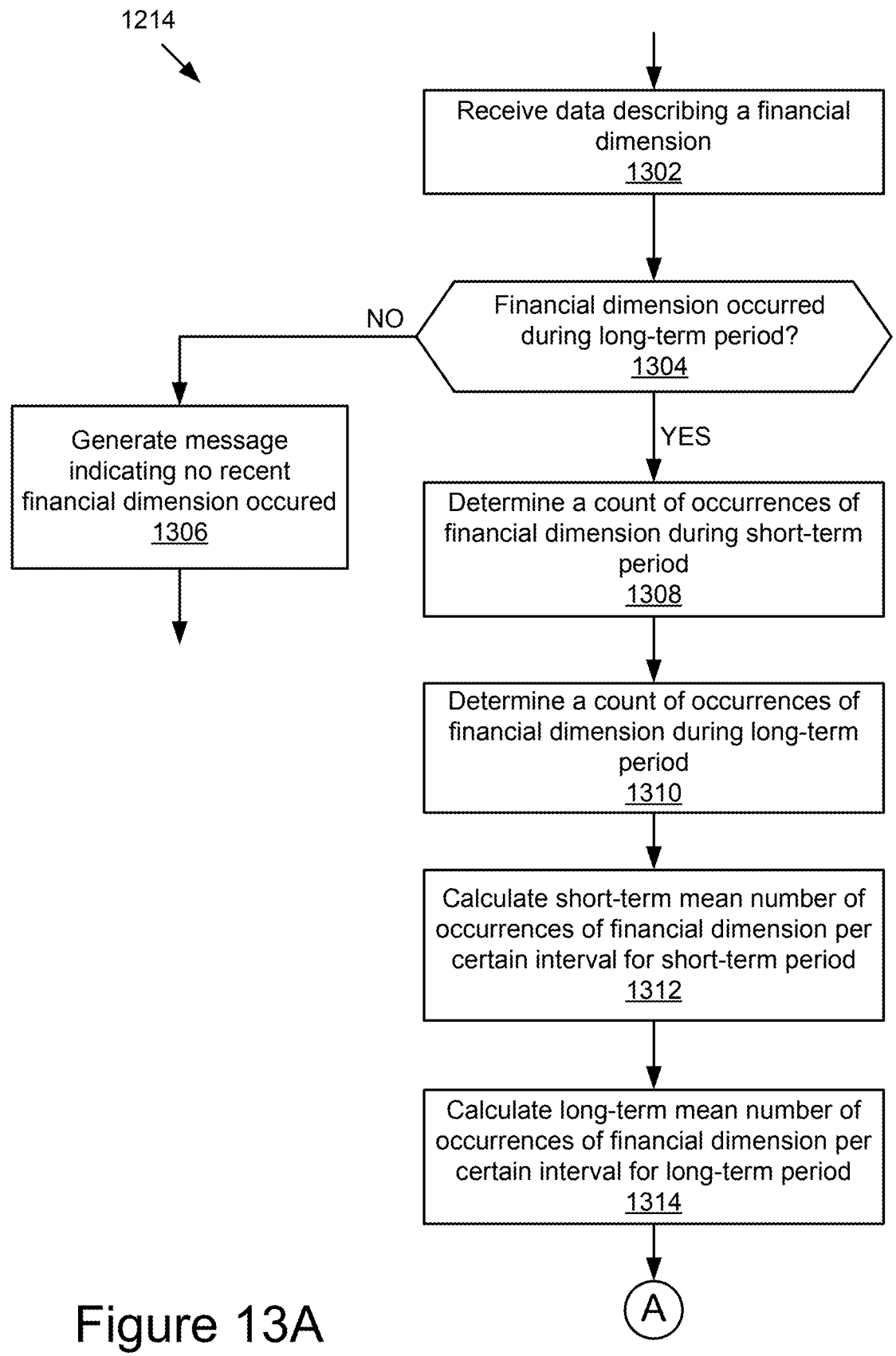
FIGS. 13A and 13B are flowcharts of an example method for determining a dimension frequency change.
Figure 13B:
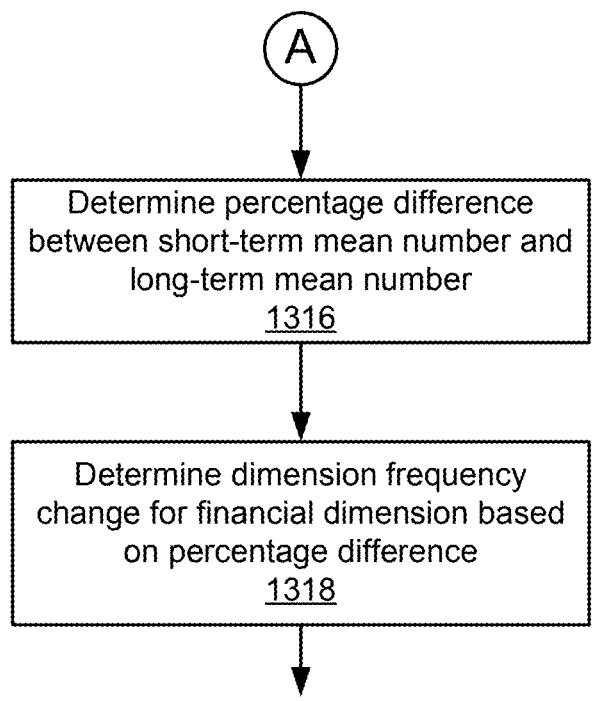

FIGS. 13A and 13B are flowcharts of an example method 1214 for determining a dimension frequency change, such as an event frequency change, on the financial instrument data. Referring to FIG. 13A, the analysis module 188 can receive 1302 data describing a financial dimension such as a pattern or an event. The analysis module 188 can determine 1304 whether the financial dimension occurs during a long-term period. For example, the analysis module 188 can determine whether the pattern or event has occurred during the last 720 days. If the financial dimension occurs during the long-term period, the method 1214 can move to block 1308. Otherwise, the method 1214 can move to block 1306. At block 1306, the analysis module 188 can generate or trigger the generation of a message indicating no recent financial dimension occurs in the long-term period.

At block 1308, the analysis module 188 can determine a count of occurrences of the financial dimension during a short-term period. For example, the analysis module 188 can determine a count of occurrences of the pattern or event during the last 180 days. The analysis module 188 can determine 1310 a count of occurrences of the financial dimension during the long-term period. The analysis module 188 can calculate 1312 a short-term mean number of occurrences of the financial dimension per a certain interval (e.g., 30 days) for the short-term period. The analysis module 188 can calculate 1314 a long-term mean number of occurrences of the financial dimension per the certain interval for the long-term period.

Referring to FIG. 13B, analysis module 188 can determine 1316 a percentage difference between the short-term mean number and the long-term mean number and determine 1318 a dimension frequency change for the financial dimension based on the percentage difference.

Figure 14A:
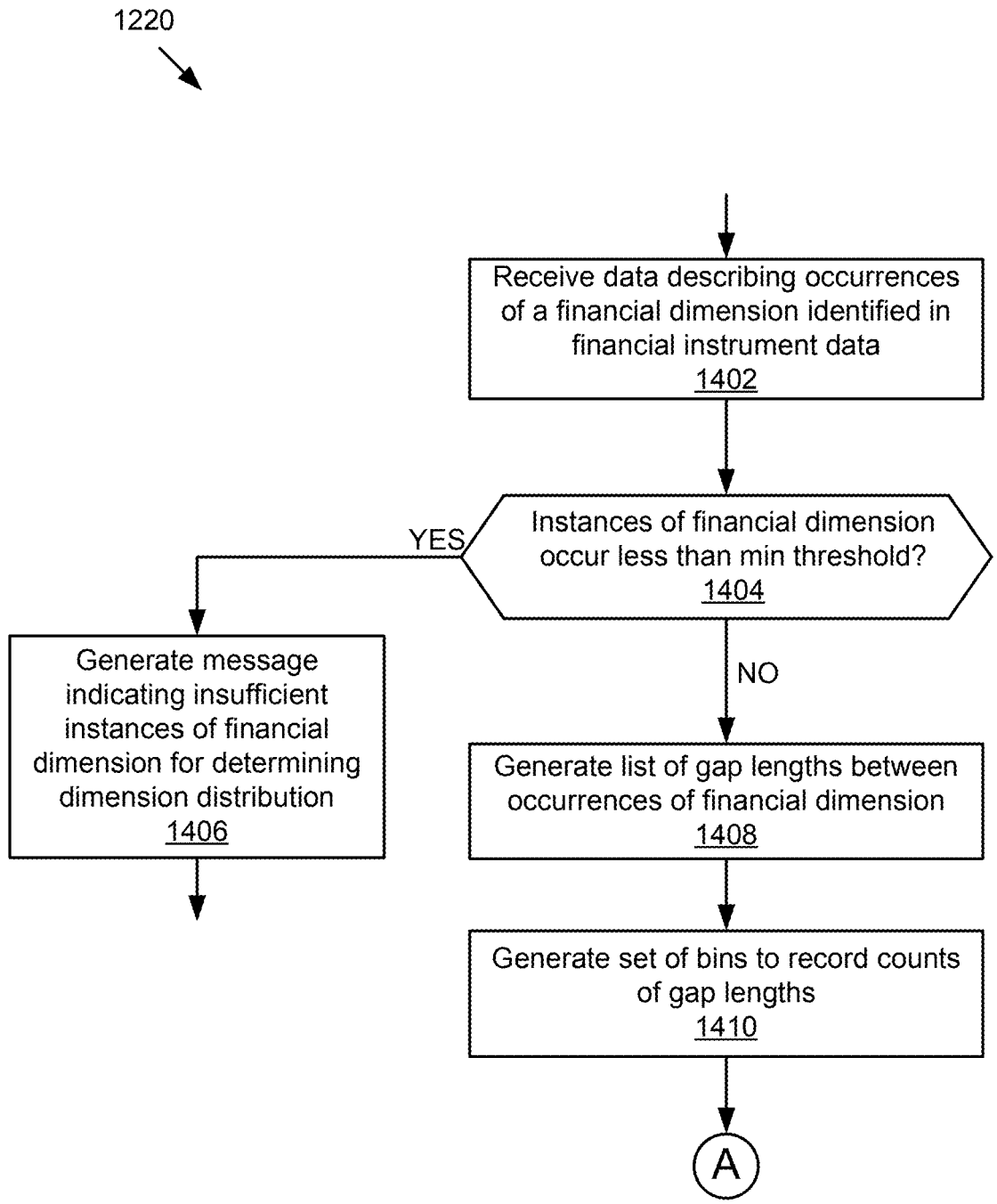
FIGS. 14A and 14B are flowcharts of an example method for determining a distribution of a financial dimension in financial instrument data.
Figure 14B:
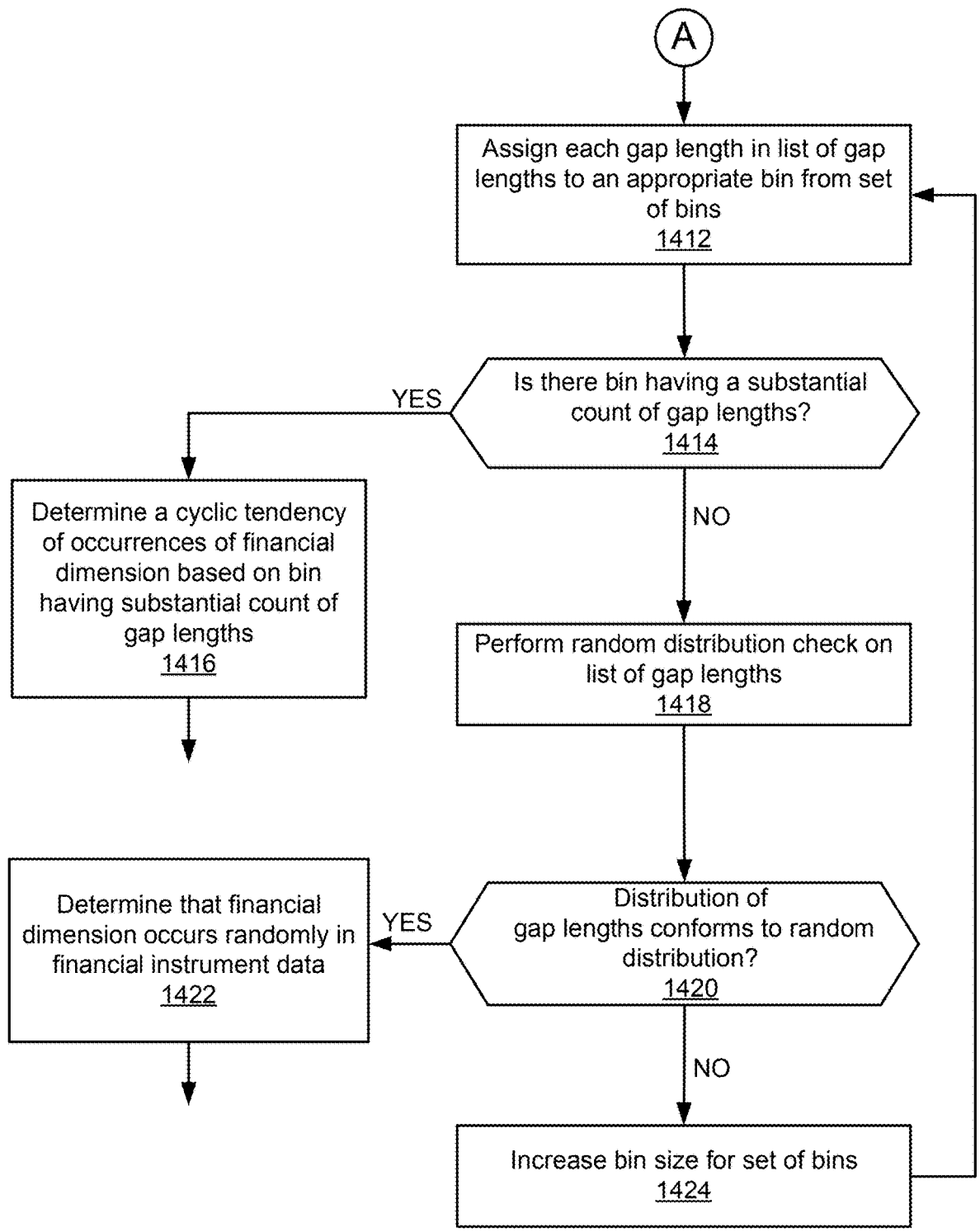

FIGS. 14A and 14B are flowcharts of an example method 1220 for determining a distribution of a financial dimension in the financial instrument data. Referring to FIG. 14A, the analysis module 188 can receive 1402 data describing occurrences of the financial dimension identified in the financial instrument data. The analysis module 188 can determine 1404 whether there are less than a minimum threshold (e.g., 0, 1, 3, 5, 6, etc.) instances of the financial dimension occurring in the financial instrument data. If there are less instances than the minimum threshold, the method 1220 can move to block 1406. Otherwise, the method 1220 can move to block 1408. At block 1406, the analysis module 188 can generate a message indicating insufficient instances of the financial dimension for determining the distribution of the financial dimension. At block 1408, the analysis module 188 can create a list of gap lengths between occurrences of the financial dimension and can create 1410 a set of bins to record counts of the gap lengths.

Referring to FIG. 14B, the analysis module 188 can assign 1412 each gap length in the list of gap lengths to an appropriate bin from the set of bins. The analysis module 188 can determine 1414 whether there is a bin that has a substantial count of gap lengths. If there is a bin having a substantial count of gap lengths, the method 1220 can move to block 1416. Otherwise, the method 1220 can move to block 1418. At block 1416, the analysis module 188 can determine a cyclic tendency of occurrences of the financial dimension based on the bin having the substantial count of gap lengths.

At block 1418, the analysis module 188 can perform a random distribution check on the list of gap lengths and determine 1420 whether the distribution of the gap lengths conforms to a random distribution. If the distribution of the gap lengths conforms to a random distribution, the method 1220 can move to block 1422. Otherwise, the method 1220 can move to block 1424. At block 1422, analysis module 188 can determine that the financial dimension occurs randomly in the financial instrument data. At block 1424, the analysis module 188 can increase the bin size for the set of bins, and the method 1220 can move to block 1412.

Figure 15A:
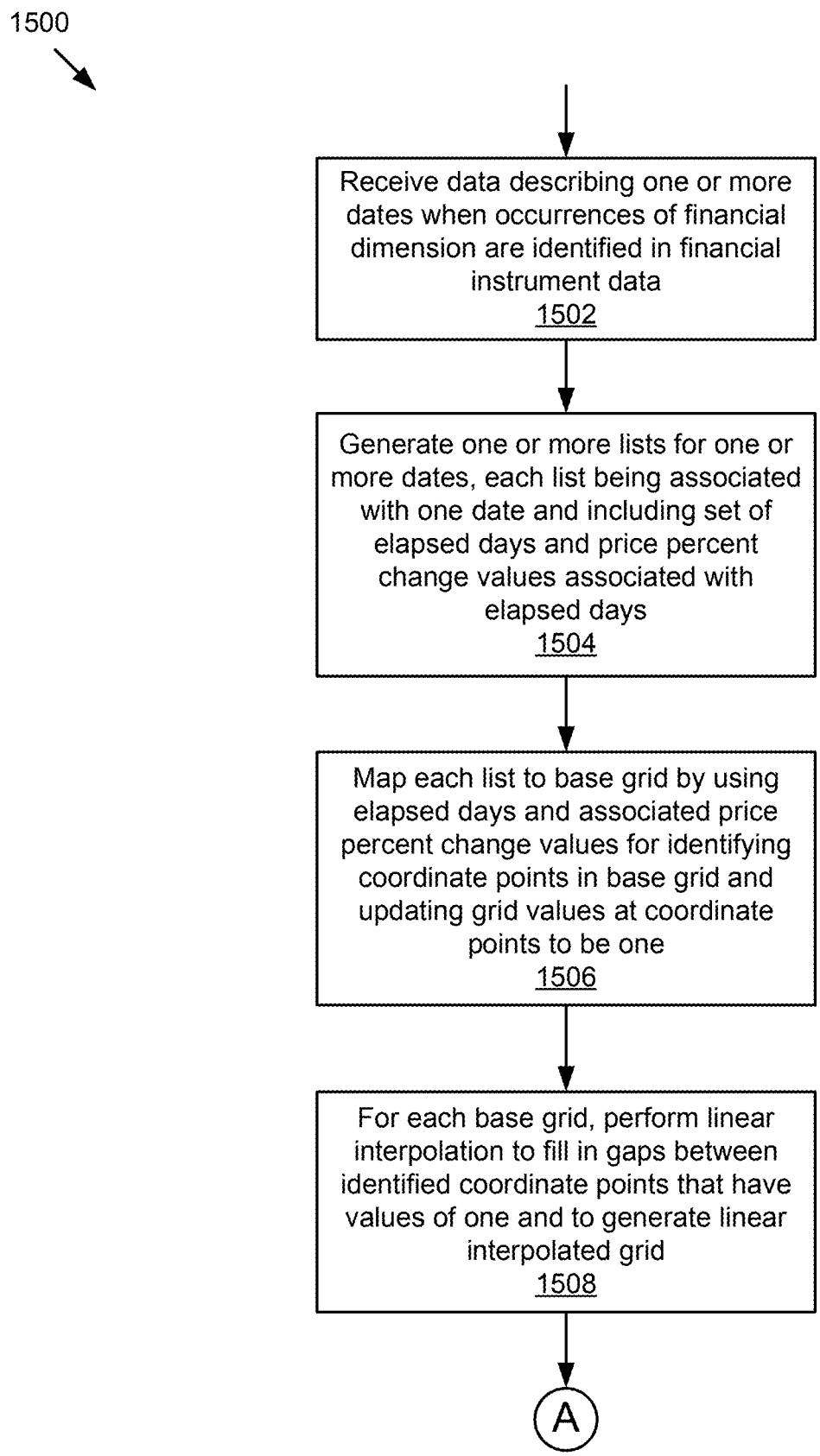
FIGS. 15A and 15B are flowcharts of an example method for generating a probability map.
Figure 15B:
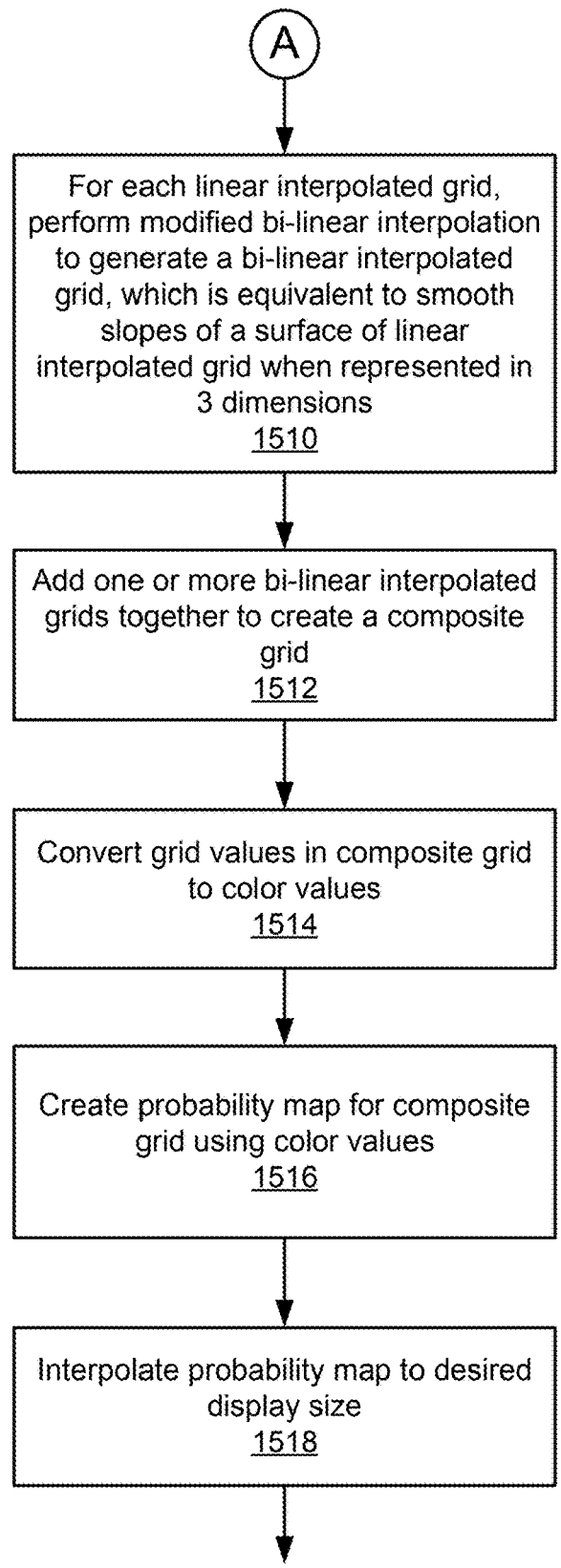

FIGS. 15A and 15B are flowcharts of an example method 1500 for generating a probability map. Referring to FIG. 15A, the analysis module 188 can receive 1502 data describing points at which occurrences of a financial dimension are identified in the financial instrument data. In some implementations, the analysis module 188 may receive recognition data 162 from a dimension recognizer 182 providing information related to the occurrences of the financial dimension. In some implementations, the analysis module 188 may receive this information from the data store 160 or another suitable information source.

Responsive to receiving the information, the analysis module 188 can generate 1504 one or more lists for the one or more instances of the financial dimension. In some implementations, each instance may correspond with a date (of occurrence) and each list is associated with the corresponding date and includes a set of elapsed days from the date and price change (e.g., percent) values associated with the elapsed days, as discussed elsewhere herein. The forecaster module 190 can map 1506 each list to a base grid of initial values. In some implementations, the initial values may all equal zero or some other base value. In some implementations, the forecaster module 190 may use the elapsed days and associated price change (e.g., percent) values to identify certain coordinate points in the base grid update the grid values at the coordinate points with another value (e.g., reflecting the existence of a price change on that day) (e.g., 1).

For each base grid, the forecasting module 190 can interpolate between coordinate points to produce a continuous data set. In some implementations, a two-step interpolation may be performed, although it should be understood that other interpolation algorithms may be used. By way of further example, the forecasting module 190 may perform 1508 a linear interpolation to fill in gaps between the identified coordinate points that have values of one and to generate a linear interpolated grid, and, referring to FIG. 15B, for each linear interpolated grid, the forecasting module 190 can perform 1510 a modified bi-linear interpolation to generate a bi-linear interpolated grid, which is equivalent to smooth slopes of a surface of the linear interpolated grid when represented in three dimensions. As more than one grid is often create in a typical example, the forecasting module 190 can then add 1512 each bi-linear interpolated grid together to create a composite grid. In some implementations, the forecasting module 190 computes the composite grid by adding bilinear interpolated grids together and dividing the sum total by the total number of grids used to achieve the sum (e.g., using matrix mathematics).

Next, the forecasting module 190 can generate a probability map based on the composite grid. In some implementations, the probability map may include different colors coded to different price probabilities. For instance, the forecasting module 190 may covert 1514 grid values in the composite grid to color values and create 1516 a probability map for the composite grid using the color values. As a further example, the forecasting module 190 may translate the percent composite grid to a color value (e.g. a percent value of 100% corresponding to the color white, and the color black corresponding to a percent value of 0%). In some instances, the color values in the percent composite grid are mapped to gradient colors (e.g. yellow, red, violet, blue, etc.) as discussed elsewhere herein.

In some implementations, when suitable, the forecasting module 190 can interpolate 1518 the probability map to a desired display size so that the probability map fits the data that the probability map corresponds to. In some examples, the point of reference for the probability map may be the current day and the probability map may provide price projections up to a certain point in the future (e.g., 180 days). In some examples, the point of reference for the probability map may be a point in time corresponding to one of the financial dimension instances and the probability map may be layered over the financial instrument data of the financial instrument (e.g., see FIG. 8B). This is advantageous as it allows the user to compare what actually happened in the financial instruments history to what is projected to have happened, therefore allowing the user to assess the accuracy of the projections provided by the probability map (e.g., see FIG. 8C).

Figure 16:
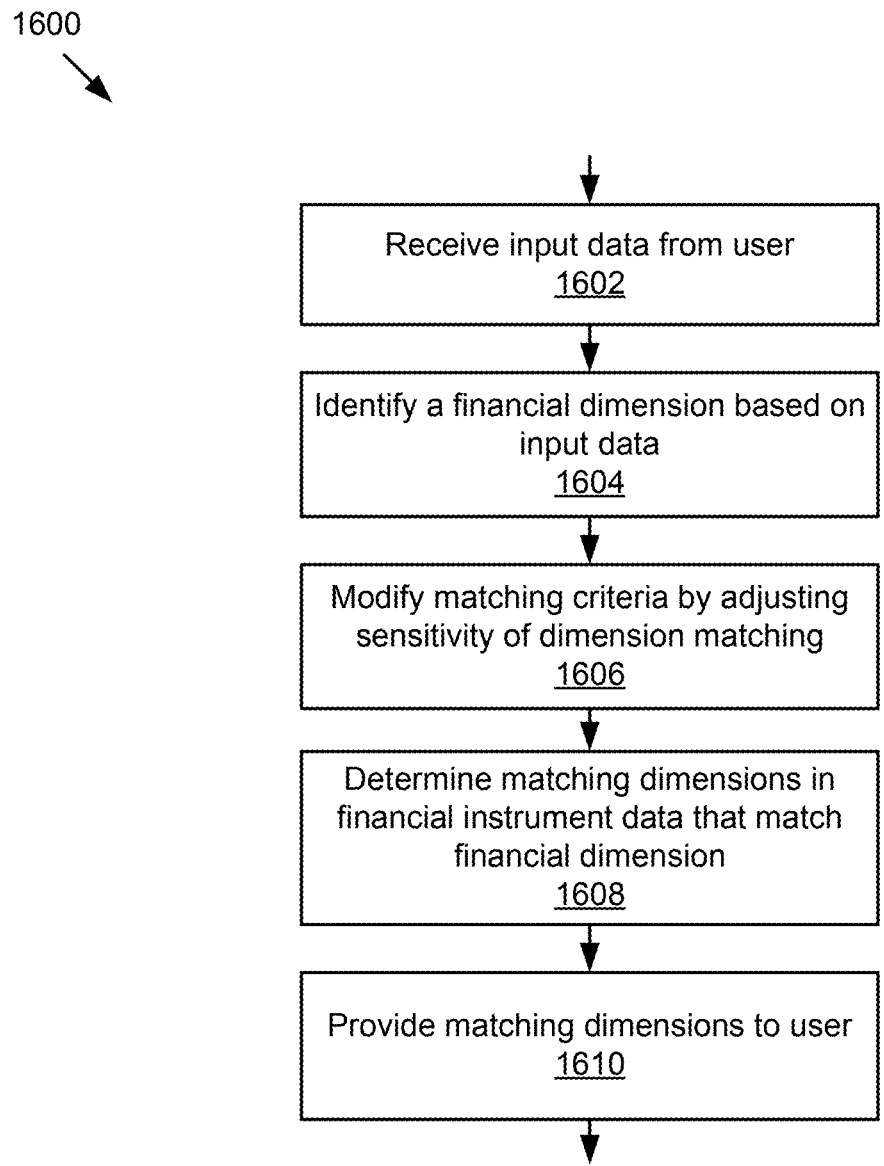
FIG. 16 is a flowchart of an example method for determining a financial dimension.

FIG. 16 is a flowchart of an example method 1600 for determining a financial dimension. The management module 186 can receive 1602 input data from a user. The applicable recognizer 182 can identify 1604 a financial dimension based on the input data. In some implementations, the management module 186, the user-defined pattern module 192, or another module, may select or generate the recognizer 182 based on the input data. The recognizer 182 can modify 1606 matching criteria by adjusting sensitivity for the dimension matching. For example, a higher sensitivity may require a closer match to the financial dimension while a lower sensitivity may be more permissive in finding patterns or events similar to the financial dimension. The recognizer 192 can determine 1608 matching dimensions in the financial instrument data that match the financial dimension. For example, the recognizer 182 is configured to determine patterns or events in the financial instrument data that match a predetermined pattern or event. The management module 186 can provide 1610 the matching occurrences of the dimension to the user.

Figure 17:
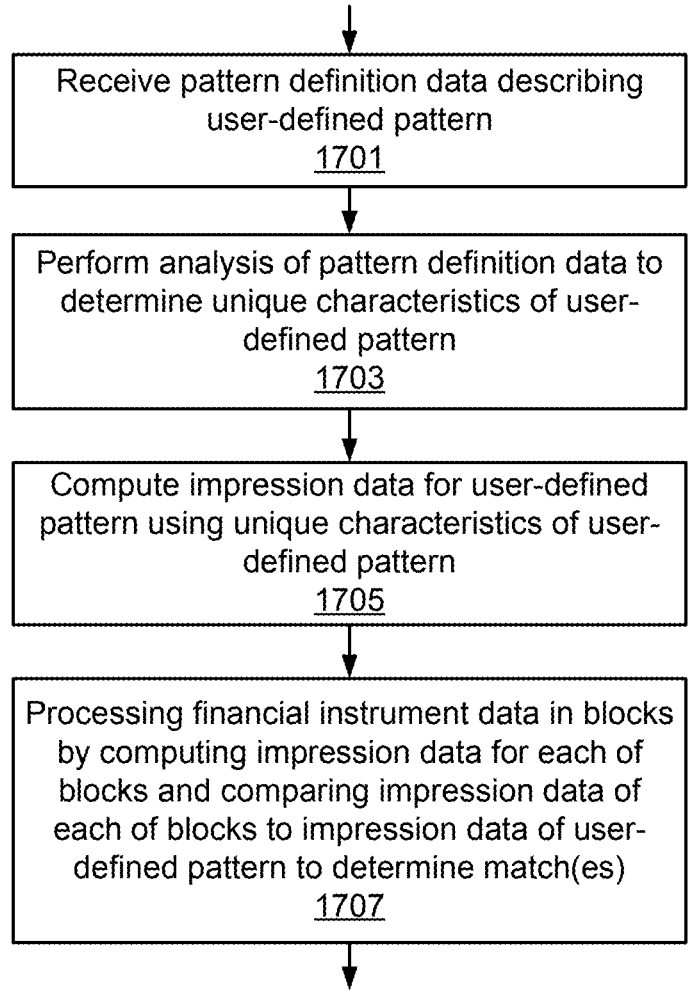
FIG. 17 is a flowchart of an example method for processing financial instrument data using a user-defined pattern.

FIG. 17 is a flowchart of an example method 1700 for processing financial instrument data using a user-defined pattern. In this method 1700, user-defined pattern module 192 they receive 1701 pattern definition data describing user-defined pattern. In some implementations, the user-defined pattern module 192 may receive the pattern definition data from another component of the analysis server 122, such as the management module 186, the data store 160, etc. The user-defined pattern module 192 may perform 1703 an analysis of the pattern definition data to determine unique characteristics of the user-defined pattern and compute 1705 impression data for the user-defined pattern using the unique characteristics of the user-defined pattern. Next, a corresponding recognizer 182 may process 1707 certain financial instrument data using the impression data to determine at which point dimensions of the financial instrument data match the impression data. In some implementations, the recognizer 182 may process the financial instrument data in blocks. For instance, the recognizer 182 may compute impression data for each of the blocks and compare the impression data with the impression data of the user-defined pattern to determine matches between them. In some implementations, the matches may be strict or loose depending on the configured sensitivity, as discussed elsewhere herein.

Figure 18:
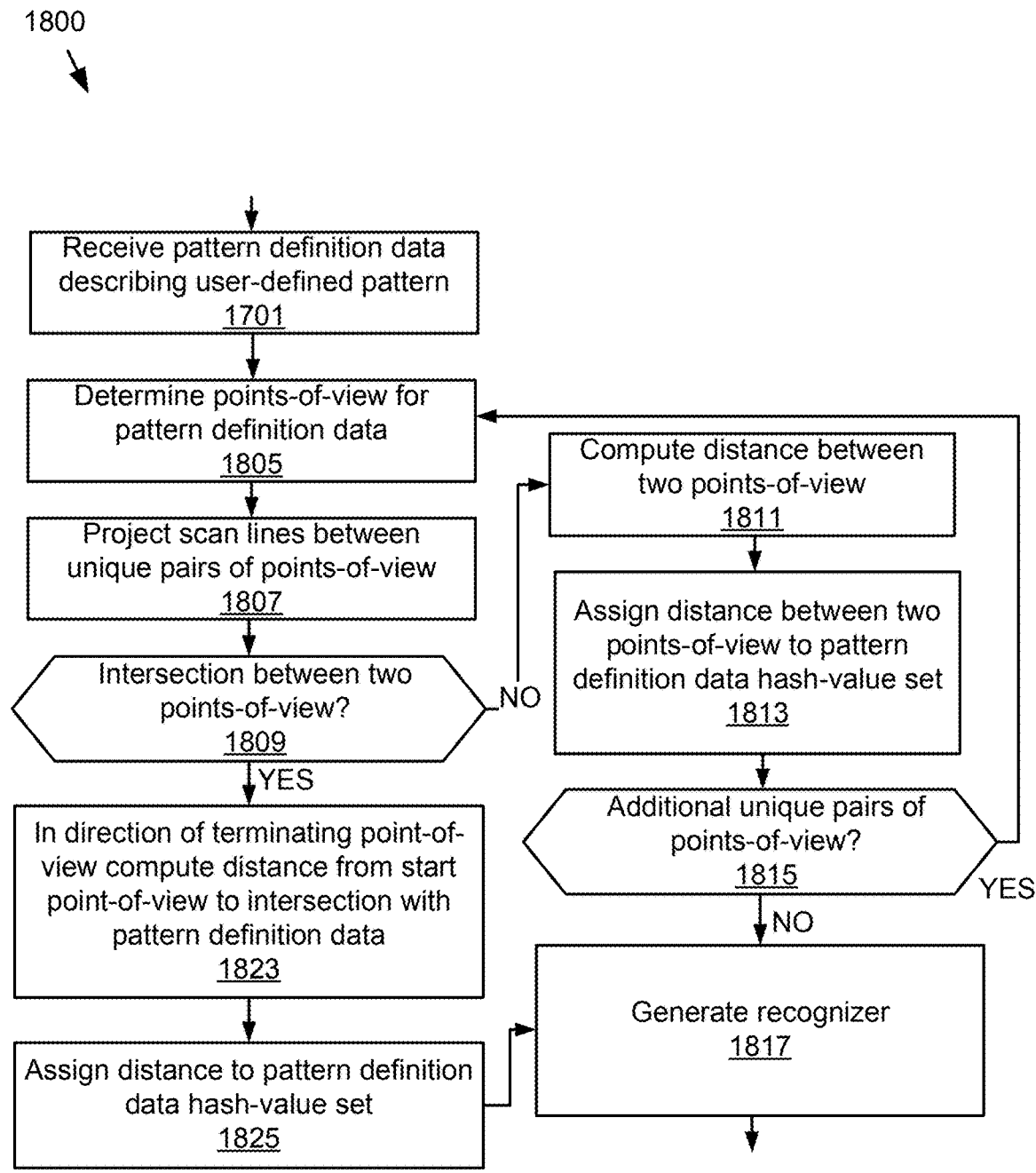
FIG. 18 is a flowchart of an example method for processing pattern definition data.

FIG. 18 is a flowchart of an example method 1800 for processing pattern definition data. In this method 1800, the user-defined pattern module 192 receives 1701 pattern definition data describing a user-defined pattern. In some instances, the user-defined pattern module 192 may receive the pattern definition data from the management module 186 or another component of the analysis server 122. Next, the user-defined pattern module 192 determines a block size for the pattern and based thereon determines 1805 points of view for the pattern definition data. The user-defined pattern module 192 projects 1807 scan lines between unique pairs of points of view. For each of the unique pairs of points of view, the user-defined pattern module 192 determines 1809 whether the projected scan lines intersect with the pattern definition data, which may reflect a polyline. Each projected scan line is projected from the starting point of view to a terminating point of view of that unique pair of points of view. If the determination in block 1809 is affirmative, the user-defined pattern module 192 computes 1823 a distance from the starting point of view to the intersection with the pattern definition data in the direction of a terminating point of view and then assigns 1825 the distance to hash-value set associated with the analysis of the pattern definition data. If the determination in block 1809 is negative, the user-defined pattern module 192 computes 1811 the distance between the pair of points of view (e.g., between the starting point of view to the terminating point of view) and assigns 1813 that distance between the points of view to the hash-value set. The user-defined pattern module 192 then determines if there are additional unique pairs of points of view to process, and if so returns to block 1805 to process the next pair. In some implementations, the user-defined pattern module 192 may skip unique pairs of points of view if the points of view are aligned vertical or horizontally, as their scan lines do not intersect with the user-defined pattern. If the determination in block 1815 is negative, the user-defined pattern module 192 generates a corresponding recognizer configured to process financial instrument data using the hash-value set. As discussed further elsewhere herein, FIGS. 25A-25D illustrate an example method for computing intersections between points-of-view and FIG. 26 depicts an interface including an example hash-value set generated based on a pattern.

Figure 19:
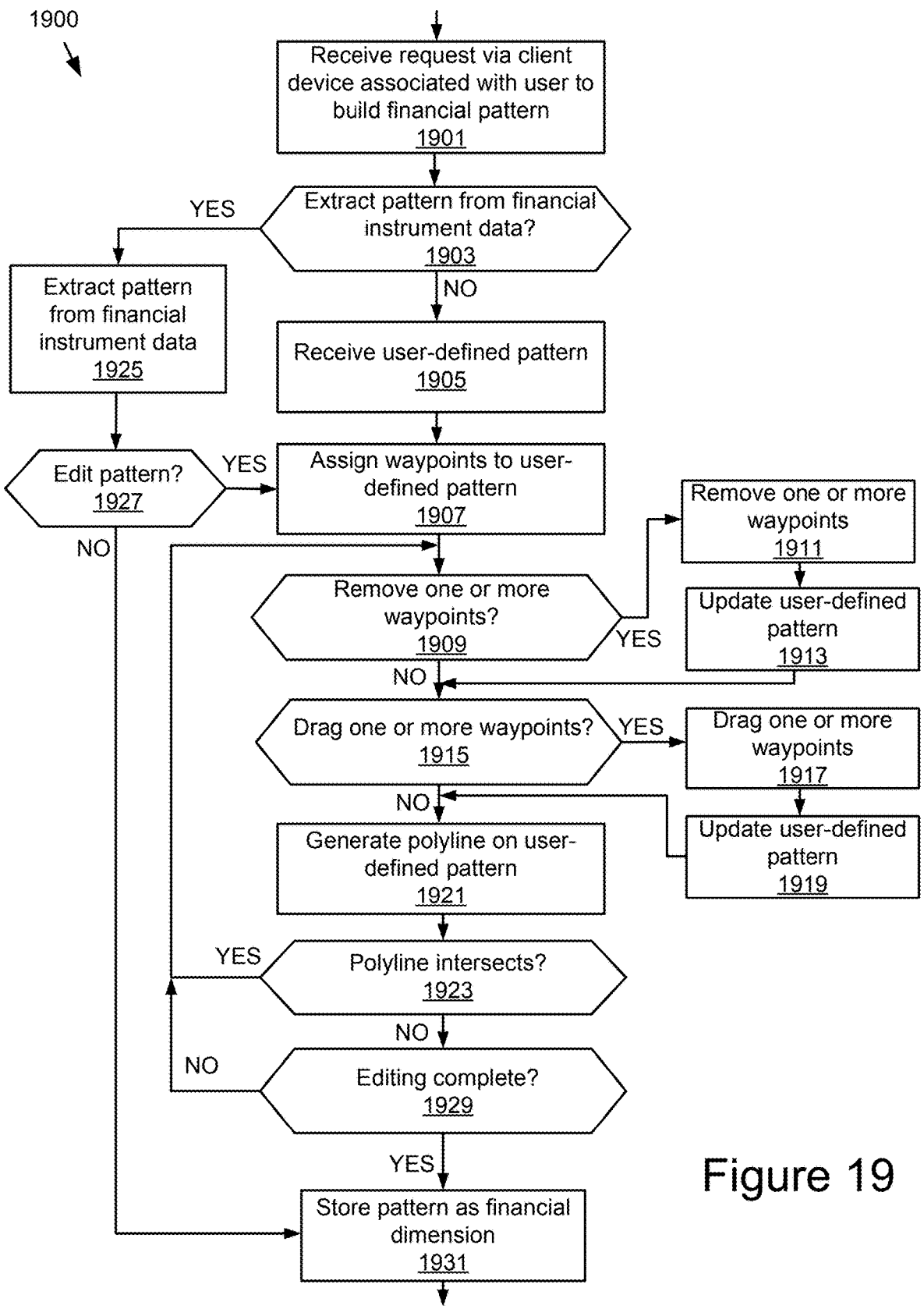
FIG. 19 is a flowchart of an example method for defining a pattern.

FIG. 19 is a flowchart of an example method 1900 for defining a pattern. In this method 1900, the management module 186 receives 1901 a request via the client device associated with the user to build a financial pattern. In block 1903, the management module 186 determines whether the pattern is to be extracted from financial instrument data. For example, the user may have input a selection of a portion of financial instrument data that he or she wishes to use as the user-defined pattern (e.g., see FIG. 10B), and the management module 186 may receive the pattern definition data and determine that the pattern should be extracted from the financial instrument data based thereon. If the determination in block 1903 is affirmative, the management module 186 may signal the user-defined pattern module 192 to extract 1925 pattern from the financial instrument data and the user-defined pattern module 192 may proceed accordingly, as discussed elsewhere herein.

By way of example and not limitation, in some implementations, a user may highlight a set of prices in a chart using a corresponding interface, and responsive thereto, the management module 196 triggers the display of a dialog asking the user if the user wishes to save the highlighted set of prices as a user-defined pattern. In this example, if the user chooses not to save the set, the management module 192 may un-highlight the highlighted set of prices in the chart and close the dialog. On the other hand, if the user chooses to save the set as user-defined pattern, the user-defined pattern is loaded into an editing interface by the management module 186, with which the user can further modify and/or save the pattern as discussed elsewhere herein. Once saved, the user-defined pattern module 184 processes the pattern data, generates a recognizer 182 based on it, and stores the recognizer 182 in the list of available recognizers in the instrument analysis application 116 for later selection and/or use by the user, as discussed elsewhere herein.

Next, the user-defined pattern module 192 may determine whether to edit the extracted pattern in block 1927. If the determination in block 1927 is affirmative, the user-defined pattern module 192 may assign 1907 waypoints to the user-defined pattern trigger the management module 186 to display an editing interface for the user to use to modify the pattern, as discussed elsewhere herein. If the determination in block 1927 is negative, the user-defined pattern module 192 may generate a recognizer 182 to recognize extracted pattern and/or store the recognizer and the extracted pattern (as a financial dimension) in the data store 160.

Returning to block 1903, if the determination in this block is negative, the management module 186 may receive the user-defined pattern, which the user may enter using an editing interface presented by the management module 186.

Figure 22:
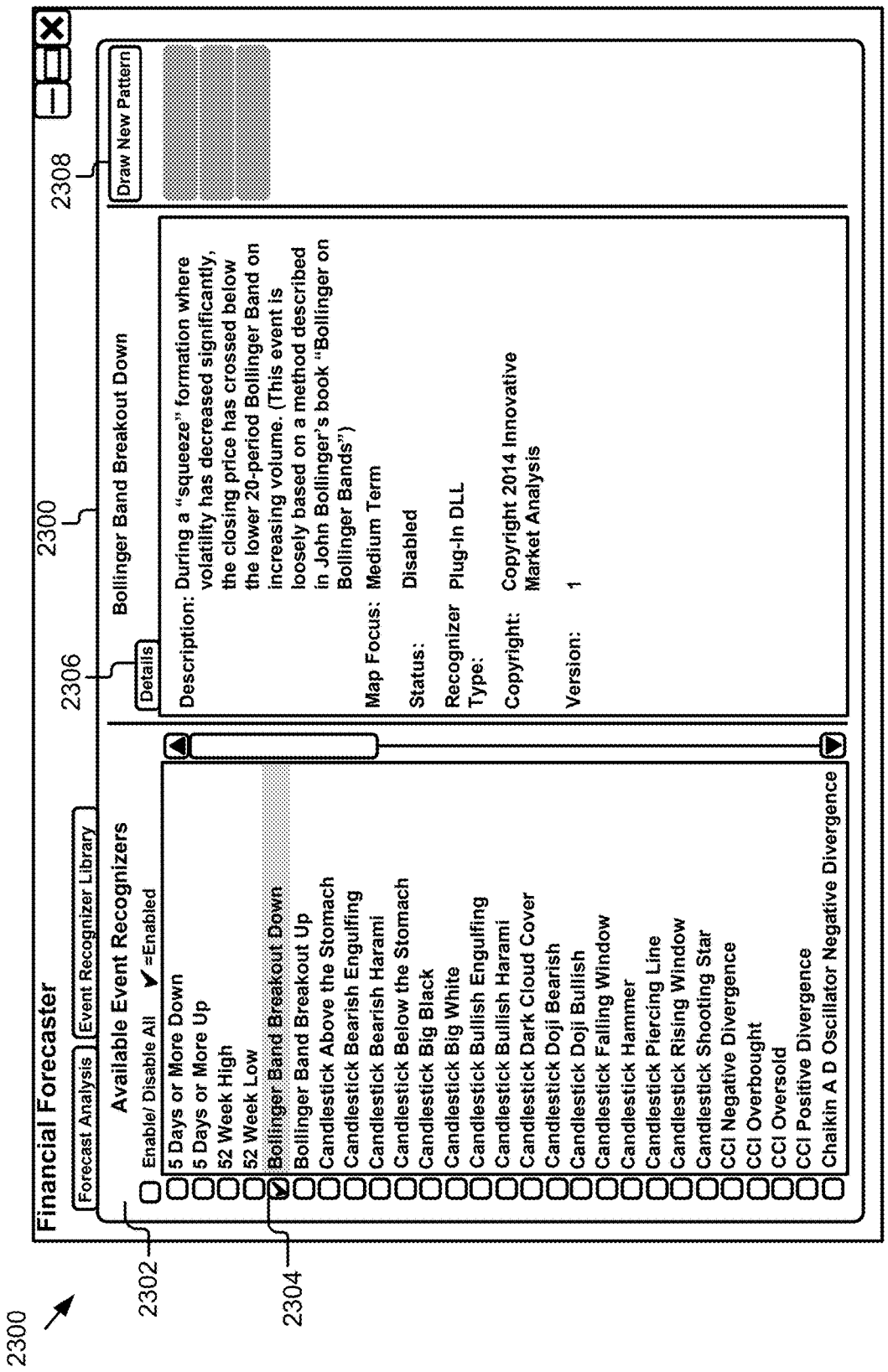
FIG. 22 is a graphical representation of an example graphical user interface for selecting available recognizers and/or selecting to draw a pattern.
Figure 23A:
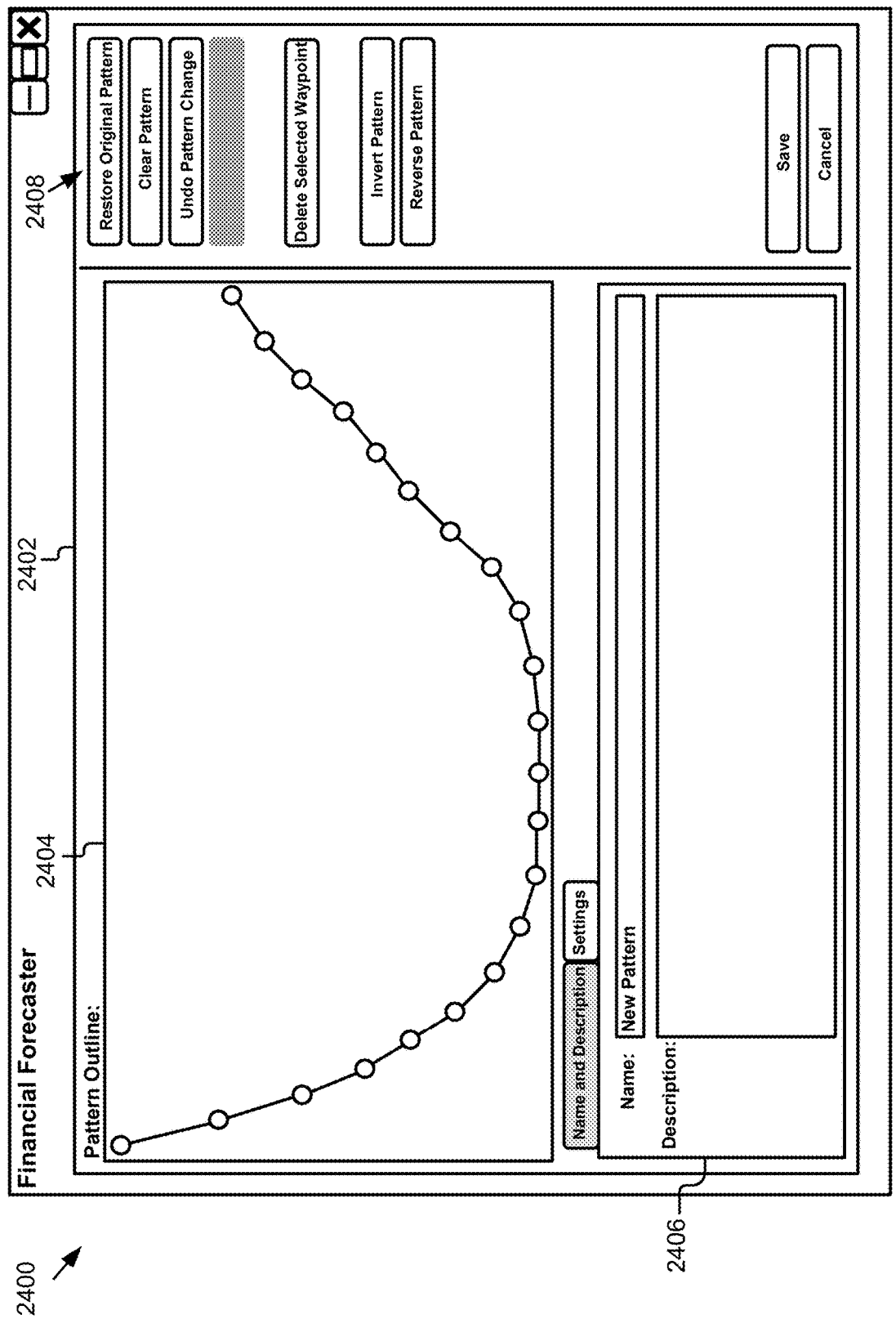
FIGS. 23A-23C are graphical representations of an example graphical user interface for drawing and editing a user-defined pattern.
Figure 23B:
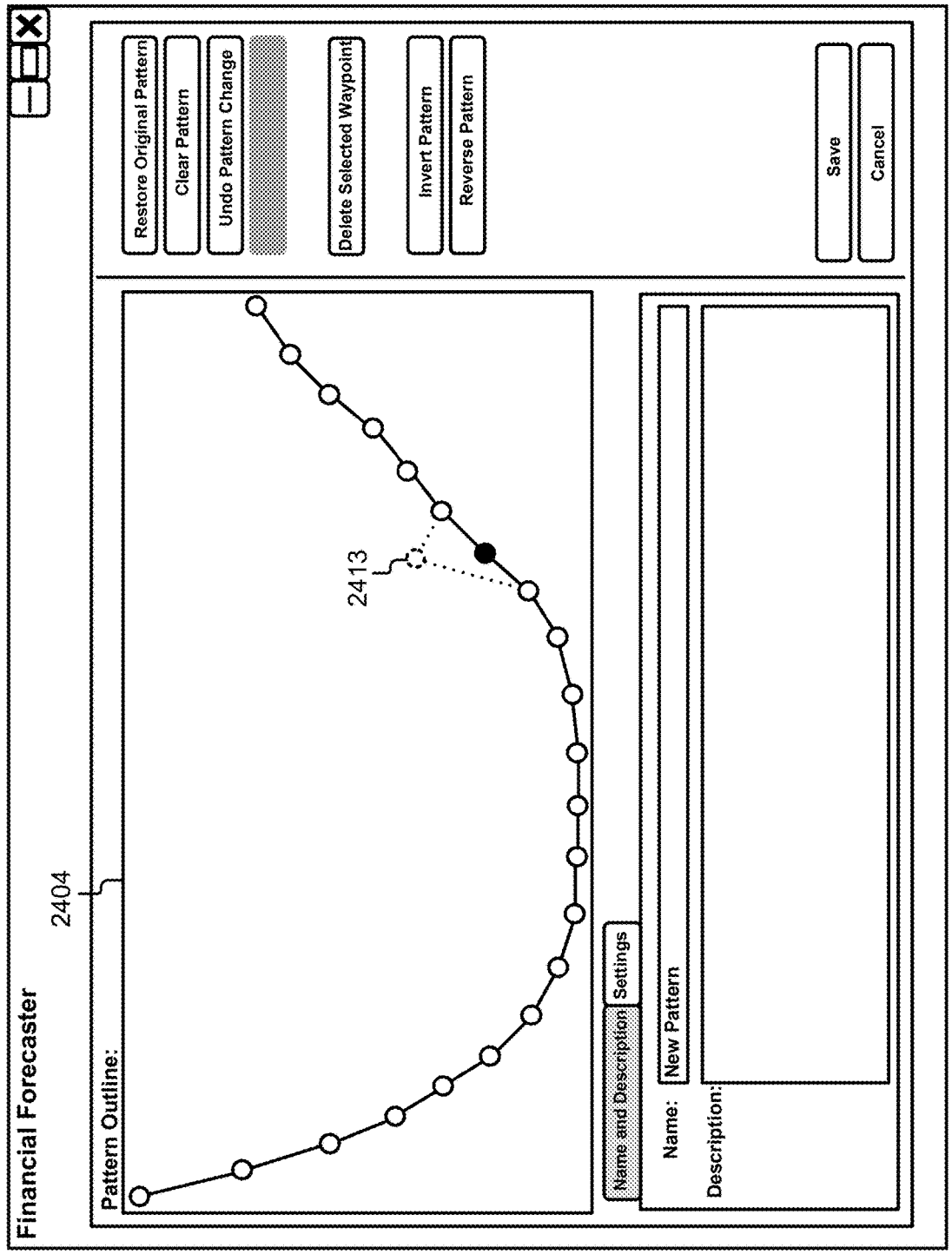
Figure 23C:
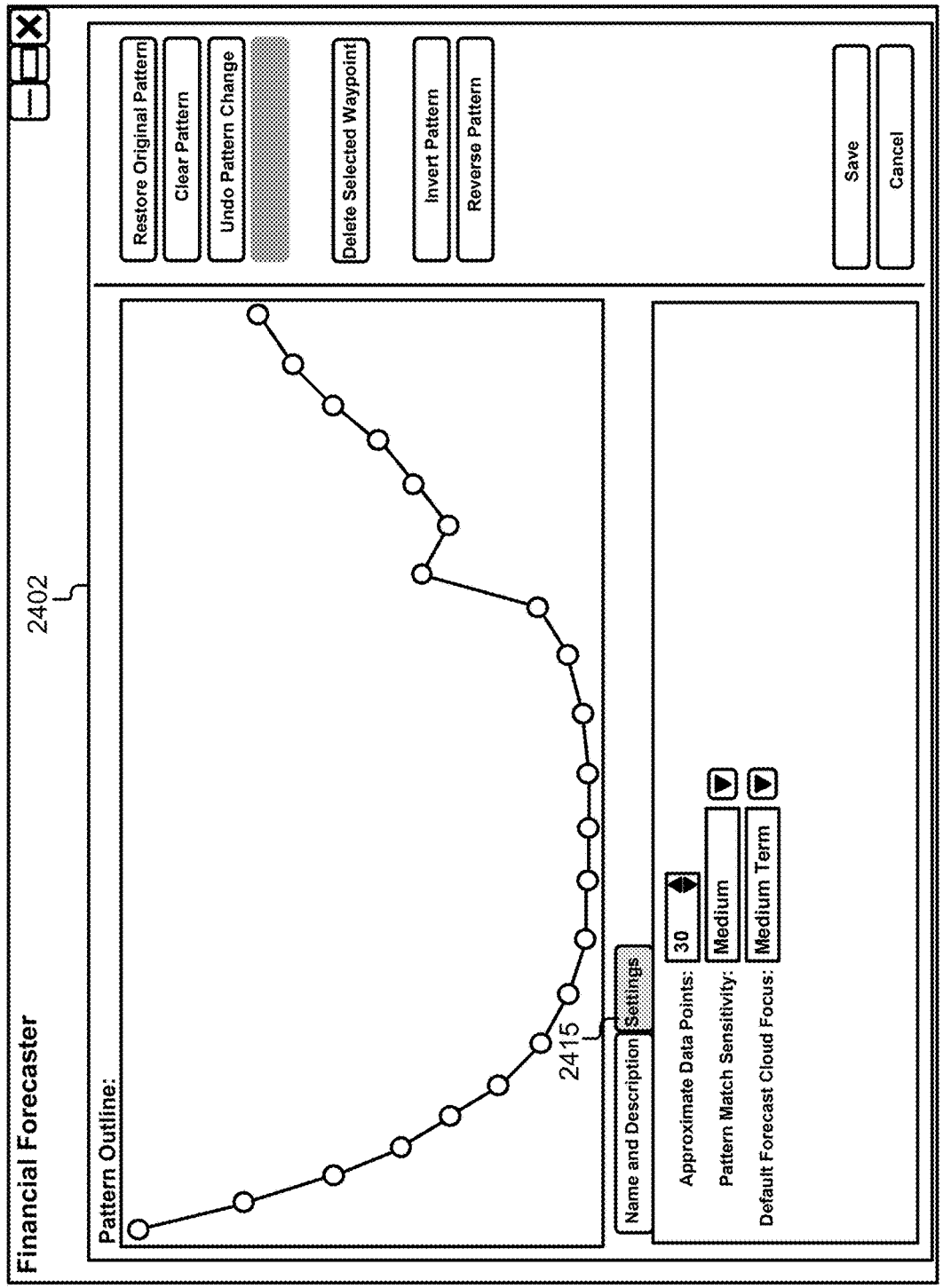

For example, FIG. 22 is a graphical representation of an example user interface 2300 for selecting available recognizers and/or selecting to draw a pattern. For example, the interface 2300 includes a scroll view 2302 is populated with a plurality of different available event recognizers. In this example, the event recognizer for recognizing the financial dimension of "Bollinger band breakout down" is selected using checkbox 2304. In correspondence with the selection, the window 2306 is populated with information about the selection. Alternatively, the user may select to be drawn new pattern button 2308 to enter an interface that provides user with interface elements for defining his or her own pattern, as shown in FIGS. 23A-23C

Returning to block 1905, the user-defined pattern module 192 receives the user-defined pattern and then assigns waypoints to the user-defined pattern. In some implementations, the user may specify the number of waypoints to assign user-defined (e.g., via settings menu). Next, the user-defined pattern module 192 may determine whether the user wishes to remove one or more waypoints based on input received from the user. If the determination in block 1909 is affirmative, the user-defined pattern module 192 removes 1911 the one or more waypoints and updates 1913 the user-defined pattern based on the removal thereof. The method 1900 then proceeds to block 1915.

If the determination in block 1909 is negative, the user-defined pattern module 192 determines 1915 whether one or more waypoints have been dragged. If so, the user-defined pattern module 192 drags 1917 the one or more waypoints and updates 1919 the user-defined pattern based thereon. The method 1900 then returns to block 1921. If the determination in block 1915 is negative, the user-defined pattern module 192 generates a polyline based on the user-defined pattern. In block 1923, the user-defined pattern module 192 determines 1929 whether the polyline intersects with itself. If so, the user-defined pattern module 192 may return to block 1909 and/or prompt the user to reedit the user-defined pattern so that the polyline does not intersect with itself. This is advantageous in implementations where the financial instrument data is continuous over time and does note revert on itself, as matching use that intersecting polyline would be useless/not yield any matches.

If in block 1929 the determination is negative, the user-defined pattern module 192 determines 1931 whether editing is complete. In some instances, a user may select the save button, which may trigger a signal to the management module 186 to save the user-defined pattern. The management module 186 may then signal the user-defined pattern module 192 to save the pattern to the data store 160 has pattern data and/or initiate a generation of a corresponding recognizer 182, as discussed elsewhere herein.

Figure 23D:
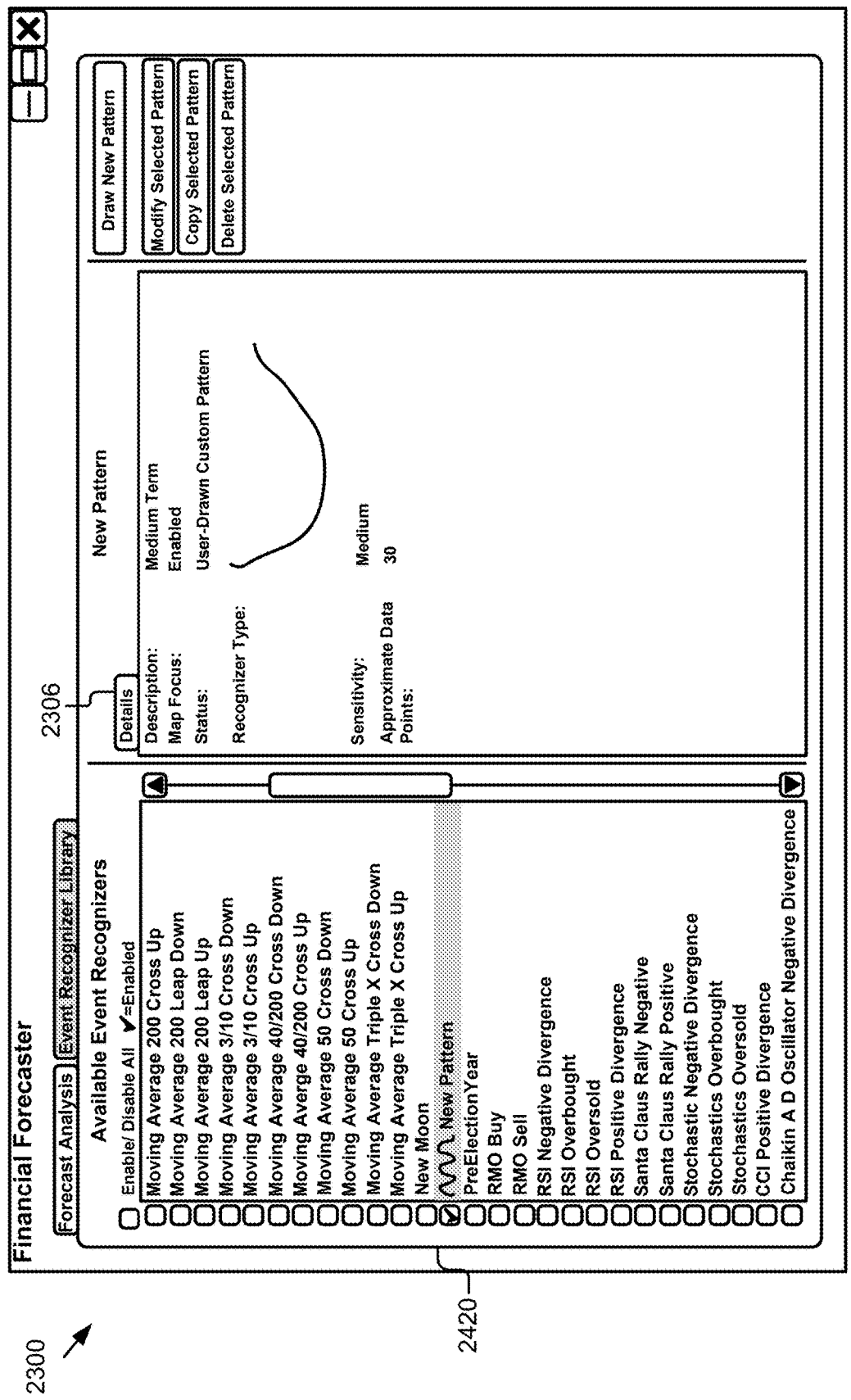
FIG. 23D is a graphical representation of an example graphical user interface populated with a newly defined pattern defined by the user.

By way of further example, FIGS. 23A-23C are graphic representations of an example interface 2400 for drawing and editing a user-defined pattern. In FIG. 23A, the interface 2400 includes a window 2402 having a drawing region 2404 for drawing the user-defined pattern and a description region 2406 for entering a description about pattern drawn in the drawing region 2404. The interface 2400 also includes editing options such as buttons for restoring the original pattern drawn, clearing the pattern, and doing a particular pattern change, deleting the selected waypoint, inverting the pattern, reversing the pattern, saving the pattern, and canceling out of the interface. In FIG. 23B, the user has selected a particular waypoint 2413 and dragged it upward to modify the polyline drawn in the drawing region 2404. Numerous other actions may be performed by the user with the waypoints such as reverting change, deleting the waypoint, modifying the other waypoints, etc. In FIG. 23C, the user has selected the settings tab 2415 which includes various options related to the definition of the pattern. For example, the approximate number of data points may be changed, the pattern sensitivity matching for this pattern may be adjusted from medium to strict or loose, and the default forecast cloud focus and be adjusted from medium term to long-term or short-term depending on the desire of the user. This is advantageous as some patterns may be more accurate for shorter or longer term focus. In addition, some patterns may easily match financial instrument data while others may be more difficult to match to financial instrument data, and adjusting the pattern match sensitivity may increase the number of identified dimension instances, and thereby increase the sample set and the accuracy of the forecast cloud in some instances. FIG. 23D is a graphic representation of the example user interface 2300 populated with the newly defined pattern 2420 entered by the user, which is now stored in association with the user profile of the user for convent selection, editing, and usage. In addition, upon selection of the newly defined pattern 2420, the window 2306 of the interface 2300 is populated with information describing the user-defined pattern, providing the user with convenient access to that information.

In some implementations, the user may select multiple waypoints on the user-defined pattern and drag the multiple waypoints simultaneously, and responsive thereto, the user-defined pattern module 192 may update the positions of the waypoints accordingly. For instance, multiple waypoints may be selected by the user using a pointing device operation (e.g., mouse drag, touchscreen selection, etc.) for positioning and sizing a selection window over a region including the waypoints to be selected. The selected waypoints may then be dragged around the drawing region 2404 by the user using a corresponding dragging input. The user may move a portion of the pattern or the entire pattern around the drawing region 2404 at the same time. The user may also perform other operations on multiple waypoints concurrently as well, such as scaling or deleting the waypoints. This is advantageous as it allows the user to easily position the pattern within the drawing window/canvas. In addition, in instances where relative location and orientation of the pattern are important to the user (e.g., see FIG. 27B), moving the waypoints together allows the user to precisely define the location and orientation of the pattern within the block/window.

Figure 20:
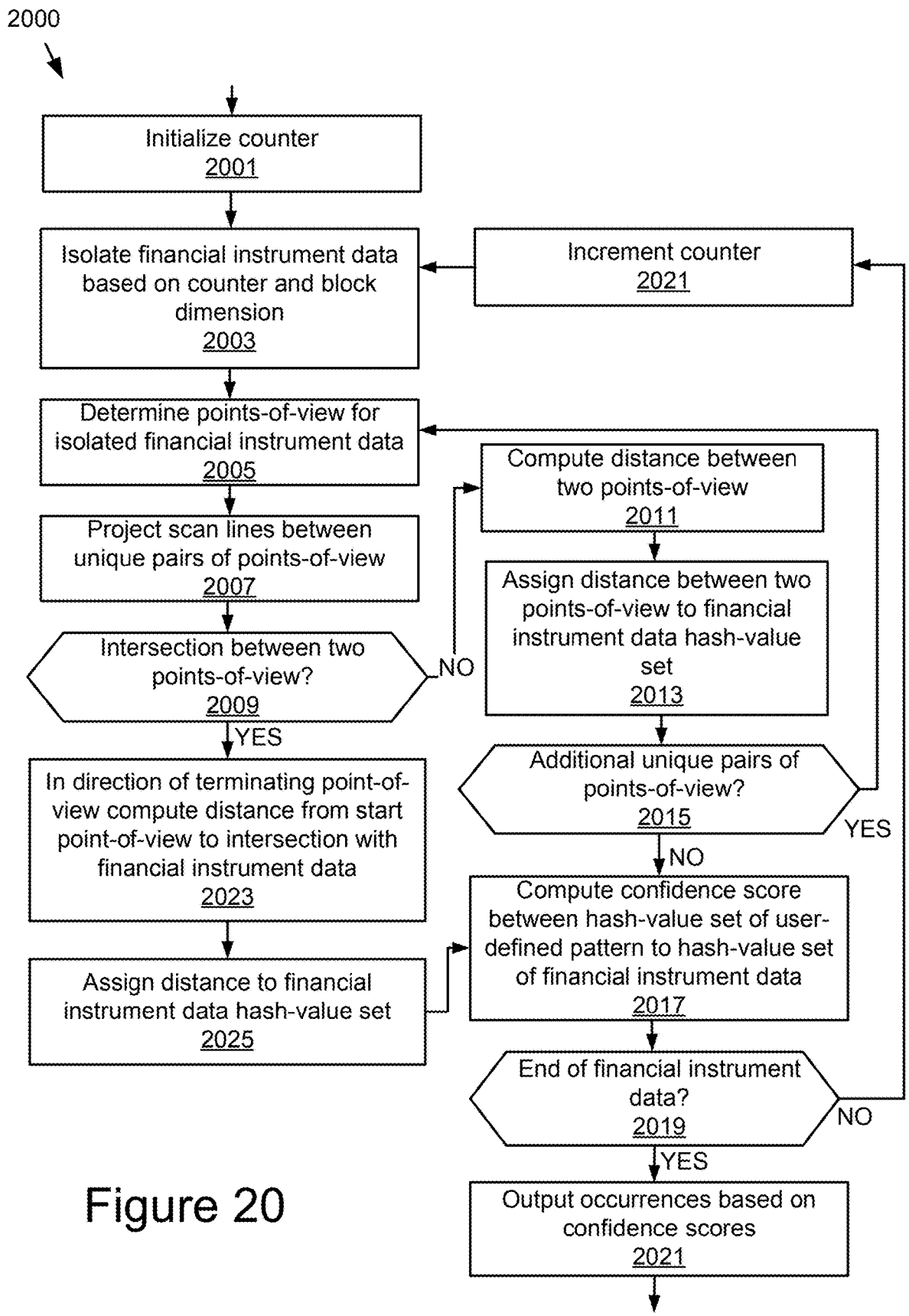
FIG. 20 is a flowchart of an example method for determining matches between the user-defined pattern and financial instrument data.

FIG. 20 is a flowchart of an example method 2000 for determining matches between the user-defined pattern and financial instrument data. In this method 2000, a recognizer 182 corresponding to the user-defined pattern initializes 2001 a counter. The counter is used to traverse the financial instrument data. The recognizer 182 isolates 2003 a portion of the financial instrument data based on the counter and the block dimension associated with the user-defined pattern and determines 2005 points of view for the isolated financial instrument data. Next, the recognizer 182 projects 2007 scan lines between unique pairs of the points of view. For each unique pair of points of view, the recognizer 182 determines 2009 whether the projected scan line intersects with the isolated financial instrument data. The projected scan line is projected from the starting point of view to a terminating point of view of that unique pair of points of view. If the determination in block 2009 is affirmative, the recognizer 182 computes 2023 a distance from the starting point of view to the intersection with the financial instrument data in the direction of a terminating point of view and then assigns 2025 the distance to hash-value set associated with the analysis of the financial instrument data.

By way of further illustration and not limitation, FIG. 26 is a graphical representation of a graphical user interface 2700 depicting points-of-view N1-N12 and hash-value table 2704 storing hash-values of the distances associated with the points-of-view N1-N12. In particular, the interface 2700 includes a pattern viewing region 2702 depicted example scan lines protected between example node pairs N1:N5, N1:N6, N1:N7, N1:N8, and N1:N9 and N3:N5; N3:N6; N3:N7; N3:N8, N3:N9; N3:N10; N3:N11; and N3:N12. The distances (e.g., length of the lines) between the originating points N1 and N3 and points at which the scan lines projected from the originating points intersect with the pattern 2703, such as intersection 2701, are mapped as values in the hash-value table 1704, such as in rows 2706a and 2706c. If the pattern 2703 is designed such that a scan line does not intersect with the pattern 2703, the distance between that pair of nodes/points is used in the hash table.

Returning to FIG. 20, if the determination in block 2009 is negative, the recognizer 182 computes 2011 the distance between the pair of points of view (e.g., between the starting point of view to the terminating point of view) and assigns 2013 that distance between the points of view to the hash-value set. The recognizer 182 then determines if there are additional unique pairs of points of view to process, and if so returns to block 2005 to process the next pair.

Figure 25B:
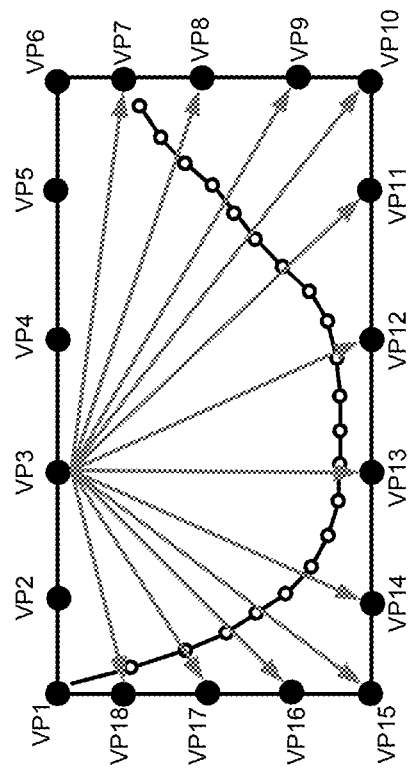
FIGS. 25A-25D are diagrams illustrating an example method for computing distances association with points-of-view.
Figure 25D:
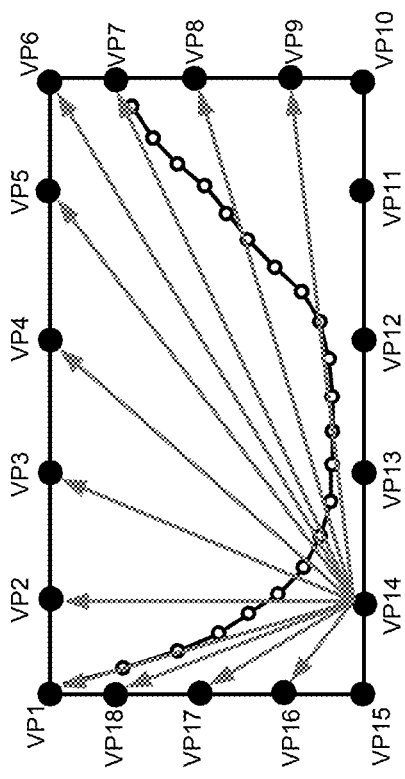
Figure 25A:
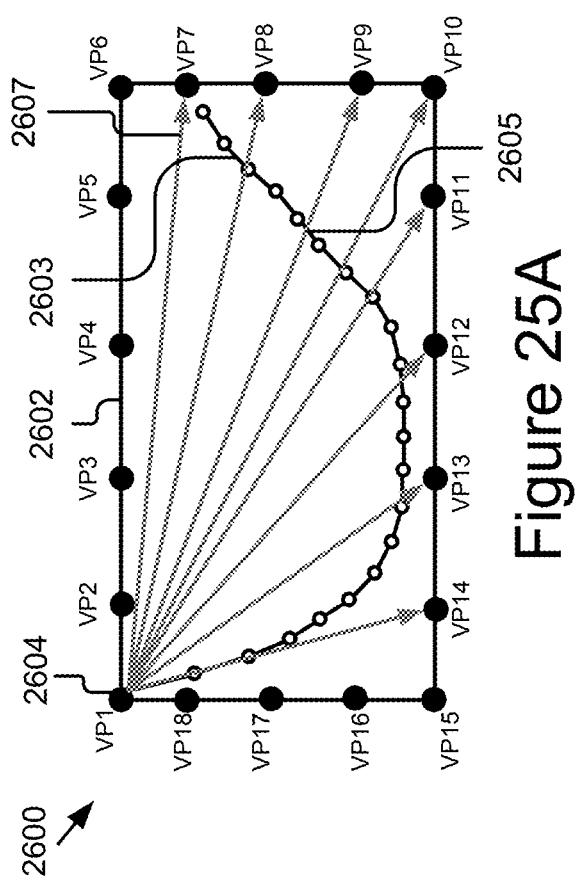
Figure 25C:
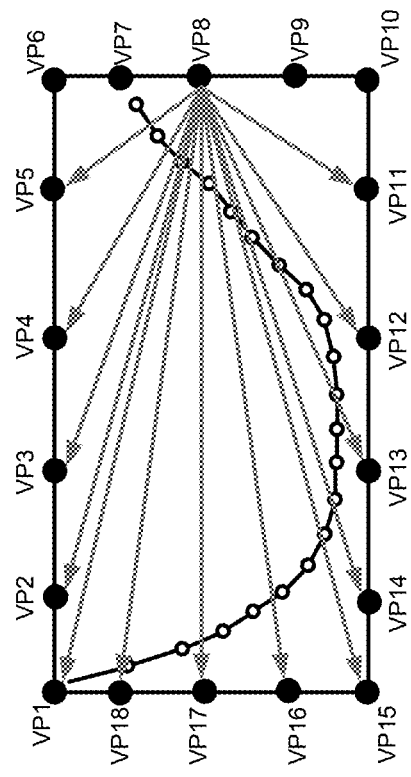
Figure 26:
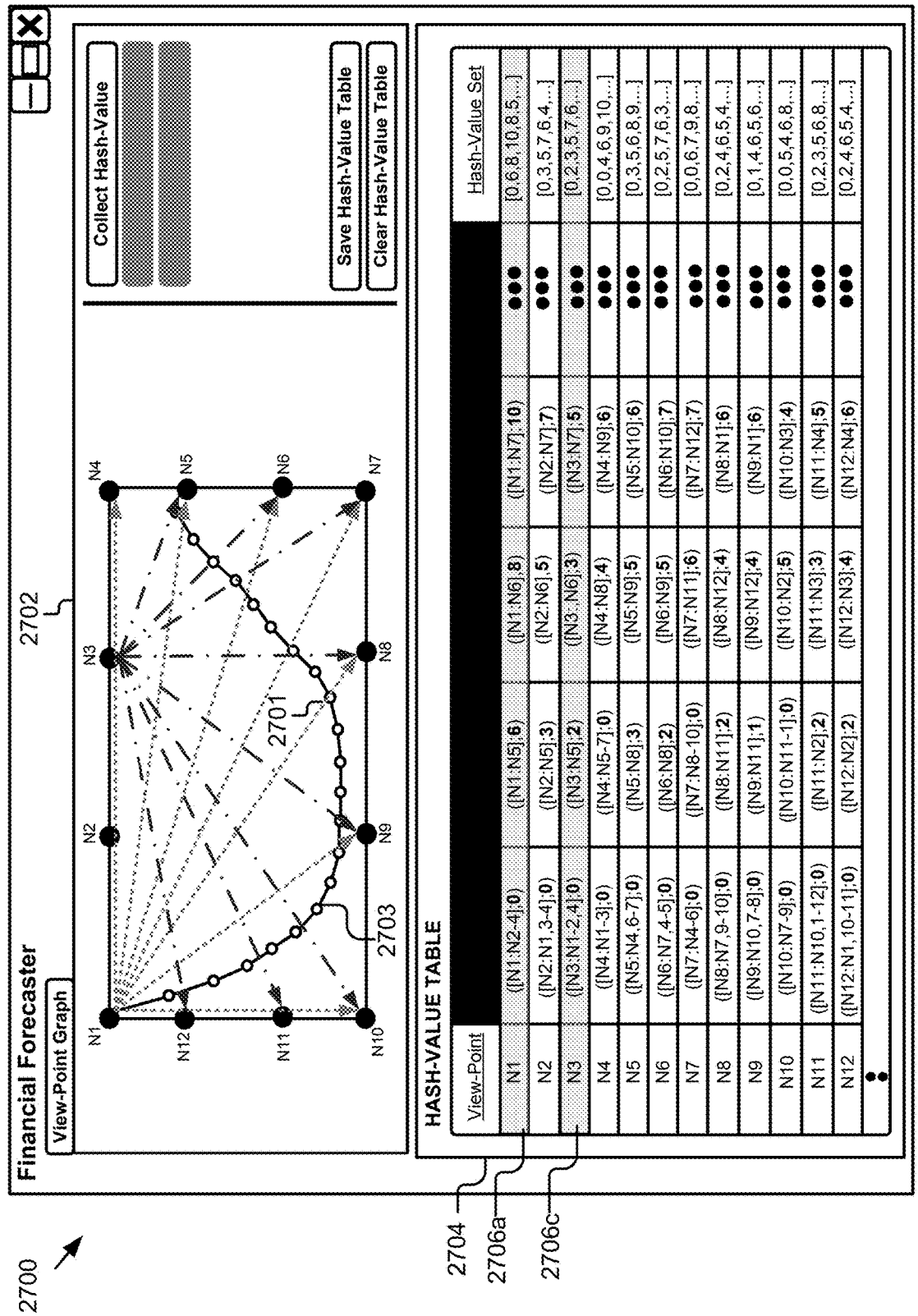
FIG. 26 is a graphical representation of an example method for computing intersections between points-of-view and storing hash-values in a hash-value table.

By way of illustration and not limitation, FIGS. 25A-25D are diagrams illustrating an example method 2600 for computing distances association with points-of-view. In FIG. 25A, example scan lines projected from the first viewpoint (VP1) to the other viewpoints located across the scan field 2602 (also referred to as the block), such as VP7-VP14. The point at which the scan lines intersect with the pattern 2603, such as intersection 2605, are determined and the distances between the originating point of view (e.g., VP1) and each intersection (e.g., 2605) are stored (e.g., in a hash table), as discussed elsewhere herein. In instances where a given scan lines is not intersect with the pattern 2605, such as scan line

2607, the method 2600 computes the distance between the pair of points of view (e.g., the length of the scan line). The method 2600 increments through each unique pair of originating and terminating viewpoints and computes the corresponding distances, which are used to determine matches between the financial dimension and a portion of the financial instrument data being analyzed. For instance, in FIG. 25B, scan lines are projected from VP3, in FIG. 25C scan lines are projected from VP8, and in FIG. 25D scan lines are projected from VP14.

As discussed elsewhere herein, in some implementations, the method 2700 may be modified to disregard horizontal and vertical scan lines radiating from each point of view for the ease of computational processing, as processing length sets of financial instrument data using this data can be demanding and optimizing the calculations as described herein accelerates processing by offloading unneeded computationally intensive iterations. In some instances, the eliminated points of view that are horizontal and vertical of an originating point of view have zero slope or undefined slope. In some further instances, the method 2700 may disregard corner points of view (e.g., upper left corner, upper right corner, lower left corner, and lower right corner).

If the determination in block 2015 is negative, the recognizer 182 computes 2017 a confidence score between the hash-value set of the user-defined pattern to the hash-value set of the financial instrument data. The confidence score may be used to determine whether or not this process block should be identified as an occurrence of the user-defined pattern, as shown in block 2021.

Next, the recognizer 182 determines 2019 whether the end of financial instrument data has been reached. If not, the recognizer 182 increments 2021 the counter and proceeds to isolate the next portion of financial instrument data based on the counter in the block dimension associated with the user-defined pattern. In some instances, incrementing the counter, the recognizer 182 may refer to the confidence score for the set of data just processed to determine whether or not a highly significant match had been identified. This way, rather than incrementing through each data point of the financial instrument data (e.g. trading day), the recognizer 182 may skip ahead to the data point corresponding to the data point coming after the end of the block of the previous iteration. For example, if the previous match of 30 data points of the user-defined pattern as a confidence of 95% or greater, the recognizer 182 may skip over the data points corresponding to the 30 data points of the user-defined pattern and proceed to isolate the financial instrument data there by incrementing the counter accordingly.

In block 2021, the recognizer 182 may the occurrences in the financial instrument data matching the user-defined pattern. For instance, occurrences with confidence scores above a certain threshold may be included in the output. The threshold may be user or system configured. In some instances, a given pattern may be more ubiquitous and the user may set a more strict threshold (e.g., 75%, 80%, +, etc.) to filter out potentially misleading matches. In other cases, the pattern may be more rare and the user may select a looser threshold (e.g., 50%, 55%, +, etc.) to capture approximate matches. In some instances, the recognizer 182 may automatically determine how strictly to set the threshold based on the number of possible matches. For instances, as the number of possible matches increases, the strictness of the threshold may be corresponding increased and vice versa. Numerous other variations are also possible and contemplated. In some implementation, as output, the recognizer 182 may output a list of dates and/or other associated information that correspond to the pattern matches to the analysis module 188 for statistical analysis as discussed elsewhere herein, although other variations are possible, such as outputting unique IDs for the pattern matches or other suitable data types.

Figure 24A:
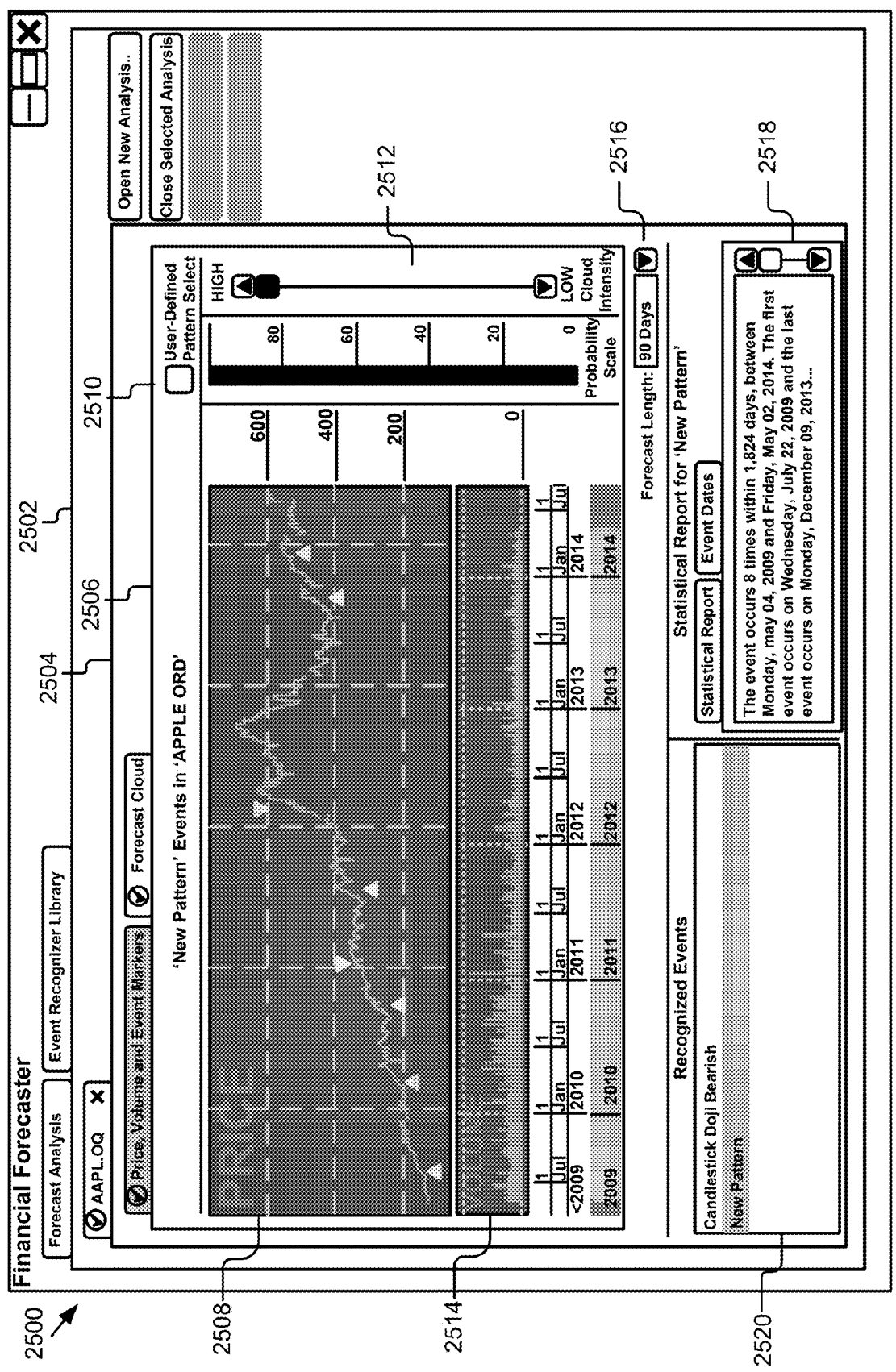
FIGS. 24A and 24B are graphical representations of an example graphical user interface 2500 for displaying a price, volume, and event marker information for given financial instrument data.
Figure 24B:
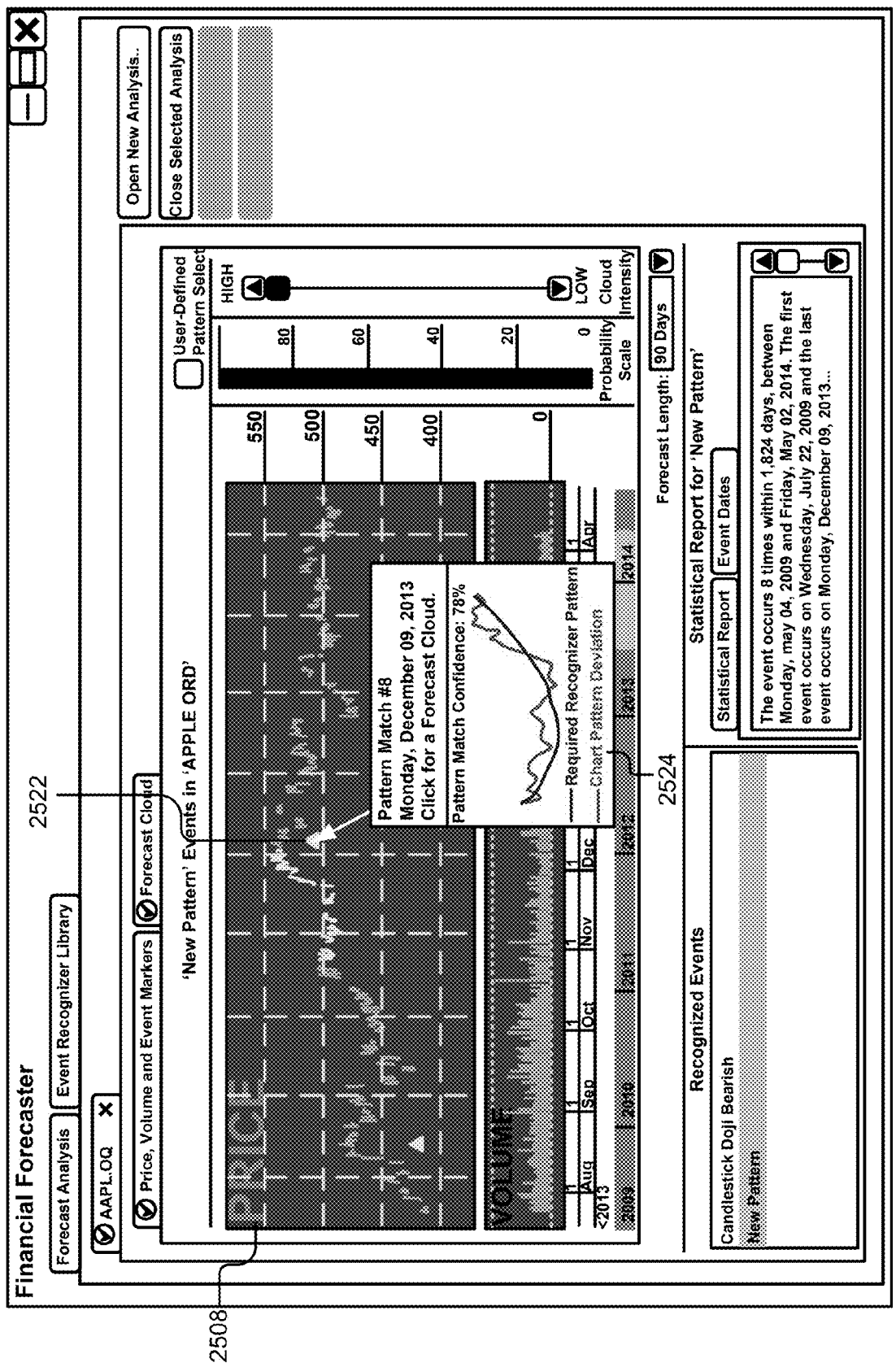

FIGS. 24A and 24B are graphical representations of an example graphical user interface 2500 for displaying a price, volume, and event marker information for given financial instrument data. In FIG. 24A, the interface 2500 includes an interactive chart 2508 displaying financial instrument data (e.g., a price trend line) for a given financial instrument (e.g., Apple stock), a volume indicator 2504 including bars indicating the volume of the financial instrument that was traded on a given day, a recognized events region 2520 indicating the financial dimension that was used in processing the financial instrument data depicted in the chart 2508, which in this case is a user-defined pattern called "New Pattern". The interface 2500 also includes a statistical report region including statistics computed by the analysis module 188. In the chart region 2508, yellow indicators are included showing the financial dimension instances that were recognized by corresponding recognized 182 in the financial instrument data using the New Pattern. The interface 2500 also includes other options discussed elsewhere herein, such as an option 2510 selectable to enable the user to select a custom pattern from the depicted financial instrument data, which can then be used for pattern matching discussed elsewhere herein; a slider element enabling the user to configure the intensity at which a forecast cloud is depicted in the chart region 2508; and a selector for selecting the length of a forecast depicted in the chart region 2508.

In FIG. 25A, a stats panel 2524 is overlaid over the chart 2508. The stats panel 2524 corresponds to a financial dimension instance 2522 (e.g. event) that was recognized by the recognizer 182 as having occurred (e.g., ended) on Monday, Dec. 9, 2013. The user may select an option in the stats panel 2524 to display a corresponding forecast cloud projected into the future from this reference point. The stats panel 2524 also includes a snapshot image showing how closely the New Pattern matched the portion of the financial instrument data corresponding to this point in time and the corresponding pattern match confidence score (e.g., in this case 78%). This interface 2500 is advantageous for numerous reasons including allowing the user to quickly investigate each recognized instance of the pattern in the financial instrument data and assess the accuracy of those instances, which in turn allows the user to make faster well-informed trading decisions.

Figure 27A:
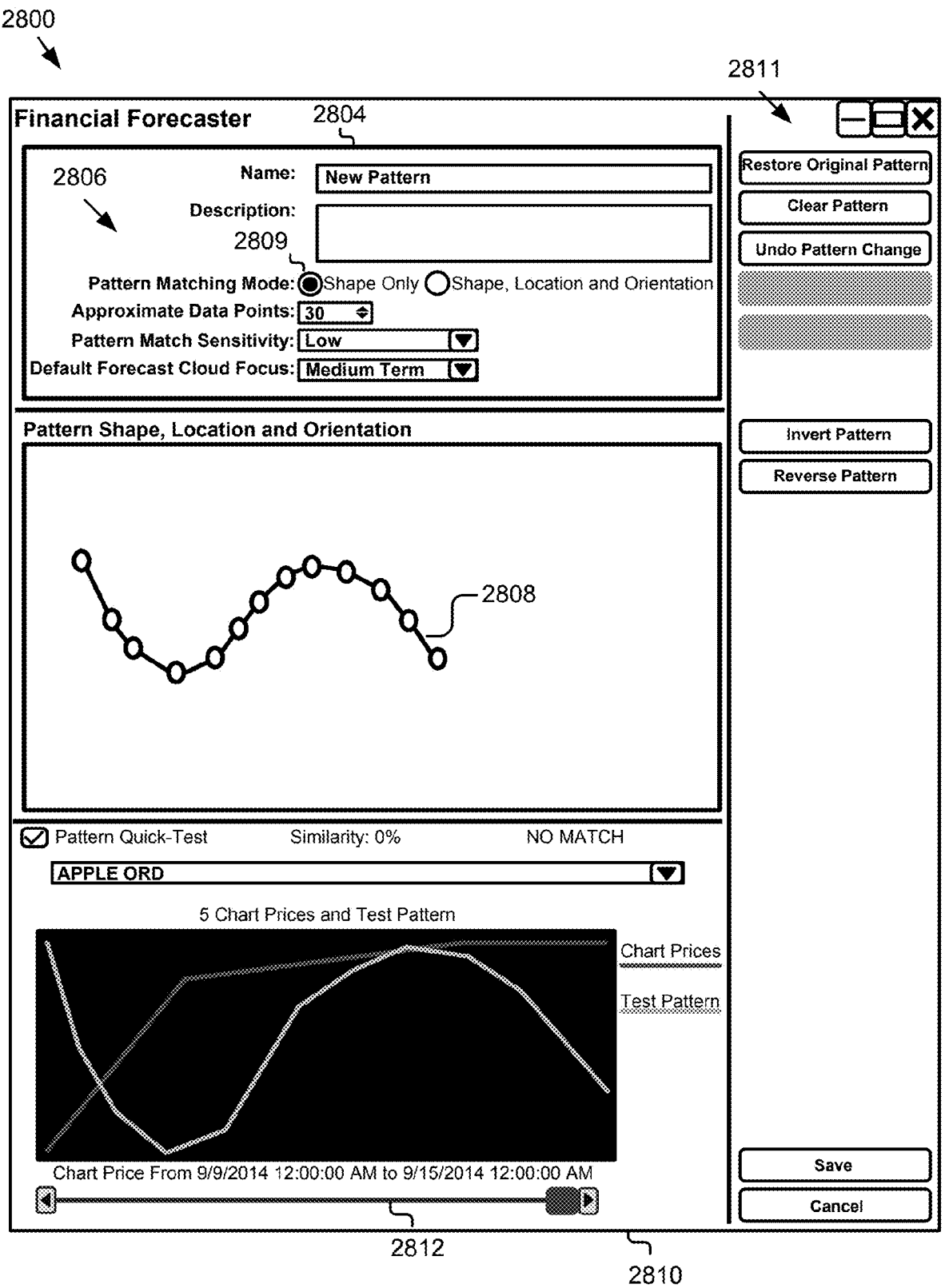
FIGS. 27A and 27B are graphical representations of an example graphical user interface for drawing and editing a user-defined pattern.
Figure 27B:
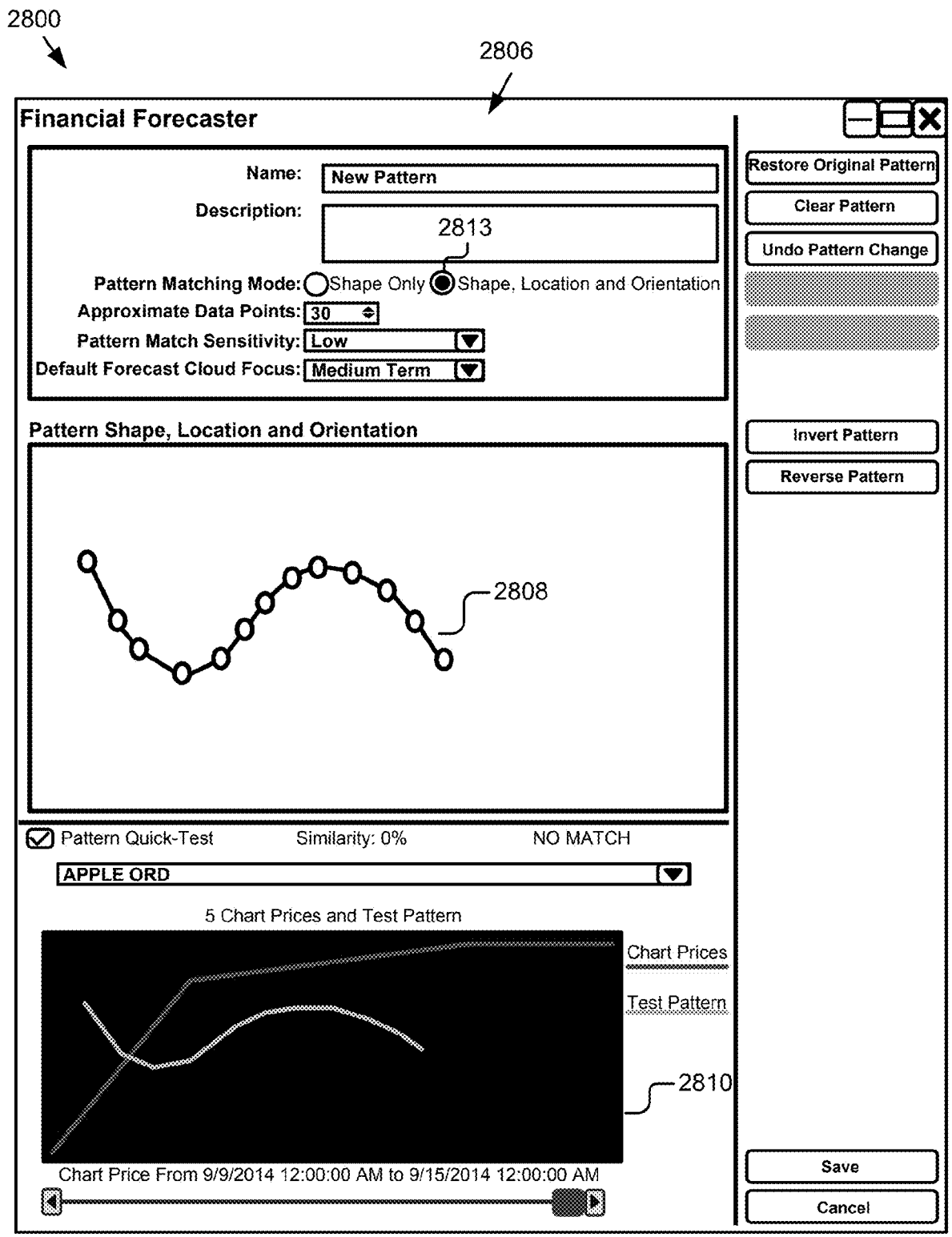

FIGS. 27A and 27B are graphical representations of an example graphical user interface 2800 for drawing and editing a user-defined pattern. In FIG. 27A, the interface 2802 includes a pattern definition region including options for inputting a pattern name, description, matching mode, approximate data points assignment, pattern match sensitivity, and default forecast cloud focus. In this example, the pattern matching mode selector 2809 is selected is shape only, meaning that the user-defined pattern module scales the pattern input by the user to the block dimension of the pattern window, as shown below in the comparison window 2810. In this comparison window 2810, the user-defined pattern is compared to a portion of the financial instrument data (e.g., APPLE ORD) related to a certain time period. As a result, even though the pattern 2808 is drawn is not filled the drawing region/canvas 2809, the pattern is scaled to fit within the dimensions of the block is this process by the user-defined pattern module 184. The comparison window 2810 may include elements (e.g., 2812) for scrolling through the financial instrument data so that the user can compare the pattern 2808 with different aspects of the data. The interface 2800 also includes options for the user to restore the original pattern, clear the pattern, invert the pattern, and/or reverse the pattern by clicking on one of the 2811 buttons, and/or otherwise edit the pattern 2808, as discussed elsewhere herein. In some instances, the user may navigate from the interface 2800 by saving or cancelling.

In FIG. 27B, the pattern matching mode option of shape, location, and orientation 2813 is selected instead of shape only. As a result, the shape, location, and orientation of the pattern as input by the user is preserved relative to the block dimensions, as shown in the comparison window 2810. This is advantageous as it allows the user to precisely define nature of the user-defined pattern 2808 relative to patterns in the financial instrument data, thereby reducing the ability of false positive matches being recognized by the recognizer 182.

Figure 21:
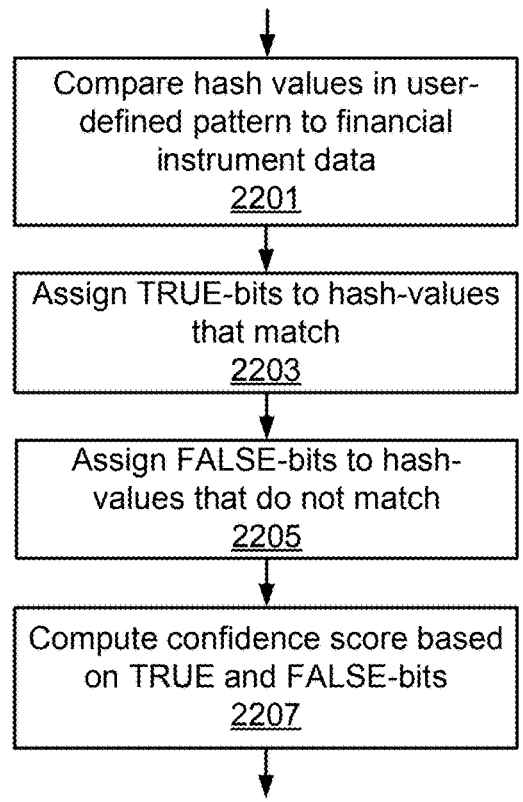
FIG. 21 is a flowchart of an example method for computing a confidence score of the matches between the user-defined pattern and financial instrument data.

FIG. 21 is a flowchart of an example method 2200 for computing a confidence score of the matches between the user-defined pattern and financial instrument data. In this method, a recognizer 182 compares 2201 hash-values in the user-defined pattern to a corresponding portion of the financial instrument data, assigns TRUE-bits to hash-values that match and FALSE-bits to hash-values that do not match, and then computes the confidence score for that portion of the financial instrument data relative to the pattern based on the TRUE-bits and FALSE-bits. In some implementations, the recognizer 182 sums the TRUE-bits and FALSE-bits and/or averages the TRUE-bits and FALSE-bits prior to computing the confidence score.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   presenting, on a display device of a computing device, a graphical user interface including a pattern definition region having a user-interactable graphical option for defining a graphical pattern;
   receiving, via the pattern definition region and an input device of the computing device, one or more selections defining a user-defined graphical pattern;
   determining, using one or more processors, two or more matches between the user-defined graphical pattern and two or more corresponding portions of retrieved time-dependent data;
   presenting, in the graphical user interface on the display device, a chart region including a data visualization graphically representing the retrieved time-dependent data and two or more graphical indicators highlighting at different points of time in the chart region of the graphical user interface the two or more matches between the user-defined graphical pattern and the two or more corresponding portions of the retrieved time-dependent data, the two or more graphical indicators further graphically highlighting in the chart region of the graphical user interface a recognized data dimension instance corresponding to each of the two or more matches, each graphically highlighted recognized data dimension instance being dynamically selectable via the input device to display further information related to that recognized data dimension instance;
   receiving, via the input device, a selection of a first match of the two or more matches graphically highlighted in the chart region; and
   in response to the selection of the first match, presenting, in the graphical user interface on the display device, a graphical user interface element including the information related to the recognized data dimension instance corresponding to the first match of the two or more matches graphically highlighted in the chart region.

2. The computer-implemented method of claim 1, wherein determining the two or more matches includes:
   iteratively isolating portions of the retrieved time-dependent data based on a block dimension of the user-defined graphical pattern;
   generating a hash-value set reflecting a trend line of each of the isolated portions of the retrieved time-dependent data; and
   comparing the hash-value set of each of the isolated portions of the retrieved time-dependent data with a hash-value set generated from the user-defined graphical pattern to determine a match.

3. The computer-implemented method of claim 2, wherein generating the hash-value set reflecting the trend line of each of the isolated portions of the retrieved time-dependent data includes:
   projecting, using the one or more processors, scan lines between unique pairs of points-of-view;
   computing, using the one or more processors, for each of the unique pairs of the points-of-view a distance from an originating point-of-view to a closest intersection with a corresponding portion of the retrieved time-dependent data or to a terminating point of view if no intersection exists; and
   assigning, using the one or more processors, the distance to the hash-value set.

4. The computer-implemented method of claim 2, wherein comparing the hash-value set of each of the isolated portions of the retrieved time-dependent data with the hash-value set generated from the user-defined graphical pattern to determine the match includes:
   assigning, using the one or more processors, a TRUE bit to a match between hash-values;
   assigning, using the one or more processors, a FALSE-bits to a non-match between hash-values; and
   computing, using the one or more processors, a confidence measure by summing TRUE-bits and FALSE-bits.

5. The computer-implemented method of claim 1, wherein receiving the one or more selections defining the user-defined graphical pattern further includes receiving input defining a bounding shape that bounds a portion of the data visualization presented in the graphical user interface.

6. The computer-implemented method of claim 5, wherein the bounding shape is polygonal.

7. The computer-implemented method of claim 1, wherein the data visualization includes an interactive chart displaying a snapshot of the retrieved time-dependent data and a recognized events region indicating a data dimension used in processing the snapshot.

8. The computer-implemented method of claim 1, wherein the graphical user interface element further includes a stats panel corresponding to the recognized data dimension instance corresponding to the first match with an option for comparing the user-defined graphical pattern to the retrieved time-dependent data.

9. The computer-implemented method of claim 1, wherein the graphical user interface element includes a statistical probability map generated based on at least the first match.

10. The computer-implemented method of claim 1, wherein the graphical user interface includes a comparison window including elements for scrolling through the retrieved time-dependent data so that the user-defined graphical pattern can be compared with different aspects of the retrieved time-dependent data.

11. The computer-implemented method of claim 1, wherein:
the user-defined graphical pattern represents a trend of the retrieved time-dependent data over a first time period based on a selected portion of the data visualization, the one or more selections indicating pattern data describing the user-defined graphical pattern; and
the computer-implemented method further comprises retrieving, using the one or more processors, the retrieved time-dependent data including financial instrument data for a financial instrument, the financial instrument data describing a performance of the financial instrument over a second time period, the second time period being greater than the first time period.

12. A system comprising:
one or more processors; and
one or more memories storing computer logic that, when executed by the one or more processors, cause the system to perform operations including:
presenting on a display device of a computing device, a graphical user interface including a pattern definition region having a user-interactable graphical option for defining a graphical pattern;
receiving via the pattern definition region and an input device of the computing device, one or more selections defining a user-defined graphical pattern;
determining two or more matches between the user-defined graphical pattern and two or more corresponding portions of retrieved time-dependent;
presenting, in the graphical user interface on the display device, a chart region including a data visualization graphically representing the retrieved time-dependent data and two or more graphical indicators graphically highlighting at different points of time in the chart region of the graphical user interface the two or more matches between the user-defined graphical pattern and the two or more corresponding portions of the retrieved time-dependent data, the two or more graphical indicators further graphically highlighting in the chart region of the graphical user interface a recognized data dimension instance corresponding to each of the two or more matches, each graphically highlighted recognized data dimension instance being dynamically selectable via the input device to display further information related to that recognized data dimension instance;
receiving, via the input device, a selection of a first match of the two or more matches graphically highlighted in the chart region; and
in response to the selection of the first match, presenting, in the graphical user interface on the display device, a graphical user interface element including the information related to the recognized data dimension instance corresponding to the first match of the two or more matches graphically highlighted in the chart region.

13. The system of claim 12, wherein determining the two or more matches includes:
iteratively isolating portions of the retrieved time-dependent data based on a block dimension of the user-defined graphical pattern;
generating a hash-value set reflecting a trend line of each of the isolated portions of the retrieved time-dependent data; and
comparing the hash-value set of each of the isolated portions of the retrieved time-dependent data with a hash-value set generated from the user-defined graphical pattern to determine a match.

14. The system of claim 13, wherein generating the hash-value set reflecting the trend line of each of the isolated portions of the retrieved time-dependent data includes:
projecting scan lines between unique pairs of points-of-view;
computing for each of the unique pairs of the points-of-view a distance from an originating point-of-view to a closest intersection with a corresponding portion of the retrieved time-dependent data or to a terminating point of view if no intersection exists; and
assigning the distance to the hash-value set.

15. The system of claim 13, wherein comparing the hash-value set of each of the isolated portions of the retrieved time-dependent data with the hash-value set generated from the user-defined graphical pattern to determine the match includes:
assigning a TRUE bit to a match between hash-values;
assigning a FALSE-bits to a non-match between hash-values; and
computing a confidence measure by summing TRUE-bits and FALSE-bits.

16. The system of claim 12, wherein receiving the one or more selections defining the user-defined graphical pattern further includes receiving input defining a bounding shape that bounds a portion of the data visualization presented in the graphical user interface.

17. The system of claim 12, wherein the data visualization includes an interactive chart displaying a snapshot of the retrieved time-dependent and a recognized events region indicating a data dimension used in processing the snapshot.

18. The system of claim 12, wherein the graphical user interface element further includes a stats panel corresponding to the recognized data dimension instance corresponding to the first match with an option for comparing the user-defined graphical pattern to the retrieved time-dependent data.

19. The system of claim 12, wherein the graphical user interface element includes a statistical probability map generated based on at least the first match.

20. The system of claim 12, wherein the graphical user interface includes a comparison window including elements for scrolling through the retrieved time-dependent data so that the user-defined graphical pattern can be compared with different aspects of the retrieved time-dependent data.

* * * * *